United States Patent
Hanes, Jr. et al.

(10) Patent No.: US 12,215,177 B2
(45) Date of Patent: Feb. 4, 2025

(54) CONTAMINANT REMEDIATION WITH FUNCTIONALIZED (METH)ACRYLIC POLYMER OR COPOLYMER MACROPARTICULATES AND SYSTEMS RELATED THERETO

(71) Applicant: COUNTERTRACE LLC, Manvel, TX (US)

(72) Inventors: Robert E. Hanes, Jr., Missouri City, TX (US); Richard L Pettys, Pearland, TX (US); David M. Headley, Pearland, TX (US); Paul T. Hoopingarner, Missouri City, TX (US); Karen A. Scherer, Pearland, TX (US)

(73) Assignee: COUNTERTRACE LLC, Manvel, TX (US)

( * ) Notice: Subject to any disclaimer, the term of this patent is extended or adjusted under 35 U.S.C. 154(b) by 108 days.

(21) Appl. No.: 17/625,671

(22) PCT Filed: Jul. 9, 2020

(86) PCT No.: PCT/US2020/041417
§ 371 (c)(1),
(2) Date: Jan. 7, 2022

(87) PCT Pub. No.: WO2021/007441
PCT Pub. Date: Jan. 14, 2021

(65) Prior Publication Data
US 2022/0259350 A1    Aug. 18, 2022

Related U.S. Application Data

(60) Provisional application No. 62/965,352, filed on Jan. 24, 2020, provisional application No. 62/898,182, (Continued)

(51) Int. Cl.
*C08F 220/32* (2006.01)
*C08F 220/58* (2006.01)
(Continued)

(52) U.S. Cl.
CPC .......... *C08F 220/32* (2013.01); *C08F 220/58* (2013.01); *C09K 8/536* (2013.01);
(Continued)

(58) Field of Classification Search
CPC ...... C08F 220/32; C08F 220/58; C09K 8/536; C09K 8/57; C09K 8/66; C09K 8/72; E21B 21/065; E21B 21/068
See application file for complete search history.

(56) References Cited

U.S. PATENT DOCUMENTS

| | | |
|---|---|---|
| 4,857,580 A | 8/1989 | Patzschke et al. |
| 5,073,603 A | 12/1991 | Ponticello |

(Continued)

FOREIGN PATENT DOCUMENTS

| | | |
|---|---|---|
| CN | 102295728 | 12/2011 |
| CN | 102500290 | 6/2012 |

(Continued)

OTHER PUBLICATIONS

Sorption of Pd(11) from Aqueous Solutions of Chlorocomplexes by the Copolymer of Glycidylmethacrylate and Ethylenedimethacrylate Modified with Ethylenediamine. The Structure of Complexes, Die Angewandte Makromolekulare Chemie 81 (1979) 55-62, Radová et. al (Year: 1979).*

(Continued)

*Primary Examiner* — Aiqun Li
(74) *Attorney, Agent, or Firm* — Foley & Lardner LLP

(57) ABSTRACT

Macroparticulates may be formed through at least partial self-assembly by reacting an epoxide-containing (meth) acrylic polymer or copolymer with a compound bearing a (Continued)

nitrogen nucleophile. An internal cavity may be formed when functionalizing the (meth)acrylic polymer or copolymer in the presence of a hindered amine base. When appropriately functionalized, the macroparticulates may be used to sequester a contaminant from a substance in need of contaminant remediation, such as produced water or flowback water from a wellbore job site. Reclaimed water obtained from the macroparticulates may be utilized to form a treatment fluid. The macroparticulates may be located within a continuous flow line, particularly within a removable cartridge, to promote removal of at least one contaminant from a substance in need of contaminant remediation. The substance in need of contaminant remediation and/or the macroparticulates may be visually or spectroscopically interrogated to determine whether the macroparticulates have become saturated with contaminant.

22 Claims, 16 Drawing Sheets

Related U.S. Application Data filed on Sep. 10, 2019, provisional application No. 62/898,258, filed on Sep. 10, 2019, provisional application No. 62/872,519, filed on Jul. 10, 2019, provisional application No. 62/872,507, filed on Jul. 10, 2019, provisional application No. 62/872,513, filed on Jul. 10, 2019.

(51) Int. Cl.
| | | |
|---|---|---|
| *C09K 8/536* | (2006.01) | |
| *C09K 8/57* | (2006.01) | |
| *C09K 8/66* | (2006.01) | |
| *C09K 8/72* | (2006.01) | |
| *E21B 21/06* | (2006.01) | |

(52) U.S. Cl.
CPC .................. *C09K 8/57* (2013.01); *C09K 8/66* (2013.01); *C09K 8/72* (2013.01); *E21B 21/068* (2013.01)

(56) References Cited

U.S. PATENT DOCUMENTS

| | | | | |
|---|---|---|---|---|
| 5,895,796 A * | 4/1999 | Mouri | ..................... | C02F 1/288 |
| | | | | 210/683 |
| 6,794,448 B2 | 9/2004 | Sakuma | | |
| 6,946,070 B2 | 9/2005 | Hammen et al. | | |
| 2005/0124707 A1* | 6/2005 | Eldridge | ................... | C08F 2/08 |
| | | | | 521/25 |
| 2012/0271064 A1 | 10/2012 | Henninger et al. | | |
| 2013/0157905 A1* | 6/2013 | Saini | ........................ | C09K 8/12 |
| | | | | 507/214 |
| 2016/0339412 A1 | 11/2016 | Rasmussen et al. | | |
| 2018/0304684 A1 | 10/2018 | Rannoux et al. | | |

FOREIGN PATENT DOCUMENTS

| | | |
|---|---|---|
| CN | 105693918 | 6/2016 |
| CN | 109206623 | 1/2019 |
| JP | 62153754 | 7/1987 |
| KR | 1020060104662 | 10/2006 |
| WO | 2013118100 | 8/2013 |

OTHER PUBLICATIONS

"Polymer monoliths with chelating functionalities for solid phase extraction of metal ions from water", Wang, et al., Journal of Chromatography A, 1343, 2014, 128-134 (Year: 2014).*
Yan, X., et al., "Highly Monodisperse Sub-Microspherical Poly(glycidyl methacrylate) Nanocomposites with Highly Stabilized Gold Nanoparticles," Macromol. Chem. Phys., 2014, pp. 1098-1106, 215.
Caykara, T., et al., "A New Type of Poly(glycidyl methacrylate) Microbeads with Surface Grafted Iminodiacetic Acid: Synthesis and Characterization," Polymer Bulletin, 2008, pp. 311-318, 61.
International Search Report and Written Opinion for PCT/US2020/041407, published Oct. 30, 2020.
International Search Report and Written Opinion for PCT/US2020/041417, published Oct. 26, 2020.
Lee, S.G., et al., "Amine-functionalized macroporous microspheres for HF removal from aqueous solution," AIP Conference Proceedings, 2016, Article No., 140005, pp. 1-5, 1713.
Liu, C., et al., "Diethylenetriamine-grafted poly(glydicyl methacrylate) adsorbent for effective copper ion adsorption," J. Colloid and Interface Sci., 2006, pp. 99-108, 303.
Nastasovic, A., et al., "Kinetics of hexavalent chromium sorption on amino-functionalized macroporous glycidyl methacrylate copolymer," J. Hazardous Mat., 2009, pp. 153-159, 171.
Bayramoglu, G., et al., "Ethylenediamine grafted poly(glycidylmethacrylate-co-methylmethacrylate) adsorbent for removal of chromate anions," Separation and Purification Technology, 2005, pp. 192-199, 45.
Liu, C., et al., "Functionalization of adsorbent with different aliphatic polyamines for heavy metal ion removal: Characteristics and performance," J. Colloid and Interface Sci., 2010, pp. 454-460, 345.

* cited by examiner

CONTAMINANT REMEDIATION WITH FUNCTIONALIZED (METH)ACRYLIC POLYMER OR COPOLYMER MACROPARTICULATES AND SYSTEMS RELATED THERETO

CROSS-REFERENCE TO RELATED APPLICATIONS

The present application claims the benefit of priority under 35 U.S.C. § 119 to U.S. Provisional Patent Applications 62/965,352, filed on Jan. 24, 2020; 62/898,258, filed on Sep. 10, 2019; 62/898,182, filed on Sep. 10, 2019; 62/872,519, filed on Jul. 10, 2019; 62/872,513, filed on Jul. 10, 2019; and 62/872,507, filed on Jul. 10, 2019, each of which is incorporated herein by reference in its entirety.

STATEMENT REGARDING FEDERALLY SPONSORED RESEARCH OR DEVELOPMENT

Not applicable.

BACKGROUND

Treatment fluids may be used in a variety of subterranean treatment operations to facilitate or promote a particular event for improving recovery of a hydrocarbon resource from a subterranean formation. As used herein, the terms "treat," "treatment," "treating," and grammatical equivalents thereof refer to any subterranean operation that uses a fluid in conjunction with achieving a desired function and/or for a desired purpose. Unless otherwise specified, use of these terms does not imply any particular action by the treatment fluid or a component thereof. The term "treatment fluid" refers to any fluid that is used in the course of conducting a treatment operation. Illustrative treatment operations that may be conducted in a subterranean formation include, without limitation, drilling operations, stimulation operations, production operations, remediation operations, sand control operations, and the like, which may include, for example, fracturing operations, gravel packing operations, acidizing operations, descaling operations, consolidation operations, workover operations, cleanup operations, and the like.

Very large quantities of water are commonly used when conducting a treatment operation, particularly for fracturing operations. In many instances, commercial drinking water is transported to a job site, formulated onsite into a treatment fluid, and then pumped downhole. Alternately, a formulated treatment fluid made from commercial drinking water may be transported to a job site. Both approaches are rather expensive due to transportation costs.

Although there may be native water sources near a job site or available from a well itself (either as ground water or produced/flowback water obtained following a treatment operation), such water sources are oftentimes of insufficient quality to facilitate formation of a treatment fluid therefrom. Impurities in a water source may impair a treatment fluid from functioning properly. As non-limiting examples, impurities in a water source may be reactive with a treatment chemical, form precipitates or scale, and/or inhibit a gelling agent in a treatment fluid from undergoing effective cross-linking to increase viscosity to a sufficient degree. Seawater may be similarly unsuitable for formulating a treatment fluid at oceanic job sites.

It is not uncommon for a 10-fold return of produced water to be generated per unit input of water into a wellbore. Not only is the produced water of insufficient purity to formulate a treatment fluid, but the impurities may also impact actions needing to be taken before disposing of the water, such as to meet environmental regulations for discharge. At the very least, the large inventory of water generated at a job site can be problematic to manage. If the water is contaminated and needs further remediation, the logistical issues associated with water management may increase further still. The contaminant profile of produced/flowback water obtained from a wellbore may change over the production time, or the contaminant profile may change dynamically during storage (e.g., due to ongoing chemical reactions of contaminant species), such that different remediation strategies may become necessary at different points in time.

Due to the dynamic nature of the contaminant profile in contaminated water, batchwise purification processes may be necessary to perform effective remediation. However, batchwise remediation processes may be volume-limited and unable to keep pace with the quantity of contaminated water being produced in a given situation. By the same token, batchwise purification processes may be unable to provide a steady supply of remediated water having sufficient purity for use in a treatment operation. Throughput concerns may similarly limit the effectiveness of purification strategies used for remediating other contaminated water sources as well.

With rising demand, increasing costs and growing shortages of commercial drinking water, it would be desirable to use lower quality water sources when conducting a treatment operation or performing other types of commercial processes requiring large volumes of water. This is not currently possible with seawater, produced/flowback water or other contaminated water sources for the reasons discussed above. While there remains significant interest in using low-quality water sources for conducting treatment operations and other commercial processes, there is not currently a suitable way for processing such significant quantities of water in a cost-effective and timely manner to reach purity levels sufficient to facilitate reuse.

Continuous, in-line purification processes would help alleviate the foregoing concerns. However, due to the dynamic nature of the contaminant profile of various contaminated water sources, there is no assurance that a purification protocol suitable for remediating the water will remain effective throughout a purification process. Although inline monitoring of a water stream may be conducted, the complex fluid nature of contaminated water and its dynamic contaminant profile may make it very difficult to change a purification protocol on-the-fly in response to particular process needs.

In addition to the oilfield industry, large quantities of contaminated water may also be generated in other commercial processes, such as mining, industrial manufacturing, chemical processing, and the like. Commercial drinking water may also be in need of contaminant remediation in certain instances. Thus, it is to be appreciated that continuous, in-line water purification processes may be desirable in these instances as well.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1A:
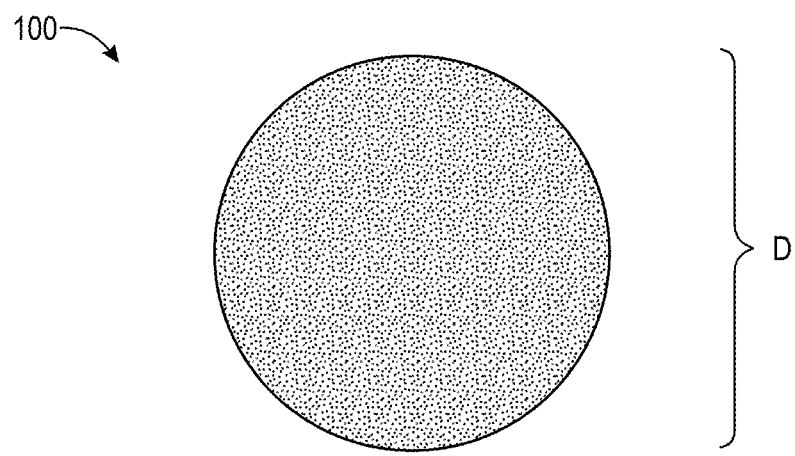
FIGS. 1A and 1B are diagrams of a macroparticulate formed from an epoxide-containing (meth)acrylic polymer or copolymer before and after functionalization, respectively.

Macroparticulates bearing functionality to afford reactivity or binding selectivity with particular target substances may be suitably used to sequester contaminants from a substance in need of contaminant remediation, such as industrial water or water obtained from a wellbore, among other fluids in need of contaminant remediation. In-line systems and removable cartridges employing the macroparticulates are also disclosed herein as well. Remediated water obtained from the macroparticulates may be employed for various purposes.

In particular, macroparticulates comprising functionalized polymers bearing electrophilic side chains, particularly oxiranes (epoxides), that have been further reacted with a nitrogen nucleophile are disclosed herein. Other nucleophiles such as oxygen, sulfur, phosphorus, selenium or carbon species having a lone pair of electrons may also be reacted similarly to promote functionalization according to the disclosure herein. Prior to functionalization, the polymers are formed into a predetermined shape, a profile of which may be substantially maintained following reaction with the nitrogen nucleophile. During functionalization, the predetermined shape may undergo expansion, including morphological changes in some instances, to afford a larger macroparticulate volume. Predetermined shapes such as solid disks, tubes or spheres may undergo functionalization according to the disclosure herein, optionally with expansion and morphological changes, to afford a reaction product having a specified internal structure formed by self-assembly. A host of nitrogen nucleophiles may be selected to produce a functionalized particulate surface having a specified contaminant sequestration profile. The macroparticulates may also provide an observable physical property change in the presence of a contaminant of interest, such as an optical color change, electrical change, or conveyance of antimicrobial properties as non-limiting examples, particularly by binding or adsorbing the contaminant. The observable physical property change may allow the effectiveness of remediation processes employing the macroparticulates to be determined, such as verifying whether the macroparticulates have become saturated with a given contaminant. The functionalized particulate surface may be further configured to release the contaminant under specified conditions at a later time.

Self-assembled molecular structures have been the subject of considerable study in recent years. In many instances, self-assembled molecular structures have been limited to those that are relatively small in size, such as micron-scale and lower particle sizes or domains. Although such small particle sizes may afford bulk materials having extremely high surface areas, the small particle sizes may be unsuitable for some applications without further manipulations being performed, such as attachment of the particulates to a suitable support material or surface to facilitate their use. The additional manipulations needed to facilitate use of small self-assembled molecular structures can themselves be problematic in many instances.

Macroparticulates having dimensions on the millimeter scale and above, typically on the centimeter scale and above, are usually not prepared using molecular self-assembly techniques. Instead, mechanical manipulations are often utilized to render a bulk material into macroparticulates having a desired shape. Mechanical manipulations may include, for example, machining, casting, molding, and like techniques for manipulating bulk materials. Although suitable for many purposes, the breadth of morphological diversity achievable by mechanical manipulations may be somewhat limited. Further, targeting macroparticulates having particular sizes, shapes, or morphologies may require performance of entirely different sequences of mechanical manipulations, thereby affording a complex manufacturing environment. Some of the more exotic morphological structures attainable by molecular self-assembly on the microscale are very difficult, if not impossible, to realize when performing mechanical manipulations to produce macroparticulates.

In response to the foregoing issues, the present disclosure provides macroparticulates having a specified morphology produced by partial self-assembly, such as expanded macroparticulates, including hollow macroparticulates, comprising a functionalized polymer and methods and systems for remediating a substance in need of contaminant remediation. The functionalized polymers described herein may comprise a reaction product of an epoxide-containing (meth)acrylic polymer or copolymer and a compound bearing a nitrogen nucleophile, which may open at least a portion of the epoxide groups in the polymer and form covalent bonds. The macroparticulates of the present disclosure may be functionalized to afford selectivity toward binding or adsorbing of one or more contaminants of interest, wherein the functionality for promoting contaminant binding or adsorption may be introduced with the nitrogen nucleophile or in a separate functionalization conducted after epoxide opening takes place (e.g., by functionalizing the compound comprising the nitrogen nucleophile after epoxide opening takes place). In addition, the functionalized (meth)acrylic polymers and copolymers may be further crosslinked to convey additional mechanical stability to the macroparticulates disclosed herein. Crosslinking may take place before or after reaction with the nitrogen nucleophile occurs.

The functionality suitable to afford binding of particular substances may be a ligand or a compound that may be further functionalized to promote ligating properties. Ligands and compounds functionalizable to form ligands may be introduced to the macroparticulates by reacting a suitable compound comprising a nitrogen nucleophile or similar nucleophile with a functional group upon the macroparticulates. Supramolecular receptors such as crown ethers, porphyrins, cryptands, calixarenes, and the like may similarly functionalize the macroparticulates via a reaction through a nitrogen nucleophile. Particularly advantageous examples of these supramolecular receptors may comprise a hexasubstituted benzene within a portion of their molecular structure and/or utilize the hexasubstituted benzene for arranging the supramolecular receptors, as explained further below.

Certain variants of the macroparticulates may bear a hexasubstituted benzene as a scaffold for introducing additional functionality to a surface of the macroparticulates. The hexasubstituted benzene may be either covalently bonded to the surface of the macroparticulates or non-covalently associated with the surface of the macroparticulates. The hexasubstituted benzene may bear suitable functionality for promoting selectivity toward binding or adsorbing of one or more contaminants or other entities of interest, as well as functionality to promote detection of such contaminants. Moieties resulting from epoxide opening by the nitrogen nucleophile may provide locations for covalent attachment of the hexasubstituted benzene thereto. Alternately, the compound comprising the nitrogen nucleophile may be reacted with the hexasubstituted benzene after epoxide opening takes place. Further alternately, hexasubstituted benzenes bearing a nitrogen nucleophile may open at least a portion of the epoxide groups in the polymer to promote covalent bonding of the hexasubstituted benzenes to the reaction product. Non-covalent association of the hexasubstituted benzenes with the surface of the macroparticulates (e.g., through hydrophobic interactions) also resides within the scope of the disclosure herein. Further description of suitable hexasubstituted benzenes, including features and advantages thereof, is provided hereinbelow.

While molecular self-assembly on the microscale is a well-studied area of increasing interest, self-assembly on the macroscale is a considerably less common phenomenon. As demonstrated herein, at least partial self-assembly on the macroscale may surprisingly be realized when functionalizing certain types of polymers, specifically when functionalizing epoxide-containing (meth)acrylic polymers and copolymers with a nitrogen nucleophile under suitable conditions. Suitable (meth)acrylic polymers may include poly(meth)acrylates and poly(meth)acrylamides, a copolymer thereof, or a combination thereof, wherein the (meth)acrylic polymers or copolymers bear an epoxide group. The terms "poly(meth)acrylate" and "poly(meth)acrylamide" encompass any polymer comprising acrylate, methacrylate, acrylamide, and/or methacrylamide monomers, particularly when such monomers are polymerized through their olefinic unsaturation. The term "meth" in parentheses means that a methyl group may or may not be present. If a methyl group is absent, a hydrogen is present in its place. Other olefinically unsaturated monomers may also be copolymerized with the foregoing (meth)acrylic monomers. Additional details of the macroparticulates, their formation, and the production of suitable precursors thereto is provided herein. The term "macroparticulate" refers to any particulate material having an average size of about 1 mm or more, or about 5 mm or more, or about 10 mm or more in size.

More specifically, epoxide-containing (meth)acrylic polymers suitable for undergoing functionalization according to the disclosure herein may comprise a glycidyl (meth)acrylate monomer (Compound 1), the corresponding (meth)acrylamide monomer N-(oxiran-2-ylmethyl)(meth)acrylamide (Compound 2), or a copolymer thereof. Variable R is H or a methyl group in both instances.

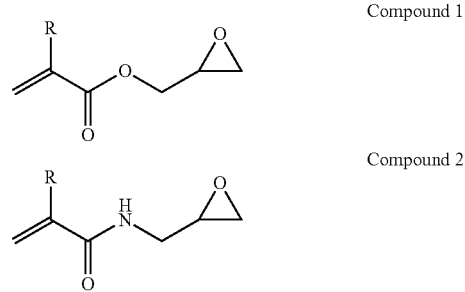

Other heteroatom linkers between the olefinic unsaturation and the epoxide group are also possible. Optionally, other olefinically unsaturated monomers may also be copolymerized with the above (meth)acrylic monomers, including other (meth)acrylic monomers not bearing an epoxide group. Other monomers that may be copolymerized with the above olefinically unsaturated monomers include, for example, (meth)acrylic acid, (meth)acrylate esters, (meth)acrylamide, alpha olefins, olefins capable of forming crosslinks between adjacent polymer chains in individual macroparticulates, and the like. Methyl methacrylate and hydroxyethyl methacrylate may be particularly suitable olefinically unsaturated monomers that may be copolymerized with the above olefinically unsaturated monomers. Suitable alpha olefins that may be co-polymerized with the above olefinically unsaturated monomers include, for example, ethylene, propylene, butene, pentene, hexene, heptene, octene, nonene, decene, undecene, dodecene or mixtures thereof. Diene monomers, such as dicyclopentadiene, butadiene and similar monomers, may also be copolymerized with any of the foregoing olefinically unsaturated monomers. Co-monomers may be included to promote further tailoring of the physical properties of the resulting epoxide-containing (meth)acrylic polymers, including the ability to form crosslinks between adjacent polymer chains.

Accordingly, particular epoxide-containing (meth)acrylic polymers suitable for undergoing functionalization according to the disclosure herein may be produced from an epoxide-containing (meth)acrylate monomer and have a structure represented by Compound 3 below

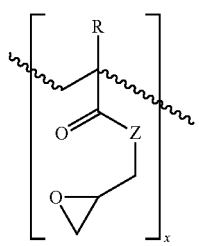

Compound 3 wherein x is a positive integer of about 5 or greater (molecular weight may be about 5,000 to about 1,000,000, typically about 10,000 to about 400,000), or about 100 or greater, or about 500 or greater or about 1000 or greater; R is H or methyl, and Z is O, S, Se, NH or PH. Particularly suitable examples of variable Z are O or NH. In more particular embodiments, a suitable (meth)acrylic polymer for undergoing functionalization according to the disclosure herein may be poly(glycidyl methacrylate) (R=Me, Z=O). Although certain description herein may be directed primarily to poly(glycidyl methacrylate) polymers and their functionalization and advantages, including copolymers thereof, it is to be appreciated that other (meth)acrylic polymers bearing an epoxide group, including copolymers thereof, may undergo similar functionalization according to the disclosure herein to afford like features and advantages in various application-specific situations. As a particular example, (meth)acrylic polymers and copolymers bearing an N-(oxiran-2-ylmethyl)(meth)acrylamide monomer (Compound 2) may be employed under acidic or basic conditions that may lead to ester hydrolysis in poly(glycidyl methacrylate)-containing macroparticulates. As discussed further below, functionalization with a nitrogen nucleophile may also be conducted to introduce desirable morphological and functional features in the macroparticulates, including the ability to bind or adsorb particular contaminants of interest. Poly(glycidyl methacrylate) copolymers and similar acrylic copolymers may contain a crosslinked or crosslinkable monomer to further tailor the physical properties of the macroparticulates as well.

Still other monomers that may be polymerized under conditions similar to those used for glycidyl methacrylate include, for example, 2-hydroxyethyl methacrylate (HEMA), 3-(trimethoxysilyl)propyl methacrylate (TSPMA), poly(ethylene glycol) dimethacrylate (poly-EGMA), di-(ethylene glycol) dimethacrylate, tri-(ethylene glycol) dimethacrylate, 2-acetoacetoxyethyl methacrylate (AAEMA), methyl methacrylate, and zinc methacrylate. Any of these (meth)acrylate monomers may be copolymerized with glycidyl methacrylate or other acrylic monomers disclosed above to form (meth)acrylic copolymers suitable for use in the disclosure herein. Illustrative glycidyl methacrylate (GMA) copolymers that may be formed under similar polymerization conditions include, for example, GMA-HEMA, GMA-TSPMA, GMA-poly-EGMA, GMA-AAEMA, GMA-ASEMA-HEMA, and GMA-AAEMA-TSPMA. Some of these GMA copolymers are configured to undergo crosslinking during and/or after polymerization, through reaction of their side chains or by incorporating a dangling olefinic unsaturation from a first polymer chain into a second polymer chain as the second polymer chain forms, thereby introducing crosslinks into the polymer. Any of these (meth)acrylic copolymers may undergo reaction with a nitrogen nucleophile according to the disclosure herein to form macroparticulates bearing functionalization that may be exploited in various ways.

Alternately, a separate crosslinking agent may be included in the reaction mixture in which the (meth)acrylic polymers or copolymers are formed. That is, a crosslinking agent need not necessarily become incorporated within the backbone of the (meth)acrylic polymer or copolymer. As an example, a diol or amino alcohol may be reacted with poly(glycidyl methacrylate) or a similar epoxide-containing polymer to introduce crosslinks between adjacent polymer chains, wherein the resulting crosslinked polymer may be further reacted with a nitrogen nucleophile to form a reaction product suitable for defining macroparticulates according to the disclosure herein. Diamines and other polyamines may also promote crosslinking between adjacent polymer chains in some instances. In other instances, diamines may react with a single polymer chain and leave one or more unreacted amine groups available for further functionalization, as described further below.

In a more specific example, a (meth)acrylic copolymer may be formed from a reaction mixture comprising glycidyl methacrylate, diethyleneglycol dimethacrylate, and tris(2-(acrylolyloxy)ethyl)isocyanurate, wherein the latter two reagents are capable of introducing crosslinks between adjacent polymer chains. Such (meth)acrylic polymers may comprise about 99 wt. % or greater of the glycidyl methacrylate, with the balance of the copolymer being comprised by the two crosslinking agents. Macroparticulates comprising such crosslinked (meth)acrylic polymers may be especially crush resistant.

As discussed further below, a hexasubstituted benzene may be associated with the surface of the macroparticulates, either covalently or non-covalently, to afford sensing or contaminant remediation capabilities thereto, as non-limiting examples. Syntheses to afford such hexasubstituted benzenes are provided further below. Additional metal-binding functionalities ligands) may be present upon the macroparticulates in some cases as well, wherein the metal-binding functionalities may be separate from surface functionalities introduced through the hexasubstituted benzene. The metal-binding functionalities may be introduced with the compound bearing the nitrogen nucleophile when forming the macroparticulates or through a further reaction of the compound thereafter.

Glycidyl methacrylate (Compound 1) and similarly functionalized (meth)acrylic monomers bearing a side chain epoxide group may be polymerized and rendered into a form suitable for undergoing further functionalization according to the disclosure herein, either as a homopolymer or a copolymer capable of forming a macroparticulate of the present disclosure. In particular, glycidyl methacrylate, a similar (meth)acrylic monomer, or a copolymer thereof may be polymerized to a first polymerization state (e.g., through a living polymerization reaction or a free radical polymerization reaction) comprising a solid polymer product that may be isolated and rendered into a predetermined shape suitable for undergoing further functionalization. Other polymerization techniques may also be suitable to achieve the first polymerization state. The solid polymer product in the first polymerization state may be crosslinked during the living polymerization reaction, or the polymer may be further crosslinked with a crosslinking agent thereafter, particularly during functionalization with the nitrogen nucleophile or after functionalization with the nitrogen nucleophile has taken place. Specifically, the polymer isolated in the first polymerization state may be rendered into the form of a dense body having a predetermined shape, such as a disk, sphere, extrudate, or similar structure. The structure obtained after rendering the polymer into a desired shape in the first polymerization state is solid, although some minor voids may be present depending on manufacturing or processing inconsistencies. The density obtained after rendering the polymer into the predetermined shape may represent that of the as-obtained polymer from the polymerization reaction or after undergoing further crosslinking. Advantageously, the predetermined shape provided at this juncture may be varied according to particular process needs, such that a range of macroparticulate structures of any desired size may be produced once further functionalization with a nitrogen nucleophile takes place, and optionally still further after functionalizing with a hexasubstituted benzene or other reagent according to the disclosure herein. Advantageously, a profile of the predetermined shape rendered at the pre-functionalization stage may be largely maintained following functionalization, except for undergoing volume expansion and a corresponding decrease in the density. That is, functionalization may promote an increase in size and/or other morphological changes of the pre-functionalization shape to afford the increased size and decreased density, while still maintaining the overall appearance of the predetermined shape following functionalization. Advantageously, spherical pre-functionalization shapes may maintain this shape following functionalization, particularly with an internal cavity forming during functionalization. Other shapes may assume a more random structure following functionalization of the polymer or copolymer with the nitrogen nucleophile. Spherical pre-functionalization shapes may be formed by rolling the (meth)acrylic polymer or copolymer in the first polymerization state into a substantially spherical shape before undergoing further functionalization. Without being held to any particular theory, the volume expansion occurring during functionalization is believed to originate from trapped molecules escaping as vapor during a heating cycle of the functionalization reaction, thereby forming an internal cavity in the reaction product. The internal cavity tends to be spherical or substantially spherical and differs from minor voids present in the pre-functionalization shape. As discussed below, the shape that is obtained following functionalization (both spherical and non-spherical shapes) may exhibit significant and advantageous morphological differences from the pre-functionalization shape, specifically due to formation of the internal cavity under suitable reaction conditions.

Free radical polymerization, solution polymerization, suspension polymerization, or emulsion polymerization may also be suitable for forming the epoxide-containing (meth)acrylic polymers or copolymers disclosed herein. Such epoxide-containing (meth)acrylic polymers or copolymers may similarly be formed into a predetermined shape and undergo functionalization according to the disclosure herein. Suitable conditions for conducting such alternative polymerization techniques will be familiar to one having ordinary skill in the art. The predetermined shape obtained following any polymerization technique may be at least expanded following functionalization, and a profile of the predetermined shape may be retained in some instances. Both regular and random shapes may be obtained following functionalization of the macroparticulates.

Spherical macroparticulates may be particularly advantageous to afford high packing efficiencies for confining large quantities of macroparticulates into a small treatment volume. For example, spherical macroparticulates may afford high packing densities in cartridges or filter pods suitable for use in the remediation methods and systems disclosed herein, as discussed further hereinbelow. Although substantially spherical macroparticulates may be advantageous, macroparticulates having any shape may be used for contaminant sequestration according to the disclosure herein. Advantageously, the relatively large size of the macroparticulates used herein may facilitate a rather high degree of porosity in a packed bed, thereby providing relatively little flow resistance. Therefore, the macroparticulates disclosed herein may be readily incorporated within process flow lines to promote contaminant remediation without significant flow disruption.

Although the macroparticulates may be substantially spherical in certain instances, it is to be appreciated that they may possess microscopic surface roughness. In addition, functionality introduced to the macroparticulates through a reaction with a compound containing a nitrogen nucleophile may extend from the macroparticulate surface, like bristles on a brush, for example. Macroparticulates that are substantially spherical and those having irregular/random structures may possess such microstructural features upon the surface.

Other suitable macroparticulates may have an irregular/random shape, resembling a piece of popcorn.

In a non-limiting embodiment, poly(glycidyl methacrylate) and similar (meth)acrylic polymers and copolymers suitable for use in the disclosure herein may be obtained by living polymerization, which affords a dangling reactive intermediate upon a terminus of the polymer chain. Suitable living polymerization conditions for (meth)acrylic monomers may include Cu(I) mediation in the presence of a suitable radical initiator, such as AIBN. It is also to be appreciated that suitable Cu(I) active species may be produced in situ by oxidation or reduction of Cu(0) or Cu(II) respectively. If left unquenched, the dangling reactive intermediate may undergo further polymerization when exposed to more olefinic monomer or another entity suitable for reacting with the reactive intermediate. In living-polymerized poly(glycidyl methacrylate) and similar (meth)acrylic polymers or copolymers, the dangling reactive intermediate may undergo further polymerization when functionalizing the polymer initially obtained in a first polymerization state (pre-functionalization), thereby affording a second polymerization state after functionalization with the nitrogen nucleophile has taken place. That is, poly(glycidyl methacrylate) or similar acrylic polymers and copolymers obtained by living polymerization may undergo additional polymerization (e.g., between two dangling reactive intermediates or unpolymerized (meth)acrylate monomers) when undergoing further functionalization according to the disclosure herein. Post-functionalization curing by heating or UV light exposure may also be performed. Dangling reactive intermediates may lead to crosslinking between adjacent polymer chains as well. As such, the poly(glycidyl methacrylate) or similar (meth)acrylic polymers and copolymers may be polymerized to the first polymerization state, where the polymer may still be easily manipulated into a desired, predetermined shape, and then undergo further curing before, concurrently with, or after being further functionalized with a nitrogen nucleophile according to the disclosure herein. The second polymerization state formed during curing or functionalization may represent a higher molecular weight than does that of the first polymerization state. Although living polymerization may be advantageous for practicing the disclosure herein, it is to be appreciated that poly(glycidyl methacrylate) and similar (meth)acrylic polymers and copolymers bearing an epoxide group that are obtained through other radical polymerization techniques may also be suitable for use in the disclosure herein.

Surprisingly, poly(glycidyl methacrylate) and similar (meth)acrylic polymers and copolymers that are polymerized to the first polymerization state and shaped as above may undergo a significant morphological change when undergoing functionalization via epoxide opening and/or aminolysis with a nitrogen nucleophile under suitable reaction conditions, as discussed below. The nitrogen nucleophile may comprise at least a portion of a ligand in some instances, the features and advantages of which are discussed below. Functional groups generated upon opening of the epoxide group with the nitrogen nucleophile may be subsequently reacted with a suitably functionalized hexasubstituted benzene to promote surface attachment thereof, as also discussed further below. Alternately, a hexasubstituted benzene bearing a nitrogen nucleophile may directly open an epoxide group to promote covalent attachment of the hexasubstituted benzene to the surface of the macroparticulates disclosed herein. In still another alternative, a compound comprising a nitrogen nucleophile may be functionalized with a hexasubstituted benzene or other group capable of promoting contaminant binding or adsorption after being reacted with the (meth)acrylic polymer or copolymer.

In some instances, instead of undergoing epoxide opening, poly(glycidyl (meth)acrylate) polymers and copolymers may undergo ester displacement in the presence of the nitrogen nucleophile to form an amide bond (e.g., by ester aminolysis). Amide bond formation may occur in combination with epoxide opening in the course of forming a reaction product of the present disclosure. As such, alternative modes of attachment of the nitrogen nucleophile to the macroparticulates are also contemplated herein.

When poly(glycidyl methacrylate) or a similar (meth)acrylic polymer or copolymer in the first polymerization state is reacted with a nitrogen nucleophile in the presence of a suitable base, the polymer and its rendered shape may undergo a morphological change when undergoing functionalization with the nitrogen nucleophile. In particular, the shape rendered to the polymer or copolymer in the first polymerization state may undergo expansion, such that the shape is less dense and has a larger volume following functionalization of the polymer or copolymer with the nitrogen nucleophile. That is, a profile of the predetermined shape may remain the same during functionalization, but the morphology and/or size of the shape may change. In a particular example, shaped poly(glycidyl methacrylate) and similar (meth)acrylic polymers and copolymers may undergo expansion and concurrent formation of an internal cavity in the course of undergoing functionalization with a nitrogen nucleophile. Spherical pre-functionalization shapes, for example, may form a hollow sphere upon functionalization with a nitrogen nucleophile. Other pre-functionalization shapes may similarly form an internal cavity upon functionalization, albeit with a more randomized exterior shape. Macroparticulate expansion and formation of the internal cavity in the presence of the nitrogen nucleophile and the base is especially surprising, since no shape expansion or cavity formation occurs when placing poly(glycidyl methacrylate) in the first polymerization state under the functionalization reaction conditions without both the nitrogen nucleophile and the base being present in the reaction medium. Functionalization may occur (via epoxide opening with the nitrogen nucleophile) without the base being present, but volume expansion and internal cavity formation may not occur. Indeed, functionalization in the absence of the base may lead to collapse of the pre-functionalization shape, rather than retention of the shape profile to afford a shape having an increased volume and/or decreased density. The extent of the volume expansion and the size of the internal cavity that results upon functionalization may vary depending upon the base used and the temperature at which the functionalization reaction is conducted. Thus, the combination of a nitrogen nucleophile and a suitable base may afford the surprising result of forming expanded poly(glycidyl methacrylate) macroparticulates and those comprising similar (meth)acrylic polymers and copolymers having an internal cavity, such as hollow spheres and the like. Advantageously, the internal cavity affords an inner surface that may increase the surface area available for contaminant removal from water or another substance undergoing remediation according to the disclosure herein.

Crosslinking of the poly(glycidyl methacrylate) or similar (meth)acrylic polymers and copolymers may occur in conjunction with forming the macroparticulates in the second polymerization state, or crosslinking may occur after the macroparticulates in the second polymerization state have been formed. Still further alternately, crosslinking may occur in the course of forming the first polymerization state, with nucleophilic functionalization of the crosslinked (meth)acrylic polymer or copolymer resulting in formation of the second polymerization state.

Suitable bases for forming macroparticulates comprising poly(glycidyl methacrylate) and similar epoxide-containing (meth)acrylic polymers and copolymers maintaining a profile from a predetermined shape but having an expanded volume and decreased density may include a tertiary amine base, such as trimethylamine, triethylamine, N,N-diisopropylethylamine (Hunig's base), 2,2,6,6-tetramethylpiperidine, 1,8-diazabicyclo[5.4.0]undec-7-ene (DBU), 1,5-diazabicyclo[4.3.0]non-5-ene (DBN), 4-dimethylaminopyridine (DMAP) and the like. Other mild Lewis bases may also be suitable for use in the disclosure herein. Unlike hindered, non-nucleophilic amine bases, inorganic hard bases, such as sodium hydroxide, do not lead to shapes having an expanded volume or formation of an internal cavity within the reaction product.

Management of water resources may be problematic in a number of industries generating large quantities of contaminated water, particularly in the oilfield industry. The complex fluid nature of produced water and other contaminated water sources may make remediation of the water difficult. Although batchwise purification processes may be sufficient in some instances, batchwise purification processes may be insufficient to keep pace with the significant quantities of contaminated water being produced. At present, continuous, in-line purification processes may be limited in their ability to determine rapidly enough the complex fluid nature of a contaminated water source and select a purification protocol suitable for promoting contaminant removal. Although water management issues of the foregoing type may be especially prevalent in the oilfield industry, water management and remediation issues may be similarly problematic for other industries and situations in which large quantities of water are generated as well. Macroparticulates formed according to the disclosure herein may aid in alleviating these difficulties in many instances.

Treatment fluids are also used extensively in the oilfield services industry. Treatment fluids oftentimes need to be formulated with relatively pure water having a known contaminant profile in order for the treatment fluid to function properly. Commercial drinking water, water having a specified contaminant profile, or a formulated treatment fluid may need to be transported to a job site, often in a remote locale, in order to perform a treatment operation. In addition to water management logistics, water transportation costs may add significantly to the cost of performing a treatment operation. While it would be desirable to reuse produced water or flowback water generated at a job site, such as for formulating a treatment fluid, there is presently no effective way for processing such vast quantities of water efficiently in order to raise the purity level sufficiently and in significant enough volumes to facilitate reuse thereof. Again, the macroparticulates of the present disclosure and remediation systems utilizing the same may facilitate processing of large fluid volumes obtained in various situations.

In support of the foregoing, the remediation methods and systems of the present disclosure employ macroparticulates containing moieties suitable for removing one or more contaminants from water in need of contaminant remediation. The macroparticulates employed within the remediation methods and systems may be differentially functionalized such that they are effective for sequestering a particular contaminant of interest. Multiple functionalized variants of the macroparticulates may be incorporated in the remediation methods and systems disclosed herein in order to support particular application-specific needs, such as to promote sequestration of multiple types of contaminants.

Particular examples of nitrogen nucleophiles that may be suitable for functionalizing (meth)acrylic polymers and copolymers in the disclosure herein include ligand molecules bearing a nitrogen nucleophile. Suitable ligands that may be used in the disclosure herein (e.g., to produce expanded macroparticulates from a predetermined shape) may include ligands such as ethylenediamine, iminodiacetic acid or a derivative thereof. Such ligands may have selectivity for divalent metal ions, particularly alkaline earth metal ions, wherein the metal-binding capabilities may be retained following covalent attachment to the macroparticulates through epoxide ring opening. The metal-binding capabilities may be retained, lost, increased, or altered when a hexasubstituted benzene becomes further associated with the surface of the macroparticulates in the manner described in greater detail hereinbelow, depending upon how association takes place. Other aminopolycarboxylic acids, such as glutamic acid diacetic acid, methylglycine diacetic acid, or the like may also be suitable ligands for use in functionalizing the macroparticulates according to the disclosure herein. Similarly, other $C_2$-$C_8$ alkylenediamines, such as 1,3-propanediamine, 1,4-butanediamine, 1,5-pentanediamine, and 1,6-hexanediamine, may also be suitable for functionalizing the (meth)acrylic polymers and copolymers according to the disclosure herein, wherein further functionalization of the alkylenediamine may take place after a reaction with the macroparticulates takes place. Should the amine group be protonated, particularly when functionalizing the macroparticulates with an aminopolycarboxylic acid, the free base form of the amine group may be generated by neutralization prior to promoting functionalization according to the disclosure herein. Polyamines, including branched polyamines, may also be reacted with the macroparticulates and then further functionalized after a reaction with the macroparticulates takes place. Other ligands or compounds comprising a nucleophilic nitrogen atom and having selectivity for alternative metal species will be familiar to one having ordinary skill in the art. The ligands or compounds may be further modified after reacting with the macroparticulates to provide selectivity for alternative contaminants as well. Ligands modified through further functionalization may retain selectivity for one or more contaminants originally capable of associating with the ligand, or a different selectivity profile may be realized through functionalization. Functionalization may occur upon any atom of the ligand or compound. In particular examples, an unreacted amine group from a $C_2$-$C_8$ alkylenediamine or a polyamine (e.g., tris(aminoethyl)amine or N,N'-bis(aminoethyl)ethylenediamine) may undergo further functionalization after a first amine group has reacted with the macroparticulates.

Depending on particular application needs and the type of macroparticulate functionalization chosen, a wide of range contaminants may be at least partially removed from a water source in need of contaminant remediation. Compounds bearing a nitrogen nucleophile that may be suitably used to promote epoxide ring opening or aminolysis include those that, innately or after further functionalization, are selective for contaminants such as divalent metals, such as calcium, magnesium, barium or strontium; monovalent metals, such as lithium (including the hydrated form thereof), sodium, potassium, rubidium or cesium; selective for monovalent anions such as chloride, bromide or iodide; transition metals (including lanthanides and/or actinides), particularly divalent and trivalent transition metals; polyatomic anions such as $BO_4^-$, $SO_4^{2-}$, or $PO_4^{3-}$; or hydrophobic substances. Selectivity for any of the foregoing species may be present in the compound bearing the nitrogen nucleophile or after further functionalizing the compound following its reaction with the epoxide-containing meth(acrylic) polymer or copolymer. Binding affinity for any of these substances may also be conferred by a hexasubstituted benzene, when present. Suitable examples of ligands bearing a nitrogen nucleophile and having binding selectivity for the above classes of substances will be familiar to one having ordinary skill in the art. Iminodiacetic acid, for example, may be an advantageous compound for sequestering divalent metal ions, such as calcium, magnesium, and barium. In many embodiments, metals are positively charged and are suitable for sequestration using the macroparticulates disclosed herein. Positively charged substances other than metals, such as cationic organic surfactants, may also be suitably sequestered in some instances, for example. Radioactive metals, particularly naturally occurring radioactive metals, such as uranium, thorium and/or radium, may be sequestered and analyzed through use of the macroparticulates described herein in the presence of a suitable ligand. Other naturally occurring radioactive materials that may be sequestered and/or analyzed using the macroparticulates include, for example, potassium, cesium, strontium, barium, radium, radon, and iodine. Similarly, amino acid ligands bearing a pendant side chain comprising a quaternized amine, guanadinium, imidazolium, morpholinium, phosphonium, boronate, boronic ester, or sulfonium may be suitable for sequestering and analyzing negatively charged contaminants. Negatively charged contaminants that may be analyzed through use of the disclosure herein include, for example, monovalent or polyvalent anions, organic acids (e.g., fatty acids), anionic surfactants and the like. In particular examples, naphthenic acids and other carboxylic acids associated with the oilfield services industry may be suitably analyzed through use of the disclosure herein, particularly when an amine group upon the functionalized macroparticulates bears a positive charge. Amine-containing ligands bearing one or more hydrogen bond donor groups, such as amides, ureas, or carbamates, may also be suitably used in conjunction with the macroparticulates disclosed herein. The binding selectivity demonstrated by the compound containing the nitrogen nucleophile may be leveraged to promote analyte detection or contaminant sequestration in the disclosure herein. Additional sensing functionality or contaminant sequestration capabilities may be introduced through strategically chosen functionality upon a hexasubstituted benzene adhered to the macroparticulates or additional functionalization added to the compound comprising the nitrogen nucleophile.

The hydrophobicity of the macroparticulates may be varied through reacting monoamines having a range of alkyl chain lengths, such as primary or secondary alkylamines having $C_2$-$C_{30}$, or $C_2$-$C_{16}$, or $C_2$-$C_{10}$ alkyl substitutions. The extent of hydrophobicity conveyed to the macroparticulates by the alkylamine may impact the adsorption of hydrophobic analytes, as a non-limiting example.

Supramolecular receptors such as crown ethers, porphyrins, cryptands, calixarenes, and the like may similarly be introduced to the macroparticulates via a reaction of a nitrogen nucleophile with a functional group upon the macroparticulates, such as an epoxide group in epoxide-containing (meth)acrylic polymers and copolymers. Alternately, a polyamine may functionalize the macroparticulates, and an unreacted amine extending from a surface portion of the macroparticulates may be used to promote covalent bonding to a supramolecular receptor bearing complementary functionality. As a non-limiting example, a supramolecular receptor bearing a carboxylic acid or carboxylic acid chloride may be reacted with an amine to produce an amide-linked supramolecular receptor upon the surface portion of the macroparticulates. Structures of suitable supramolecular receptors will be familiar to one having ordinary skill in the art. Supramolecular receptors may comprise a preorganized binding element to orient the binding groups in three-dimensional space in a desired way. Preorganization may create binding areas in which the entropy of binding an analyte is minimized. Without being constrained by any particular theory or mechanism, supramolecular receptors have the ability to complex one or more target analytes or similar substances through formation of complexes by charge pairing, hydrogen bonding, charge transfer, ion-dipole interactions, hydrophobic effects, or any combination thereof. To aid in these binding events, the supramolecular receptors may feature groups paired to complementary functionality in the target analyte designed receptors typically comprise complementary groups to the target analyte, such as to promote hard-soft acid-base interactions or another suitable molecular binding motif. To maintain electrical neutrality, these supramolecular receptors may contain an ionizable group that complements the charge in the analyte or similar substance. In an exceptional example, preorganization of a supramolecular receptor may be aided with a hexasubstituted benzene, as described further herein.

It is to be appreciated that the concepts herein may be extended to remediation of contaminated fluids other than water, as well as gases. Other fluids that may be remediated using the macroparticulates of the present disclosure include, for example, oil, blood, urine, other bodily fluids, and similar complex fluids. Emulsified fluids with water and/or gas may similarly be remediated using the macroparticulates disclosed herein.

Thus, by placing suitably functionalized macroparticulates in contact with a substance in need of contaminant remediation, such as contaminated water (including water with unknown contaminants, industrial waste water, process water, ground water, produced water, flowback water, etching or digestion water from electronics processing waste water streams, water from precious metal refining, water from catalyst waste refining, geothermal brines or the like), removal and/or detection of one or more contaminants may be accomplished by the present disclosure. Advantageously, the macroparticulates of the present disclosure may provide a large contact area for promoting contaminant sequestration, particularly when disposed within a continuous flow line. The macroparticulates may be housed in a suitable cartridge or similar storage medium, such as a filter pod, when acting in the foregoing manner.

Substances bound to the macroparticulates may be recovered in some instances, such as through acid decomplexation of a metal from a ligand or mechanically separating a bound hydrophobic material. The macroparticulates may effectively concentrate a contaminant or similar substance, which may be subsequently recovered as a valuable resource, if desired. Once no longer laden with an analyte or similar substance of interest, the macroparticulates may be reused for conducting further contaminant sequestration. In addition to acid treatments, other techniques for recovering substances bound to the macroparticulates may include, for example, treatment of the macroparticulates with a base, oxidizing agent, reducing agent, a high-concentration salt solution (e.g., saturated) to promote competitive displacement, a solvent, a surfactant solution, and any combination thereof. Pyrolysis may be employed to recover the substance (e.g., as a metal oxide) if recycling of the macroparticulates themselves is not a concern. Similarly, mechanical removal of a bound substance from the macroparticulates may take place in some instances. Chemical treatments may create a less favorable binding environment, thereby facilitating release of a substance from the macroparticulates.

In still another particular example, the macroparticulates of the present disclosure may be configured to bind and/or analyze sulfur-containing compounds, such as hydrogen sulfide, sulfur dioxide, sulfur trioxide, alkyl sulfides, alkyl mercaptans, inorganic sulfides, and the like. A moiety for binding such sulfur-containing compounds may be introduced before or after forming the macroparticulates. Sulfate scales, for example, may be suitably analyzed through use of the disclosure herein. The macroparticulates may also be used in conjunction with remediating sulfate scale using similar chemistry, for example. In addition or alternately, the macroparticulates may be used in conjunction with monitoring corrosion occurring in the presence of acids and/or sulfur-containing compounds.

When remediating sulfur-containing compounds from a compound in need of contaminant remediation, reversible covalent bond formation through a reduction-oxidation (redox) reaction promoted by complementary species may be used. For example, macroparticulates covalently functionalized with an organoselenium compound attached to the surface may promote a redox reaction to form a temporary sulfur-selenium bond. The sulfur-selenium bond formation may serve as a basis for sequestering and/or detecting the sulfur-containing compound. Upon subsequent recovery operations, the sulfur may be liberated into a stable sulfur-containing species that is less toxic. For example, hydrogen sulfide may be captured by an organodiselenide appended to the macroparticulates to form a selenium-sulfur-selenium bond, thereby capturing the highly toxic hydrogen sulfide until it can be safely and purposely liberated. Using common reducing agents, the captured sulfur may be converted to elemental sulfur, for example. Alternatively, common oxidizing agents may convert the captured sulfur to sulfate, for example.

In any embodiment, the contaminant may be released from the macroparticulates after binding and/or analysis thereof. Release of the contaminant may occur under equilibrium conditions, or a reagent may be added to promote release of the contaminant, such as through creating a less favorable binding condition. For example, an acid may be contacted with the macroparticulates to promote release of a metal contaminant. Pressing or squeezing may be conducted to promote mechanical release of adsorbed hydrophobic contaminants in some cases. Other reagents and conditions for releasing a contaminant from the macroparticulates are discussed above.

Release of a contaminant from the macroparticulates may be conducted under static conditions or under continuous flow conditions. Static release of a contaminant from the macroparticulates may be conducted by contacting contaminant-laden macroparticulates with a reagent for a period of time and then separating the macroparticulates following release of the contaminant. The period of time may vary depending upon the extent of release needed, the type of reagent being employed, and the like. Removable cartridges containing contaminant-laden macroparticulates may be opened, if needed, and refilled with fresh macroparticulates, or macroparticulates in removable cartridges may be regenerated under static conditions or continuous flow conditions without removing the macroparticulates therefrom. More desirably, a contaminant may be removed by subjecting contaminant-laden macroparticulates to a flow condition suitable to promote release of the contaminant. For example, a continuous acid flow may be utilized to remove a metal from the macroparticulates, wherein the metal may be conveyed from the macroparticulates within a fluid stream for subsequent recovery of the metal.

In non-limiting embodiments, the macroparticulates of the present disclosure may be used in conjunction with meeting discharge standards by sequestering one or more contaminants from a fluid source. Differentially functionalized macroparticulates may be exposed to the fluid source in sequence in order to accomplish this result. For example, first macroparticulates functionalized to sequester a first contaminant may be used in sequence with second macroparticulates functionalized to sequester a second contaminant, and so on. Conventional binders for one or more contaminants may be exposed to the fluid source before or after exposure of the macroparticulates thereto, wherein the macroparticulates may afford "rough cut" removal of potentially interfering contaminants prior to conducting more detailed analyses with either the conventional binders or additional macroparticulates. In non-limiting embodiments, macroparticulates configured to sequentially remove sulfur-containing compounds, surfactants and charged organic compounds, neutral organic compounds, transition metals (including lanthanides and/or actinides), and alkali and/or alkaline earth metals may precede macroparticulates or a conventional binder for analyzing a component of interest in a fluid source or further remediating the fluid source. The macroparticulates for removing the foregoing species may be mixed together or arranged in sequence to provide a remediated stream having a decreased concentration of one or more contaminants of interest.

Continuous sequestration and analysis procedures may be facilitated through use of the disclosure herein, wherein a substance in need of contaminant remediation is exposed to a bed or cartridge of the macroparticulates or differentially functionalized macroparticulates arranged in sequence. Cartridges may come in many forms and include any structure capable of containing the macroparticulates over a time during which the macroparticulates are in contact with the fluid. As non-limiting examples, cartridges may be made of a rigid material, such as plastic, that is machined or molded to allow fluid access to the interior of the cartridge, or paper or cloth socks, bags, or the like may be used to contain the macroparticulates. Cartridges of any type may be refillable or disposable. The substance in need of contaminant remediation, such as contaminated water, may be flowed through the bed or cartridge(s) of macroparticulates multiple times until a desired contaminant level is reached, or a single pass may achieve sufficient purity in some instances. Although such flow-through processes may be advantageous, particularly for remediating or analyzing large volumes of a fluid source, it is to be appreciated that the separation principles described herein may be applicable to batch-type separation processes as well, including batch-type processes in which the fluid statically contacts the macroparticulates. In either case, the macroparticulates of the present disclosure may facilitate transport of a contaminant such as a metal ion from a first aqueous phase to a second aqueous phase without the metal ion having to cross an intermediate immiscible organic phase. The macroparticulates of the present disclosure may therefore replace the immiscible organic phase characterizing other purification processes that may be commonly used in conjunction with remediating a fluid source comprising a substance in need of contaminant remediation. Transfer of a metal ion from a first aqueous phase to a second aqueous phase may be accomplished by sequestering the metal ion upon the macroparticulates from the first aqueous phase and then treating with a decomplexing agent, such as an acid, in the second aqueous phase to promote release of the metal ion.

Some embodiments of the present disclosure may include recovering a contaminant of interest from the macroparticulates as a valuable resource. In the case of one or more metals captured by the macroparticulates, the macroparticulates may be separated from a remediated water stream and then undergo a decomplexation reaction to recover the one or more metals. In some instances, decomplexation may be accomplished by exposing the macroparticulates to an aqueous acid. Other suitable reagents and conditions for promoting decomplexation are discussed above. Alternately, the macroparticulates and their associated ligands may be pyrolyzed to recover the one or more metals as an oxide residue. Hydrophobic substances may be recovered by exposing the macroparticulates to a larger quantity of a low-value hydrophobic material that may competitively displace a higher-value hydrophobic substance from the macroparticulates. Solvents and surfactant solutions may be used similarly. Alternately, one may apply a mechanical load and physically press (squeeze) captured hydrophobic materials, such as oil, from the macroparticulates.

Hexasubstituted benzenes present in combination with a nitrogen nucleophile to promote macroparticulate functionalization and/or expansion may bear additional functional groups that may further tailor the properties of the macroparticulates. In particular examples, the hexasubstituted benzenes may bear further functionality for interacting with a contaminant of interest, such as a metal ion in a non-limiting example, and spectroscopically detectable functional groups to promote detection of the metal ion bound by the hexasubstituted benzene. The metal ions bound by the hexasubstituted benzene may be the same as or different than any metal ions bound by a compound bearing the nitrogen nucleophile used to promote epoxide ring opening or by a compound further functionalized after promoting epoxide ring opening. Suitable hexasubstituted benzenes bearing functionality for reacting with the ring-opening reaction product of an epoxide with a nitrogen nucleophile are discussed further below.

Alternately, a hexasubstituted benzene may bear a nitrogen nucleophile to promote epoxide ring opening directly without a separate nitrogen nucleophile first opening the epoxide group. Suitable hexasubstituted benzenes bearing functionality capable of promoting epoxide ring opening and also containing further functionality suitable for metal binding, analyte sensing and/or contaminant remediation are also further discussed below.

Because certain functionalized poly(glycidyl methacrylate)s and similar (meth)acrylic polymers and copolymers of the present disclosure may bear a ligand introduced during epoxide ring opening, macroparticulates comprising such functionalized poly(glycidyl methacrylate)s described herein may be effective to promote sequestration of metals, according to various embodiments. Iminodiacetic acid, for example, may be advantageous for sequestering divalent metal ions, such as calcium, magnesium, and barium, even when incorporated in a macroparticulate. Thus, by placing macroparticulates comprising poly(glycidyl methacrylate) or a similar (meth)acrylic polymer or copolymer in contact with a metal-containing fluid, removal and/or detection of one or more metal ions within the fluid may be realized. In addition to divalent metal ions, one or more naturally occurring radioactive materials may be sequestered upon the macroparticulates as well. Advantageously, since the macroparticulates described herein have both an inner surface and an outer surface by virtue of an internal cavity, the macroparticulates may provide a large contact area for promoting metal sequestration and/or detection. Additional metal sequestration capabilities or other capabilities may be promoted by the presence of a hexasubstituted benzene upon the macroparticulate surface as well.

Particular functionalized (meth)acrylic polymers bearing ligands suitable for sequestering iron or barium may be synthesized as shown in Schemes 1 and 2 below, respectively.

Scheme 1

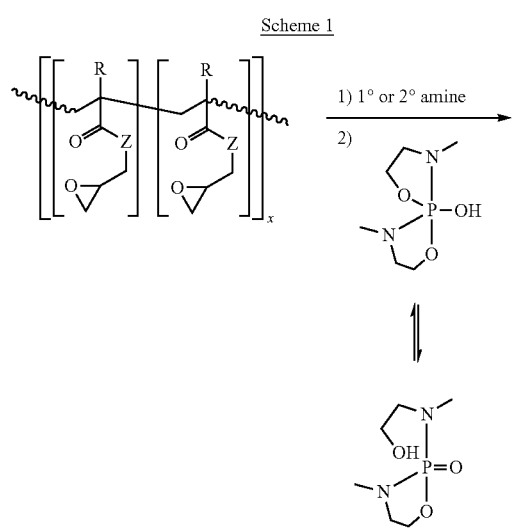

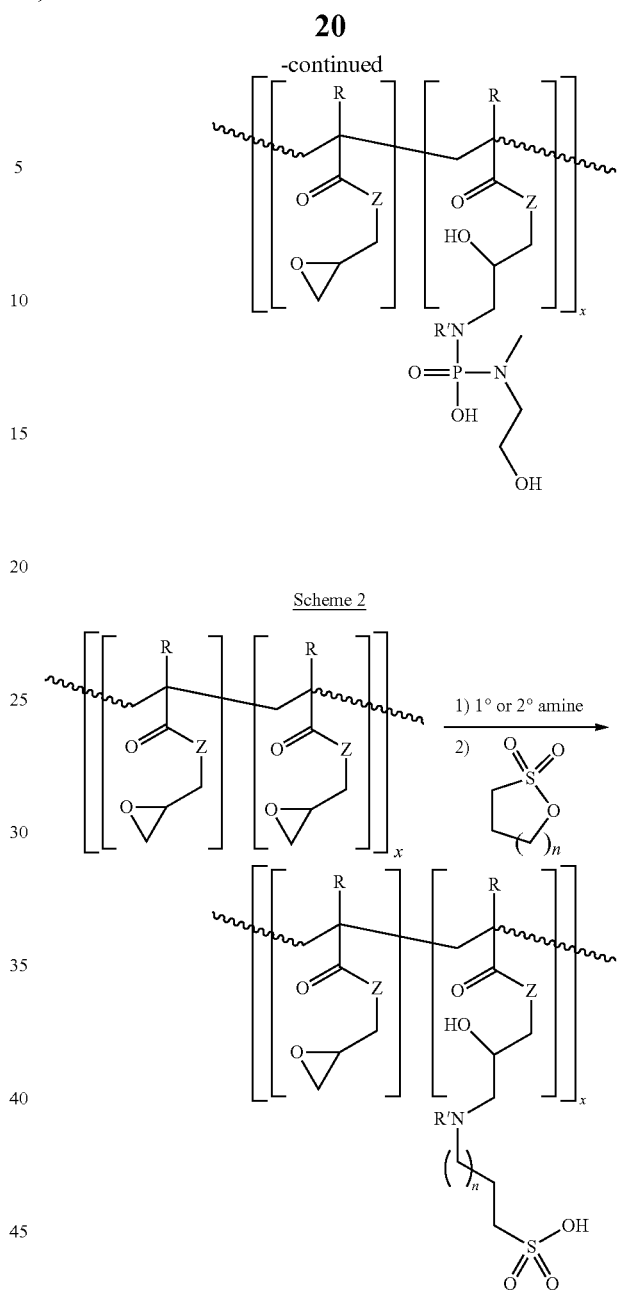

Scheme 2

In Schemes 1 and 2, R' is a $C_1$-$C_{30}$ hydrocarbyl group introduced from the primary or secondary amine, which may be optionally substituted, and variable x is defined as above. In a more specific example, R' may be a $C_1$-$C_{10}$ alkyl group. In Scheme 2, n is an integer ranging from 0 to 2, and most typically 1 or 2. The functionalized (meth)acrylic polymer depicted in Scheme 1 may be selective for sequestering iron, and the functionalized (meth)acrylic polymer depicted in Scheme 2 may be selective for sequestering barium.

The phosphorane reagent in Scheme 1 and similar analogues may be conveniently prepared by reacting a phosphorus oxyhalide with an amino alcohol, preferably in the presence of a tertiary amine base, such as triethylamine. Suitable phosphorus oxyhalides may include, for example, phosphorus oxychloride, phosphorus oxybromide, or any combination thereof. Suitable amino alcohols may include any alkanolamine or N-alkylalkanolamine, such as ethanolamine, 1,3-propanolamine, 1-amino-2-propanol, 2-amino-1-propanol, or any N-alkylated variant of these alkanolamines. Suitable N-alkyl substitutions for N-alkylated variants may include, for example, methyl, ethyl, propyl, isopropyl, butyl, isobutyl, t-butyl, pentyl, isopentyl, hexyl, isohexyl, and the like. Cycloalkyl groups, such as cyclopropyl, cyclobutyl, cyclopentyl, cyclohexyl, substituted variants thereof, and the like, are also encompassed by the term alkyl and may suitably substitute the amine group of the phosphorane reagent as well. The phosphorane reagent may have a trigonal bipyramidal geometry or distorted variant thereof and exist as a plurality of axial and equatorial isomers in equilibrium between open- and closed-chain forms, as illustrated in Scheme 1. The fluxional nature of the phosphorane reagent used in Scheme 1 is further illustrated in FIGS. 15 and 16, which show $^1$H and $^{31}$P NMR spectra, respectively. Such phosphorane reagents may exhibit electrophilic reactivity toward alcohols, phenols, and primary or secondary amines, thereby affording multiple routes for a reaction to occur when functionalizing macroparticulates according to the disclosure herein.

In non-limiting examples, suitable sultone reagents used in Scheme 2 may be prepared by cyclization of haloalkanesulfonic acids, hydroxyalkanesulfonic acids, sulfonation of alkenes with sulfur trioxide, or other methods familiar to persons having ordinary skill in the art. 1,3-propanesultone, for example, may be synthesized by reacting allyl alcohol with sodium bisulfite under acid-catalyzed conditions.

Accordingly, macroparticulates of the present disclosure may comprise a reaction product of an epoxide-containing (meth)acrylic polymer or copolymer and a compound bearing a nitrogen nucleophile, particularly a ligand molecule bearing a nitrogen nucleophile. The epoxide-containing (meth)acrylic polymer or copolymer is formed into a predetermined shape prior to conversion into the reaction product. A profile of the predetermined shape may be substantially maintained after forming the reaction product, such that the same type of shape is present, but it is larger and/or less dense than that initially present. The reaction product may have a larger volume than does the predetermined shape from which the reaction product was produced. The reaction product may have an internal cavity after reacting the epoxide-containing (meth)acrylic polymer or copolymer with the nitrogen nucleophile. The (meth)acrylic polymer or copolymer may be further functionalized after reacting with the nitrogen nucleophile to afford a desired contaminant-binding profile to the macroparticulates. In non-limiting examples, the macroparticulates may be functionalized with a hexasubstituted benzene, as described further herein.

Particular contaminants that may be removed from a fluid in need of contaminant remediation include various metal salts. Suitable examples that may be sequestered with the macroparticulates disclosed herein include, for example, an alkali metal ion, an alkaline earth metal ion, a halide ion, a phosphate, a nitrate, a borate, an arsenate, a silicate, a selenite, a titanium ion, a chromium ion, a manganese ion, an iron ion, a ruthenium ion, an osmium ion, a cobalt ion, a rhodium ion, an iridium ion, a nickel ion, a palladium ion, a platinum ion, a copper ion, a silver ion, a gold ion, a zinc ion, a cadmium ion, a mercury ion, an aluminum ion, a boron ion, and any combination thereof. More particular examples include, for instance, divalent metal cation, a barium cation, an iron (II) cation, an iron (III) cation, a sulfate anion, and any combination thereof.

The macroparticulates of the present disclosure may also be useful to adsorb hydrophobic contaminants from a water source due to the hydrophobicity of their polymer backbone. Hydrophobic contaminants that may be removed from a water source through adsorption onto one or more surfaces of the macroparticulates include, for example, hydrocarbons, oil, oil components, or any combination thereof. Adsorption of hydrophobic contaminants when remediating a water source using the macroparticulates may take place concurrently with removal of metal(s) or anions (e.g., through ligand binding), or hydrophobic contaminant removal may take place without removal of other substances occurring. Certain ligands also may themselves be hydrophobic, thereby augmenting the sequestering of hydrophobic substances promoted by the polymer backbone.

Figure 1B:
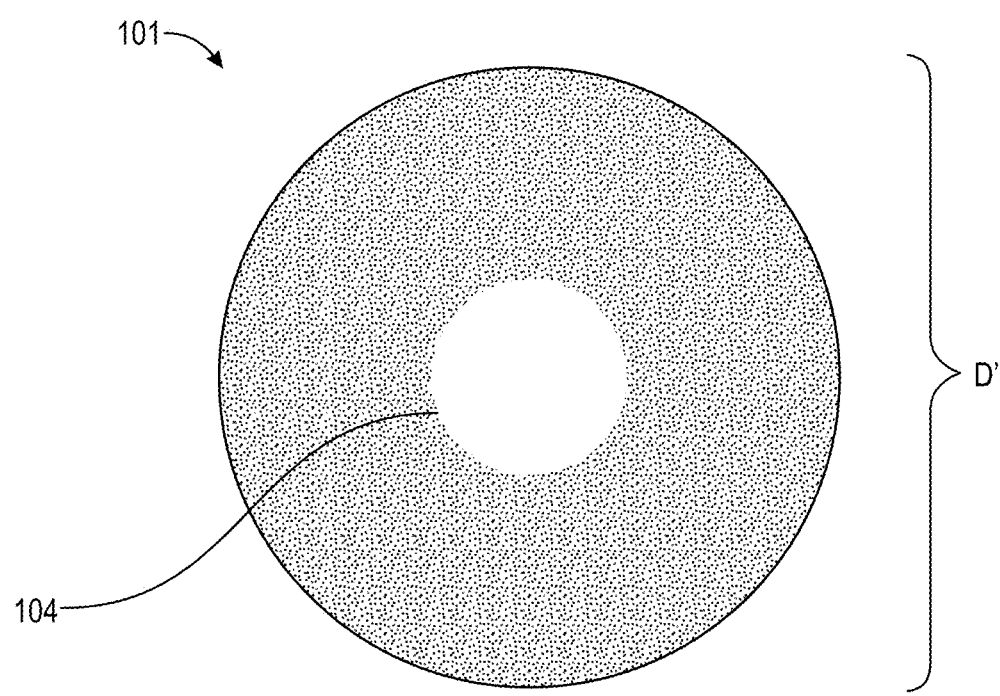

FIGS. 1A and 1B show diagrams of a macroparticulate before and after functionalization with a compound bearing a nitrogen nucleophile, respectively. FIG. 1A shows macroparticulate 100 having diameter D before undergoing functionalization and expansion. FIG. 1B shows macroparticulate 101 formed from macroparticulate 100 according to the disclosure herein. As shown, macroparticulate 101 has an expanded diameter D' and internal cavity 104 has formed therein.

Macroparticulates produced according to the disclosure herein and suitable for use in contaminant remediation processes may be formed from a pre-functionalization, extruded shape having a diameter of about 1.5 mm to about 2.5 mm, typically about 2.25 mm. Spherical post-functionalization shapes formed from such extrudates (after rolling in a pre-functionalization spherical shape) may have an effective diameter ranging from about 5.5 mm to about 11 mm, or about 6.2 mm to about 8.6 mm, or about 6.2 mm to about 10.5 mm, or about 6 mm to about 6.5 mm, or about 6.5 mm to about 7.0 mm, or about 7.0 mm to about 7.5 mm, or about 7.5 mm to about 8.0 mm, or about 8.0 mm to about 8.5 mm, or about 8.5 mm to about 9.0 mm, or about 9.0 mm to about 9.5 mm, or about 9.5 mm to about 10.0 mm, or about 10.0 mm to about 10.5 mm, or about 10.5 mm to about 11.0 mm. Depending on shape, non-spherical shapes may have effective diameters (cross-sectional dimensions) ranging from about 5.0 mm to about 11.5 mm, or about 5.0 mm to about 6.0 mm, or about 6.0 mm to about 7.0 mm, or about 7.0 mm to about 8.0 mm, or about 8.0 mm to about 9.0 mm, or about 9.0 mm to about 10.0 mm, or about 10.0 mm to about 11.0 mm.

Residual solvent content within the pre-functionalization shape formed from the epoxide-containing (meth)acrylic polymer or copolymer may influence the amount of expansion that occurs. In non-limiting embodiments, the residual solvent content may be substantially 0 wt. %, or range from about 0.01 wt. % to about 50 wt. %, or about 0.1 wt. % to about 30 wt. %, or about 0.5 wt. to about 20 wt. %, or about 1 wt. % to about 15 wt. %, or about 1 wt. % to about 40 wt. %, or about 5 wt. % to about 25 wt. %.

At least a portion of the epoxide groups in the epoxide-containing (meth)acrylic polymer or copolymer may undergo opening with the nitrogen nucleophile when forming the reaction product. The fraction of epoxide groups undergoing opening may be determined by the reaction conditions and the amount of nitrogen nucleophile supplied to the epoxide-containing (meth)acrylic polymer or copolymer, which may be in a first polymerization state prior to being functionalized and in a second polymerization state after being functionalized with the nitrogen nucleophile. After functionalization, the polymer or copolymer comprising the reaction product may have a random distribution of nucleophile-functionalized monomers (obtained by epoxide ring opening) and epoxide-functionalized monomers that have not undergone a ring-opening reaction. The polymer may be further crosslinked in the first polymerization state or while forming the second polymerization state. Compound 4 shows an illustrative formula representing the structure of a ligand-functionalized (meth)acrylic polymer after functionalization with a nitrogen nucleophile, specifically poly(glycidyl methacrylate) or a variant thereof functionalized with iminodiacetic acid, wherein the sum of y plus z is greater than or equal to x and the other variables are defined as above. Variable y represents the mole fraction of unfunctionalized (meth)acrylic monomers and variable z represents the mole fraction of functionalized (meth)acrylic monomers. The mole fraction of functionalized (meth)acrylic monomers may range from about 1 mol. % to about 99 mol. %, or about 10 mol. % to about 90 mol. %, or about 20 mol. % to about 50 mol. %.

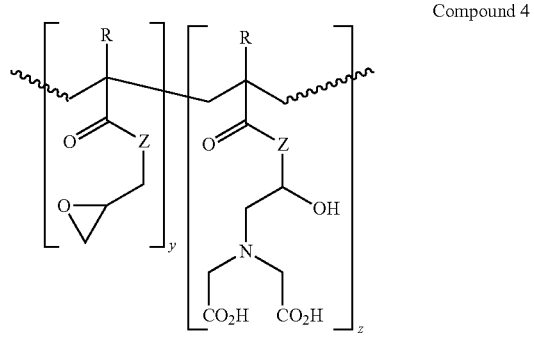

Compound 4

It is to be appreciated that the functionalized poly(glycidyl methacrylate) represented by the structure shown in Compound 4 is illustrative in nature. Other functionalized poly(glycidyl methacrylate) polymers or copolymers prepared via epoxide opening with different nitrogen nucleophiles will have corresponding structures. For example, the structure represented by Compound 5 is the corresponding reaction product formed when poly(glycidyl methacrylate) or the amide analog thereof and ethylenediamine undergo a reaction with one another.

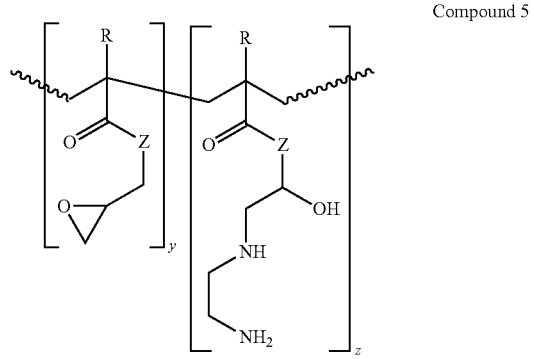

Compound 5

Polymers having a structure represented by Compound 5 and similar polymers formed by reaction with a polyamine may be further functionalized as described in more detail below. Further, crosslinking through epoxide ring opening may occur with any of these polymers in some instances as well.

The macroparticulates may be formed in any shape prior to undergoing functionalization according to the disclosure herein, either with a nitrogen nucleophile, directly with a nitrogen nucleophile upon a hexasubstituted benzene, or sequentially with a nitrogen nucleophile followed by a reaction with a hexasubstituted benzene or another functionalizing species, such as a supramolecular receptor. In illustrative embodiments, the macroparticulates may be substantially spherical, disk-shaped or cylindrical prior to undergoing functionalization. Sizes of the macroparticulates that may be formed in the disclosure herein are provided above. A profile of the predetermined shape may be maintained following functionalization.

Still other examples of macroparticulates formable according to the disclosure herein may be produced by further functionalizing a (meth)acrylic polymer or copolymer previously reacted with a polyamine. As used herein, the term "polyamine" refers to any compound comprising two or more amine groups, more particularly a diamine, a triamine, a tetraamine, or a pentaamine, any of which may be straight-chain or branched. Suitable polyamines may include, but are not limited to, ethylenediamine, tris(aminoethyl)amine, N,N'-bis(aminoethyl)ethylenediamine, and the like. Combinations of polyamines may also be used, such as a mixture of tris(2-aminoethyl)amine and ethylenediamine in a molar ratio ranging between about 1:99 to about 99:1. In illustrative embodiments, a mixture comprising about 10% tris(2-aminoethyl)amine and about 90% ethylenediamine may undergo a reaction with the macroparticulates in the disclosure herein. A first amine group of the polyamine may open at least a portion of the epoxide groups in the (meth)acrylic polymer or copolymer, thereby resulting in expansion and morphological changes in the predetermined shape defining the macroparticulate. One or more unreacted amine groups may then undergo subsequent functionalization to introduce a moiety suitable for binding a contaminant according to the disclosure herein. As such, a (meth)acrylic polymer or copolymer formed as a macroparticulate and further reacted with a polyamine may provide a common intermediate (synthon) for introducing various moieties thereon for promoting binding to a specified contaminant. Further advantageously, the macroparticulate morphology established upon opening at least a portion of the epoxide groups under suitable conditions may be maintained when further functionalizing an amine according to the disclosure herein.

Macroparticulates prepared by opening epoxide groups within a (meth)acrylic polymer or copolymer with a polyamine and further functionalizing unreacted amine groups (e.g., with an electrophile) may have a structure represented by Compound 6 below

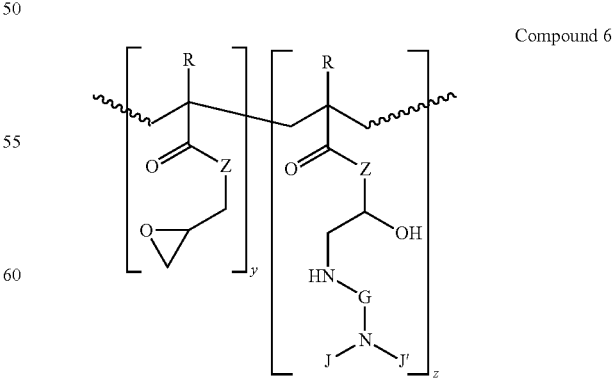

Compound 6 wherein G is a $C_2$-$C_8$ spacer group and J and J' are selected from H or a group having functionality suitable for analyzing or binding a contaminant of interest, provided that J and J' are not both H. J and J' may separately bind a contaminant of interest, or J and J' may operate cooperatively to promote binding and analysis. In non-limiting embodiments, J and J' may be introduced to the macroparticulates by reacting an electrophile with the unreacted primary amine group. Although not shown, it is to be appreciated that the secondary amine group in Compound 6 (arising from the amine group that opened the epoxide) may also undergo electrophilic functionalization in certain instances. Particular examples of J and J' are described further below. In specific embodiments, G may comprise an ethylene or propylene spacer group.

In more specific embodiments, G is $C_2$-$C_8$ alkylene group, introduced from a $C_2$-$C_8$ alkylenediamine, as shown by the structure represented in Compound 7 below

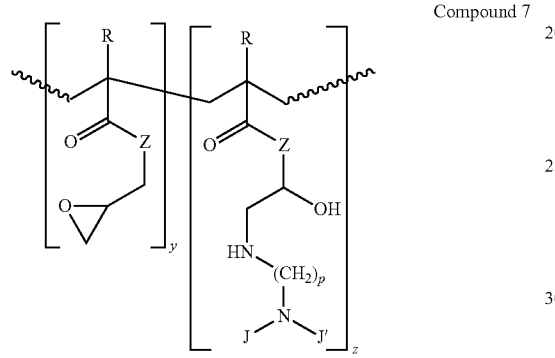

Compound 7 wherein p is an integer ranging from 2 to 8, and the other variables are defined as above, specifically wherein J and J' are not both H and the secondary amine may be optionally functionalized with J or J' in some instances. In particular examples, p may be 2 or 3.

In some embodiments, Compound 7 may be reacted with a haloacetic acid (e.g., chloroacetic acid or bromoacetic acid) to afford Compound 8A or a haloacetic acid alkylester (e.g., ethyl chloroacetate or ethyl bromoacetate) to afford Compound 8B. Compound 8B may be converted into Compound 8A by ester hydrolysis following functionalization of the amine with the haloacetic acid ester.

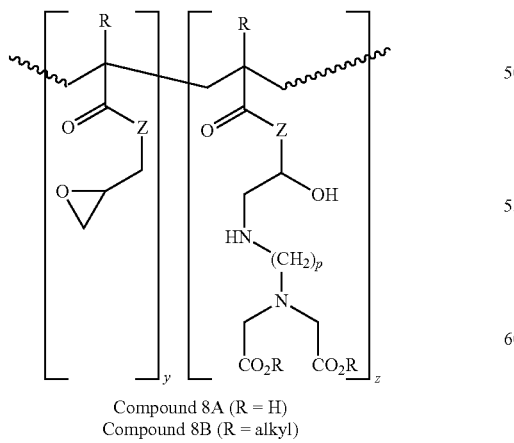

Compound 8A (R = H)
Compound 8B (R = alkyl)

Compound 8A is similar to Compound 4 above (prepared directly from iminodiacetic acid), but bears an additional $NH(CH_2)_p$ spacer, and may be suitable for binding divalent metals in the disclosure herein. Any of the divalent metals discussed above may become bound to Compound 8A.

In some embodiments, Compound 7 may be reacted with a phosphorane, specifically an oxazaphospholidine 2-oxide, to form a structure represented by Compound 9, which may have selectivity for binding iron.

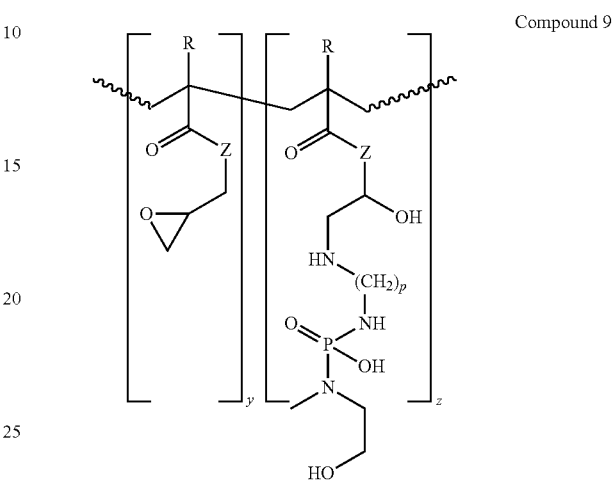

Compound 9

The reaction employed to convert the primary amine into a group capable of binding iron is similar to that shown in Scheme 1 above and may be better understood by reference thereto.

Another compound suitable for binding iron may be obtained by reacting Compound 7 with a catechol compound or catechol derivative bearing a carboxylic acid to afford an amide bond. In particular, the phenolic hydroxyl groups upon the catechol compound may be protected as acetate esters, for example, while reacting with the primary amine. The acetate esters may be hydrolyzed following formation of the amide bond to liberate a free catechol bound to the macroparticulate, which may be suitable for sequestering iron. A catechol-based compound for binding iron may have a structure represented by Compound 10 below. Alternately, the acetate-functionalized catechol may undergo ester hydrolysis in situ when contacting the macroparticulates with a substance containing iron.

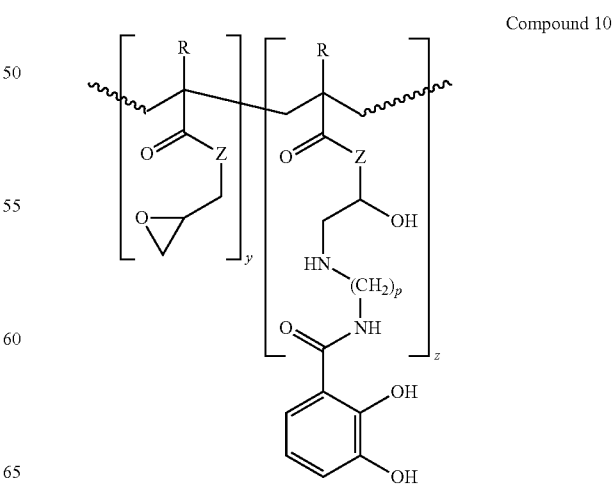

Compound 10

It is to be appreciated that the phenolic hydroxyl groups need not necessarily be located at the 2 and 3 positions of the aromatic ring and may also be suitably located at the 3 and 4 positions. Moreover, additional phenolic hydroxyl groups may be present upon the aromatic ring, as well as optional functionality.

In some embodiments, Compound 7 may be reacted with a sultone to afford Compound 11

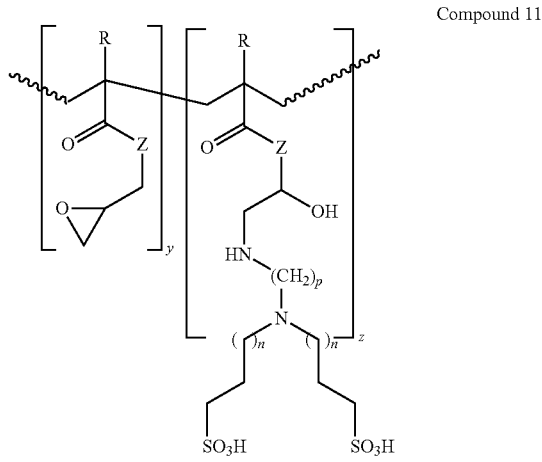

Compound 11 wherein n is an integer ranging from 0 to 2, preferably 1 or 2. Compound 11 may be particularly suitable for binding barium ions in the disclosure herein. The reaction to convert the primary amine into a group capable of binding barium ions is related to that shown in Scheme 2 above and may be better understood by reference thereto.

In some embodiments, Compound 7 may be reacted with 2-methylthioimidazoline to afford Compound 12, which may have selectivity for binding sulfate anions.

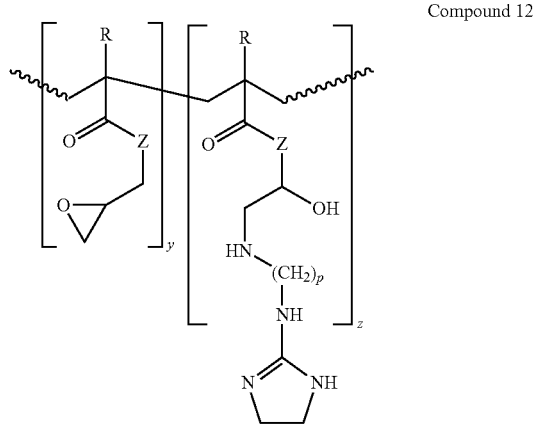

Compound 12

Again, it is to be appreciated that functionalization of the secondary amine in any of Compounds 8-12, although not shown, may occur in conjunction with functionalization of the primary amine. In addition, the primary amine may be functionalized with multiple occurrences of the functionalizing species in some instances.

Moreover, Compounds 8-12 show structures containing analyte-specific binding structures formed from a single primary amine. It is to be appreciated that precursors analogous to Compound 7 but having two primary amine groups may be prepared similarly and undergo functionalization in accordance with the disclosure above. Compound 13 below shows a representative structure having two primary amines, formed by reacting a dendritic polyamine, such as tris(aminoethyl)amine, with the epoxide-containing (meth)acrylic polymer or copolymer that may undergo further functionalization in accordance with the foregoing disclosure.

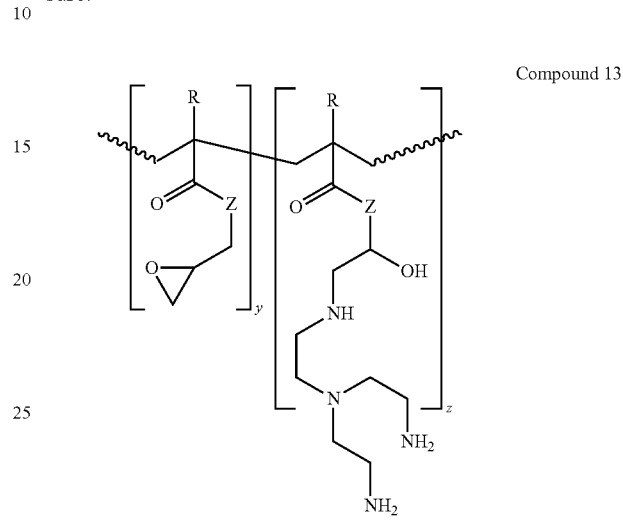

Compound 13

The macroparticulates of the present disclosure may further comprise a dye or similar tag adsorbed to a surface thereof for aiding analyses in which the macroparticulates are used. For example, a dye or similar tag may change colors when in contact with particular metal ions or other analytes, thereby providing an indication of the amount of contaminant that has become bound and/or when the macroparticulates have become saturated with contaminants. Advantageously, dyes and similar tags may be adsorbed onto the macroparticulates without having to perform an additional functionalization reaction. Without being bound by any theory or mechanism, the adsorption of dyes onto the surface of the macroparticulates is believed to result from complementary hydrophobic interactions between dye molecules and the hydrophobic polymer backbone. However, dyes with a similar surface energy may bind to macroparticulates with similar functionality. Nonpolar dyes may bind to macroparticulates that are more hydrophobic in nature, and charged dyes may bind to macroparticulates having charged groups. Suitable dyes may be chosen such that when they interact with a particular contaminant of interest, a change in absorbance, fluorescence or luminescence occurs, typically in the wavelength of about 400 nm to about 700 nm.

While the presence of an adsorbed dye or similar tag may be advantageous for monitoring a contaminant sequestration process of the present disclosure, it is to be appreciated that the contaminant sequestration processes disclosed herein may also be practiced without a dye or similar tag being present. For example, the macroparticulates may be replaced on a set schedule or after having contacted a set volume (and contaminant loading) of a substance in need of contaminant remediation.

An adsorbed dye may be present in combination with an adsorbed or covalently bound hexasubstituted benzene. The dye may be used to quantify the amount of contaminant present within a fluid, or a suitable group to promote detection of a metal ion or other bound substance upon the macroparticulates may be present within the hexasubstituted benzene. Thus, macroparticulates of the present disclosure may comprise two different types of spectroscopically detectable functionality in some instances, one group within an adsorbed dye and a second group within a hexasubstituted benzene. Hydrophobic contaminants may be adsorbed onto the surface of the macroparticulates as well, both with or without a dye or similar tag being present. Similarly, hydrophobic interactions between the polymer backbone and a hexasubstituted benzene may promote surface adsorption of the hexasubstituted benzenes to the surface of the macroparticulates as well.

Any colorimetric dye may be disposed upon the macroparticulates disclosed herein, either through hydrophobic adsorption or by covalent bonding to the macroparticulate surface. A particularly suitable dye for analysis of divalent alkaline earth metals is Arsenazo III. This dye has a different absorption maximum wavelength (lambda max) for calcium, magnesium, and barium. Thus, depending on which metal(s) are sequestered upon the macroparticulates, the differing lambda max values result in a different color change that is detectable spectrophotometrically or with the human eye. Dyes of this sort may self-associate with the functionalized macroparticulates through charge pairing and hydrophobic effects. Suitable techniques for introducing a dye upon the macroparticulates include salting out the dye by increasing the ionic concentration of an aqueous dye solution, thereby causing the dye to associate with the hydrophobic features of the macroparticulates. Similarly, solvent deposition employing a volatile solvent also may promote deposition of the dye upon the surface of the macroparticulates. Once associated with the macroparticulates, the dye may undergo selective color changes depending upon which metals are present. The extent of the color change may be indicative of the amount of the metals analytes that are present, up to saturation of the binding site within the dye. Hexasubstituted benzenes may be deposited and used for analyte detection in a similar manner, particularly hexasubstituted benzenes comprising a spectroscopically identifiable tag.

Other colorimetric dyes suitable for use in conjunction with the disclosure herein may include, for example, malachite green, brilliant green, crystal violet, erythrosin B, methyl green, methyl violet, picric acid, naphthol yellow S, quinaldine red, eosin Y, metanil yellow, m-cresol purple, thymol blue, xylenol blue, basic fuchsin, eosin B, cresol red, martius yellow, phloxine B, methyl yellow, bromophenol blue, congo red, methyl orange, bromochlorophenol blue WS, ethyl orange, fluorescein WS, bromocresol green, chysoidin, methyl red, alizarin red, cochineal, chlorophenol red, bromocresol purple, 4-nitrophenol, alizarin, nitrazine yellow, bromothymol blue, brilliant yellow, neutral red, rosolic acid, phenol red, 3-nitrophenol, orange II, phenolphthalein, o-cresolphthalein, Nile blue A, thymolphthalein, aniline blue WS, alizarin yellow GG, mordant orange I, tropaelin O, orange G, acid fuchsin, thiazol yellow G, and indigo carmine. Any of these dyes may be present in combination with a covalently bound or non-covalently adsorbed hexasubstituted benzene upon the surface of the macroparticulates. Moreover, any of these dyes may be covalently bonded to the macroparticulates or to a hexasubstituted benzene of the present disclosure as well.

Further advantageously, other hydrophobic substances may be adsorbed onto the hydrophobic surface(s) of the macroparticulates as well. Adsorption of hydrophobic substances may take place in conjunction with the contaminant sequestration features of the macroparticulates discussed above. Adsorption of hydrophobic substances, for example, may allow detection of these analytes to be realized using the macroparticulates. Adsorption of hydrophobic substances may occur without binding to a ligand or other compound bearing a nitrogen nucleophile.

In some instances, carboxylic acid groups or unreacted amine groups associated with the compound bearing the nitrogen nucleophile or the secondary alcohol obtained from epoxide ring opening may undergo a further reaction to covalently attach a hexasubstituted benzene bearing complementary functionality. The covalent bonding may result in covalent attachment of the hexasubstituted benzene to a surface of the macroparticulates.

More generally, functionalized (meth)acrylic polymers and copolymers bearing a hexasubstituted benzene may have structures represented by Compounds 14-16 below.

Compound 14

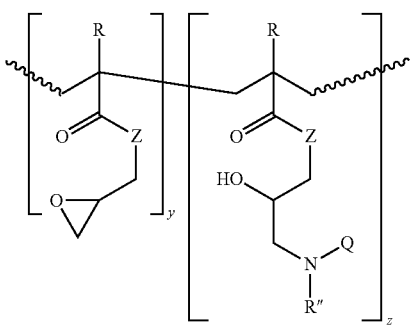

Compound 15

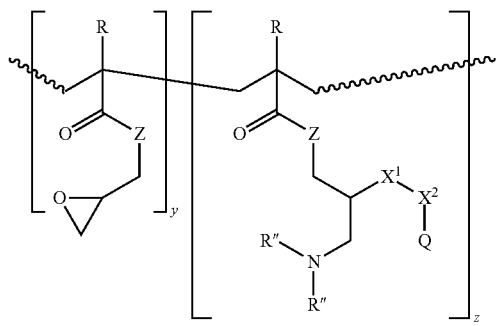

Compound 16

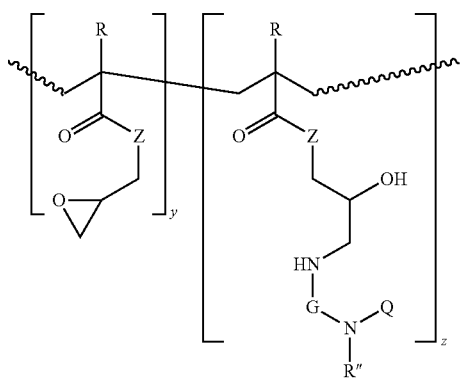

In Compounds 14 and 15, R" is H or a $C_1$-$C_{30}$ hydrocarbyl group, Q is a hexasubstituted benzene (optionally linked to the amine through a spacer group), $X^1$ is O or NR", $X^2$ is an optional spacer group, and the other variables are defined as above. In Compound 14, an amine-functionalized hexasubstituted benzene has directly promoted epoxide ring opening to attach the hexasubstituted benzene to the polymer. In Compound 15, a compound comprising an amine nucleophile has opened the epoxide ring, and the hydroxyl group resulting from epoxide ring opening has been further functionalized to covalently bond the hexasubstituted benzene to the (meth)acrylic polymer or copolymer. In non-limiting examples, the hydroxyl group may react nucleophilically with a suitable leaving group upon a hexasubstituted benzene, or the hydroxyl group may be converted into a leaving group (e.g., a halide or sulfonate), which may be subsequently reacted with a nucleophile upon the hexasubstituted benzene. In still other examples, the hydroxyl group may be functionalized with a spacer group, which contains a reactive functionality, such as a nucleophile, leaving group, alkene or alkyne, that may undergo a reaction with complementary functionality upon the hexasubstituted benzene to promote covalent attachment of the hexasubstituted benzene to the (meth)acrylic polymer or copolymer. In Compound 16, a diamine has reacted with the (meth)acrylic polymer or copolymer to promote epoxide ring opening, and the unreacted amine of the diamine has undergone further functionalization with complementary substitution upon the hexasubstituted benzene.

Macroparticulates of the present disclosure may be formed by methods comprising: providing an epoxide-containing (meth)acrylic polymer or copolymer in a first polymerization state, optionally crosslinking in the first polymerization state; forming the epoxide-containing (meth)acrylic polymer or copolymer into a predetermined shape; and exposing the predetermined shape to a compound bearing a nitrogen nucleophile in a solvent to form a reaction product comprising a macroparticulate. The nitrogen nucleophile opens an epoxide group in the epoxide-containing (meth)acrylic polymer or copolymer to form a covalent bond to the compound. The reaction product may have a larger volume than does the predetermined shape. The reaction product may comprise an internal cavity, in some embodiments, after reacting the epoxide-containing (meth)acrylic polymer or copolymer with the compound bearing the nitrogen nucleophile. The reaction product may be optionally crosslinked, either via monomers that innately undergo crosslinking when forming the first polymerization state, or via an externally added crosslinking agent. External crosslinking agents may react with residual epoxides in the (meth)acrylic polymer or copolymer or through functional groups in the compound comprising the nitrogen nucleophile, for example.

According to particular embodiments, the first polymerization state may be reached by a living polymerization reaction. Suitable living polymerization processes may include, for example, a Cu(I) salt, a ligand for Cu(I) and a radical initiator. In a specific example, glycidyl methacrylate may be polymerized under living polymerization conditions in the presence of a catalytic amount of copper (I) bromide, a catalytic amount of N-(pyridine-2-ylmethylene)butan-1-amine (ligand for Cu(I)), and a catalytic amount of azobisisobutyronitrile (AIBN). A second polymerization state may be reached while or after forming the reaction product.

The reaction product may be formed in the presence of a hindered amine base, such as triethylamine or other hindered amine bases discussed above. Suitable amounts of the hindered amine base relative to acrylic monomers comprising the (meth)acrylic polymer or copolymer may be at least about 1 molar equivalent, at least about 1.5 molar equivalents, at least about 2 molar equivalents, at least about 2.5 molar equivalents, at least about 3 molar equivalents, or at least about 4 molar equivalents.

Exposure of the predetermined shape to the compound bearing the nitrogen nucleophile in a solvent to form a reaction product may take place over a temperature ranging from about room temperature to the boiling point of the solvent. The solvent may be heated when initially adding the predetermined shape thereto, or the predetermined shape may be added to solvent at or near room temperature, with heating conducted thereafter, up to the boiling point of the solvent. The heating protocol and the extent of solvent wetting may determine the size of the macroparticulates that are obtained following functionalization. In particular examples, alcohol solvents such as methanol or ethanol may be suitable solvents for promoting functionalization of the macroparticulates.

The methods may further comprise adhering a hexasubstituted benzene to a surface of the macroparticulates. The hexasubstituted benzene may be covalently bonded or non-covalently associated with the surface of the macroparticulates. In some embodiments, the nitrogen nucleophile may be present upon the hexsubstituted benzene, in which case the hexasubstituted benzene itself may promote epoxide ring opening. In other embodiments, a nitrogen nucleophile separate from the hexasubstituted benzene may promote epoxide ring opening, in which case the hexasubstituted benzene may react with the hydroxyl group generated upon opening the epoxide ring, or a suitable reaction product of the hydroxyl group. In still other embodiments, a diamine nucleophile may promote epoxide ring opening, and the hexasubstituted benzene may then functionalize an unreacted amine group.

Although the description above has heretofore been directed to macroparticulates comprising an epoxide-containing (meth)acrylic polymer or copolymer that has been reacted with a compound bearing a nitrogen nucleophile, it is to be appreciated that such functionalized (meth)acrylic polymers and copolymers may have utility when used in other configurations as well. For example, in non-limiting embodiments, the functionalized (meth)acrylic polymers and copolymers may be disposed as a surface layer, including a surface coating, which may similarly be utilized for promoting analyte detection and/or binding. Any of the functionalized (meth)acrylic polymers or copolymers discussed above may be utilized for this purpose, including those containing a bound or unbound hexasubstituted benzene to aid in facilitating contaminant sequestration. Suitable techniques for forming a surface layer may comprise dissolving or emulsifying the functionalized (meth)acrylic polymer or copolymer in a solvent to provide a coating formulation, and applying the coating formulation to a substrate. Alternately, the functionalized (meth)acrylic polymer or copolymer may be directly molded, cast, or extruded, for example, to provide a surface layer without depositing the polymer on a base substrate. When used, suitable base substrates may include, but are not limited to, other polymers, ceramics, wood, metals, glass, and the like.

Accordingly, surface layers of the present disclosure may comprise: a polymer layer, optionally upon the base substrate, wherein the polymer layer comprises a reaction product of an epoxide-containing (meth)acrylic polymer or copolymer and a compound bearing a nitrogen nucleophile. The compound bearing the nitrogen nucleophile may be functionalized to promote contaminant sequestration within the polymer layer, as discussed further herein. Any of the contaminants discussed above may be bound and analyzed by the polymer layer, also including biologicals, pollutants, toxins, and the like.

When disposed as a polymer layer, the functionalized (meth)acrylic polymers and copolymers may have a layer thickness of about 100 nm or greater, particularly about 1 micron or greater. Optionally, an article comprising a polymer layer may be formed substantially from the functionalized (meth)acrylic polymers and copolymers, in which case the polymer layer thickness may be much greater.

Articles comprising a polymer layer of the present disclosure may include, but are not limited to, those in which inline sequestration and/or monitoring of a contaminant may be desirable. Particular examples of articles having a polymer layer may include, but are not limited to, medical devices, pipelines, sensors, and the like.

Hexasubstituted benzenes suitable for use in the disclosure herein and formation thereof will now be described in further detail. The hexasubstituted benzenes may promote attachment of surface-modifying functionality to macroparticulates disclosed herein, wherein the surface-modifying functionality may be adapted for detection of one or more analytes and/or binding of one or more contaminants. Due to steric crowding around the phenyl ring, hexasubstituted benzenes may exhibit a locked conformation in which substituents at alternating ring carbon atoms are directed toward opposite faces of the phenyl ring. For purposes of the present disclosure, a locked conformation also includes the case wherein a rotational barrier is substantially high in energy that the population of molecules with a conformation outside the locked conformation is insignificant, such as in the hexasubstituted benzenes disclosed herein. Hexasubstituted benzene intermediates disclosed herein may exhibit such a locked conformation and preserve the locked conformation upon further reaction to incorporate various types of entities, such as those comprising a sensing functionality and/or other types of entities designed to promote sensing or binding of a contaminant of interest. When hexasubstituted benzenes are functionalized in the manner described herein, the locked conformation may dispose orthogonal reactive functionality toward opposing faces of the phenyl ring, with one group of reactive functionalities being capable of promoting covalent bonding to the surface of the macroparticulates in an orientationally controlled manner and another group of reactive functionalities directed toward the opposite face of the phenyl ring being capable of becoming functionalized with entities suitable for promoting sensing or binding of one or more contaminants of interest. The term "orthogonal" refers to the condition of two or more groups of reactive functionalities having different modes of reactivity, such that the groups of reactive functionalities may be functionalized differently and independently of one another. The sensing functionalities associated with a given phenyl ring in the disclosure herein may be specifically chosen to interact with a particular contaminant of interest in a manner to promote detection thereof. Promoting detection of a contaminant may involve bonding of the sensing functionality to the contaminant or promoting a molecular association of the sensing functionality with the contaminant. Multiple hexasubstituted benzenes, each specifically configured to analyze or bond a particular contaminant of interest, may be disposed upon the surface of the macroparticulates, if desired, to facilitate detection of multiple contaminants upon a single macroparticulate carrier, if desired. Alternately, one type of hexasubstituted benzene configured to analyze for a specific contaminant or type of contaminant may be disposed upon a particular macroparticulate, with multiple types of macroparticulates being used in conjunction with sensing and/or sequestering multiple contaminants. Flow-through sensors or continuous flow lines for contaminant remediation that incorporate one or more macroparticulates featuring a hexasubstituted benzene of the present disclosure may be used in any sensing or contaminant remediation application disclosed herein.

In the disclosure herein, each group of reactive functionalities is located upon alternating ring carbon atoms of the hexasubstituted benzenes in order to accomplish the foregoing. The reactive functionalities promoting surface bonding may permit tripodal covalent bonding to be realized to the surface of the macroparticulates, although fewer points of covalent bonding attachment may be possible in some cases. Tripodal covalent bonding may afford rigid orientational control, such that the phenyl ring resides substantially parallel to the macroparticulate surface. Similarly, up to three sensing functionalities or contaminant-binding functionalities may extend from the phenyl ring away from the macroparticulate surface, wherein the sensing functionalities and contaminant-binding functionalities may work in concert with one another to permit detection and binding of a contaminant of interest. Particular variations may include hexasubstituted benzenes having a binding group, a reporter group and an optional buffer group attached thereto and directed toward one face of the hexasubstituted benzene, and multiple surface attachment groups directed toward the opposite face of the hexasubstituted benzene. The buffer group may be present to stabilize the sensor output or binding efficiency of the contaminant if a measurable quantity associated with the sensing functionality displays variance with pH. If a buffer group is not present, a second binding group or reporter group may be present upon the hexasubstituted benzene, or a functional group that neither aids nor hinders binding or reporting may be present. Another variation may include attachment of a hexasubstituted benzene to a macroparticulate surface with protected functional groups attached to the hexasubstituted benzene and directed toward the face of the hexasubstituted benzene opposite the surface, in which case the protecting groups may be removed, possibly sequentially, with the hexasubstituted benzene becoming further functionalized with one or more sensing functionalities or contaminant-binding functionalities while bound to the surface.

To accomplish the foregoing, the present disclosure provides facile access to several hexasubstituted benzene intermediates that may serve as in-common synthons for introducing additional functionality thereto for promoting sensing and/or binding sequestration of a contaminant, wherein the hexasubstituted benzene may be covalently bonded to a macroparticulate surface with a controlled orientation of the additional functionality (e.g., by virtue of tripodal covalent bonding). A wide range of additional functionality may be nucleophilically introduced onto the hexasubstituted benzene intermediates while accomplishing the foregoing, and the additional functionality (i.e., a sensing functionality and/or other types of entities) may be covalently linked to the phenyl ring before or after covalent bonding of the hexasubstituted benzene to the macroparticulate surface takes place.

Once a hexasubstituted benzene has been covalently attached to a macroparticulate surface, custom electronics may probe the surface spectroscopically at an appropriate location through the use of electromagnetic radiation. Sensing functionalities associated with the hexasubstituted benzene upon the surface may absorb (absorption spectroscopy) or emit (fluorescence spectroscopy) electromagnetic radiation or chemiluminesce as a result of a chemical reaction or interaction, where the product of the chemical reaction or interaction is light. The light intensity may allow the amount of a given contaminant to be determined. As such, the present disclosure may alleviate certain limitations of solution-based testing, in which the testing reagents are part of a solution instead of attached to the surface of the macroparticulates as in the disclosure herein. In addition, the present disclosure may also allow for very precise use of small electronics to probe a surface at a designated location for sensing functionalities built on the phenyl ring of the hexasubstituted benzene.

Access to hexasubstituted benzene in-common synthons suitable for conducting further synthetic transformations thereon may be realized through a series of chemical reactions outlined in Scheme 3 below. The alternating facial disposition of the substituents upon the phenyl ring is denoted by bolded and dashed bonds in the structures below. It is to be understood that when any structure herein lacks bolded or dashed bonds, all possible diastereomers of the structure are implicitly described.

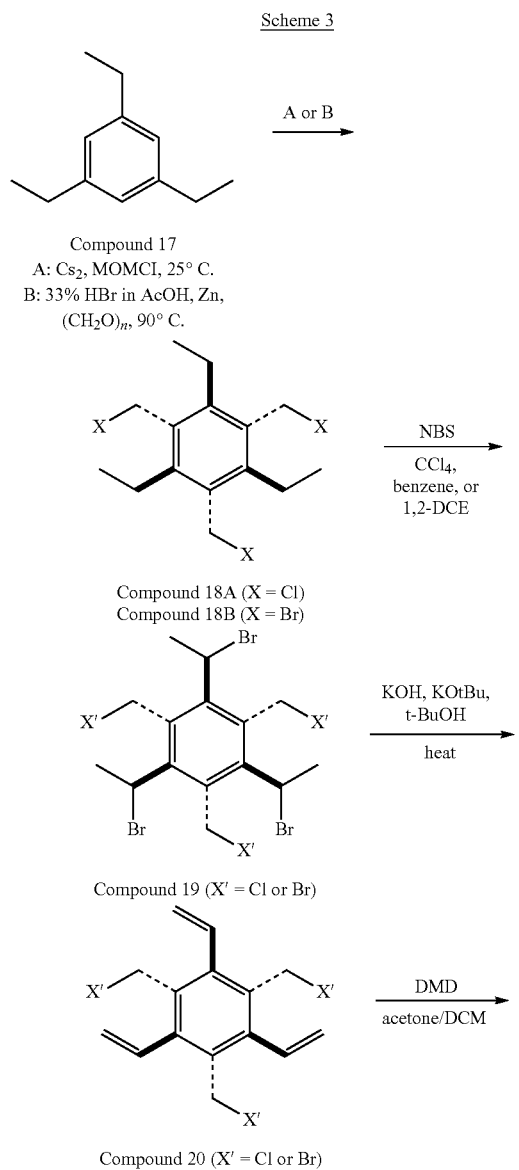

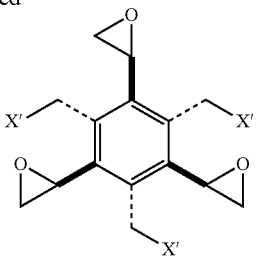

Compound 21A (X' = Cl or Br)

Referring to Scheme 3, 1,3,5-triethylbenzene (Compound 17) may be purchased commercially or synthesized by forming a thermodynamic Friedel-Crafts alkylation product. The remaining ring carbon atoms in Compound 17 may then be halomethylated using either chloromethyl methyl ether (MOMCl)/$CS_2$ (Conditions A) or HBr/Zn/paraformaldehyde (Conditions B) to afford either Compound 18A or 18B, as described in Wallace, et al., "Preparation of 1,3,5-Tris(aminomethyl)-2,4,6-triethylbenzene from Two Versatile 1,3,5-Tri(halosubstituted) 2,4,6-Triethylbenzene Derivatives," Synthesis, 2005, pp. 2080-2083. Compound 18A or Compound 18B may then be brominated at the α-position of the ethyl group using N-bromosuccinimide (NBS) to form Compound 19. If Compound 18A is brominated with NBS, some or all of the chlorides may exchange for bromides, particularly if a sufficient excess NBS is used. A mixture of benzylic halides in Compound 19 and in subsequent products, if formed, may be used satisfactorily to conduct the further synthetic transformations shown in Scheme 3 and in additional schemes discussed below. Alternately, elemental bromine may be used as the bromide source for conducting the bromination reaction. Other radical initiators, such as benzoyl peroxide or UV light, may also be used for initiating the bromination reaction.

Referring still to Scheme 3, the α-bromoethyl groups in Compound 19 may undergo dehydrobromination in the presence of potassium t-butoxide or a similar base to form the corresponding vinyl groups in Compound 20. In some instances, a phase transfer catalyst, such as a crown ether or a tetraalkylammonium salt may be used to promote this reaction in an organic solvent such as dichloromethane, tetrahydrofuran (THF) or t-butanol. Finally, the vinyl groups of Compound 20 may be epoxidized using potassium peroxymonosulfate (OXONE), dimethyldioxirane (DMD), a peracid (e.g., MCPBA) or similar oxidants capable of epoxidizing alkenes to afford Compound 21A. Compound 21A may serve as a versatile in-common synthon for accessing additional hexasubstituted benzenes disclosed herein.

In some instances, incomplete dehydrobromination may occur in the course of forming Compound 20, in which case a mixture comprising Compounds 20, 20A and 20B may be obtained, along with unreacted Compound 19, as shown in Scheme 3A.

Scheme 3A

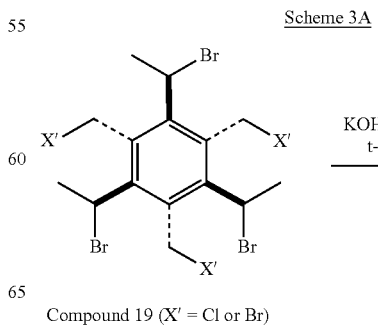

Compound 19 (X' = Cl or Br)

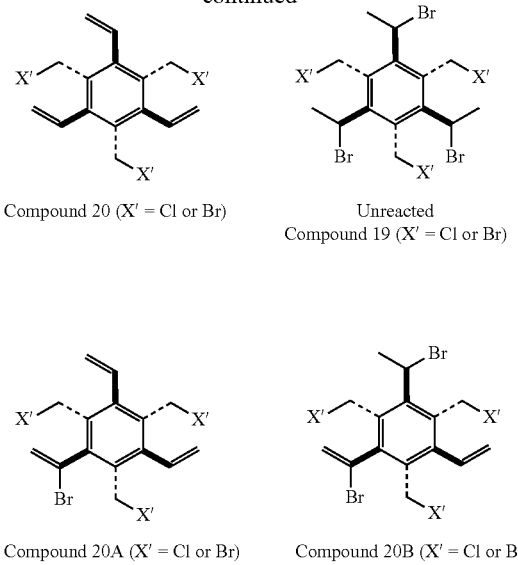

Compound 20 (X' = Cl or Br)

Unreacted Compound 19 (X' = Cl or Br)

Compound 20A (X' = Cl or Br)

Compound 20B (X' = Cl or Br)

This mixture of compounds may still undergo epoxidation (for the compounds containing vinyl groups), which may then afford further functionalized compounds containing one, two or three additional substituents following functionalization through epoxide ring opening, as discussed below. When starting with a mixture of this type, the functionalized products bearing different numbers and/or types of further substituents may be easily separable from one another using standard laboratory separation techniques. If less than three substituents are bonded to the hexasubstituted benzene following epoxide ring opening, the substituents that are present may at least bind or interact with a contaminant of interest and/or provide a suitable spectroscopic signature for determining the quantity of contaminant present. When only one epoxide group is formed, the incorporated functionality may bond or interact with the contaminant and afford a suitable spectroscopic signature for determining the presence of the contaminant. When two epoxide groups are present, these functions may be present in different incorporated functionalities.

Although benzylic halides are generally considered to be very good leaving groups, the benzylic halides in the hexasubstituted benzenes of the present disclosure are surprisingly low in reactivity with all but select nucleophiles. Without being bound by any theory or mechanism, it is believed that the particular orientation of the halomethyl groups with respect to the phenyl ring may limit their ability to undergo backside attack by many types of nucleophiles. Since the benzylic carbon is displaced from the plane of the phenyl ring, conjugation of a benzylic carbocation with the pi (π) bonds of the aromatic ring is also not possible. Similarly, the steric interactions around the ring are believed to force the vinyl groups to break conjugation with the pi (π) bonds of the aromatic ring. This permits an unexpected vinyl group stabilization to be realized compared with typical vinylbenzenes, which usually polymerize readily under mild conditions. Although the benzylic halides are surprisingly low in reactivity, the low reactivity advantageously facilitates the synthetic transformations of the ethyl groups to form epoxides, as outlined in Scheme 3 above.

Certain nucleophiles may undergo a facile reaction with the benzylic halides in the hexasubstituted benzenes disclosed herein. In particular, azide nucleophiles may undergo a high-yield reaction with the benzylic halides to form the corresponding benzylic azides. The benzylic azides may be further transformed to a benzylic amine, if desired, or undergo a direct dipolar cycloaddition reaction to form a 1,2,3-triazine that may facilitate use of the hexasubstituted benzenes in various applications. Functionalization of the benzylic amine or benzylic azide may promote attachment of the hexasubstituted benzenes to the surface of the macroparticulates, as discussed further hereinbelow. In particular, a benzylic amine may promote epoxide ring opening in the (meth)acrylic polymer or copolymer of the macroparticulates to promote surface attachment. Alternately, an alkyne may be introduced to the (meth)acrylic polymer or copolymer following epoxide ring opening, wherein the alkyne group may react to form a 1,2,3-triazine for promoting attachment of the hexasubstituted benzene to the macroparticulate surface. Surface alkenes may also be attached to the macroparticulates (e.g., through functionalization of the unreacted amine of a polyamine, such as with allyl bromide) to facilitate covalent bond formation to the hexasubstituted benzenes as well.

Further surprisingly, an azide nucleophile may react with the benzylic halides without promoting nucleophilic opening of the epoxides, according to some embodiments of the present disclosure. Specifically, as shown in Scheme 4 below, Compound 21A may be reacted with sodium azide to form Compound 21B, which bears intact epoxides in combination with the benzylic azides. Like Compound 21A, Compound 21B may also serve as a versatile in-common synthon for forming additional hexasubstituted benzenes disclosed herein. Further details concerning introduction of the azide groups at a later synthetic stage and additional transformations of the azide groups are discussed in more detail below. Epoxidized variants of Compounds 20A and 20B may be reacted similarly to introduce three azide groups thereto.

Scheme 4

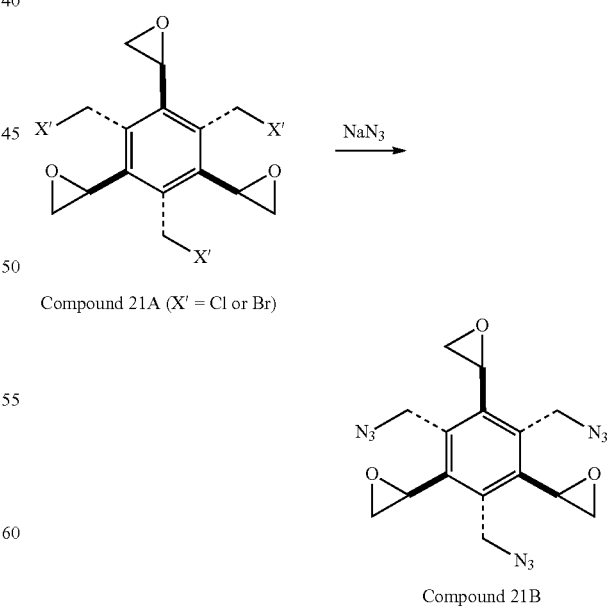

Compound 21A (X' = Cl or Br)

Compound 21B

Compound 21B or the corresponding benzylic amine may be reacted with a suitable (meth)acrylic polymer or copolymer to attach the hexasubstituted benzene to the surface of the macroparticulates in the manner described in the preceding paragraph. Once attached to the macroparticulate surface, the epoxide groups may be opened nucleophilically to introduce various sensing functionalities to the macroparticulate surface.

In another example, Compound 19 may be transformed into Compound 19A, as shown in Scheme 4A, by reacting the secondary benzylic bromide with sodium azide.

Scheme 4A

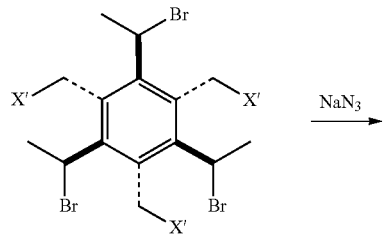

Compound 19 (X' = Cl or Br)

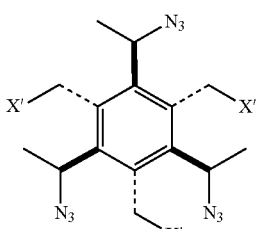

Compound 19A (X' = Cl or Br)

Without being bound by theory or mechanism, it is believed that the secondary benzylic halide may react faster with sodium azide than does the primary benzylic halide. Thus, chemoselectivity may be achieved when X is Cl and —CH(Br)CH$_3$ elsewhere is present upon the phenyl ring. Compound 19A is also a useful synthetic intermediate, which may undergo a similar sequence of reactions to those discussed below. As a non-limiting example, the secondary azide groups or a reaction product thereof may be used to promote surface attachment to a macroparticulate in a manner similar to that discussed for Compound 21B in the preceding paragraph. The benzylic halides then may be further transformed into one or more sensing functionalities once the hexasubstituted benzene is covalently bound to the macroparticulate surface. In particular, the primary benzylic halides may undergo nucleophilic displacement with azide to form primary benzylic azides that themselves may be further modified synthetically to introduce one or more sensing functionalities or related moieties.

In still another example, Compound 20 may undergo hydrosilylation to introduce a trialkylsilyl group and form Compound 20C, as shown in Scheme 4B.

Scheme 4B

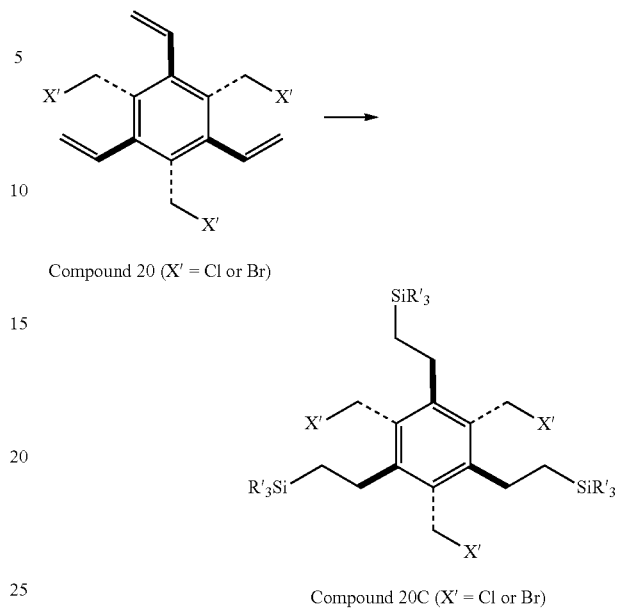

Compound 20 (X' = Cl or Br)

Compound 20C (X' = Cl or Br)

Compound 20C is also a useful synthetic intermediate, which may undergo a similar sequence of reactions to those discussed below. As a non-limiting example, the primary benzylic halides in Compound 20C may undergo nucleophilic displacement with azide to form primary benzylic azide groups, which may then undergo a further reaction to promote surface attachment in various ways, as discussed in the immediately preceding paragraphs.

In still another example, Compound 20 may undergo a reaction with azide to form the corresponding primary benzylic azides in Compound 20D, as shown in Scheme 4C.

Scheme 4C

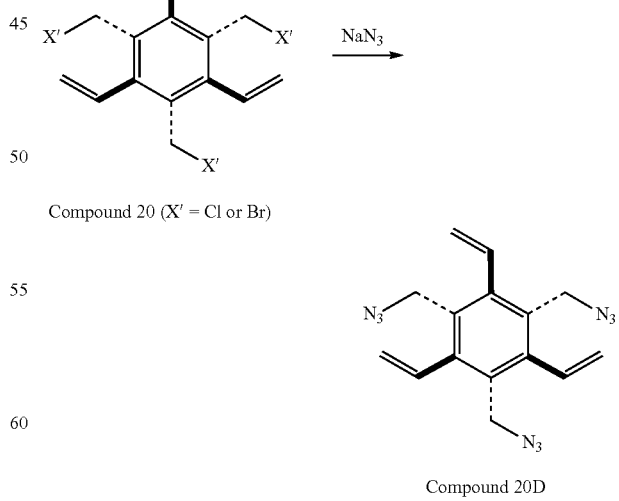

Compound 20 (X' = Cl or Br)

Compound 20D

The benzylic azides may then undergo a cycloaddition reaction to form a covalent bond to a surface, or the benzylic azides may undergo reduction to form benzylic amines, which may then be reacted with the macroparticulate surface to form a covalent bond in a manner similar to that described in the preceding paragraphs. The vinyl groups may project away from the macroparticulate surface and provide a functional handle for introducing one or more sensing functionalities or other binding moieties onto the phenyl ring. In one example, the vinyl groups may be epoxidized while on the macroparticulate surface in the course of introducing a sensing functionality through nucleophilic opening of the epoxide. In other non-limiting examples, the vinyl groups may be oxidized to form a diol or primary alcohol or undergo oxidative cleavage to form a 1,3,5-substituted benzoic acid, any of which may be further manipulated and/or functionalized to introduce a sensing functionality or binding moiety through covalent bond formation. In another synthetic approach, the vinyl group may be reacted with an alkene to produce olefin dimers or higher oligomers, which may be further manipulated to introduce a sensing functionality in non-limiting embodiments.

Accordingly, in-common hexasubstituted benzene synthons of the present disclosure may have a structure corresponding to Compound 22 below,

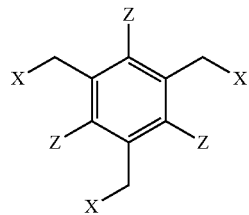

Compound 22 wherein each X is independently Cl, Br or $N_3$, and each Z is independently —$CH(Br)CH_3$, —$CH(N_3)CH_3$, —$CH=CH_2$, —$CH_2CH_2SiR'_3$, or epoxide, wherein R' is a hydrocarbyl group.

Compound 21A has three epoxides directed toward one face of the phenyl ring and three benzylic halides directed toward the opposite face of the phenyl ring. Each group of reactive functionalities may be reacted separately to introduce further functionality to the hexasubstituted benzenes, as discussed further in reference to Scheme 5. As shown in Scheme 5 below, the epoxides in Compound 21A may be further reacted with one or more nucleophiles (Nu:) to promote epoxide ring opening without disturbing the benzylic halides, thereby forming Compound 23. Suitable nucleophiles may include nitrogen nucleophiles Scheme 5

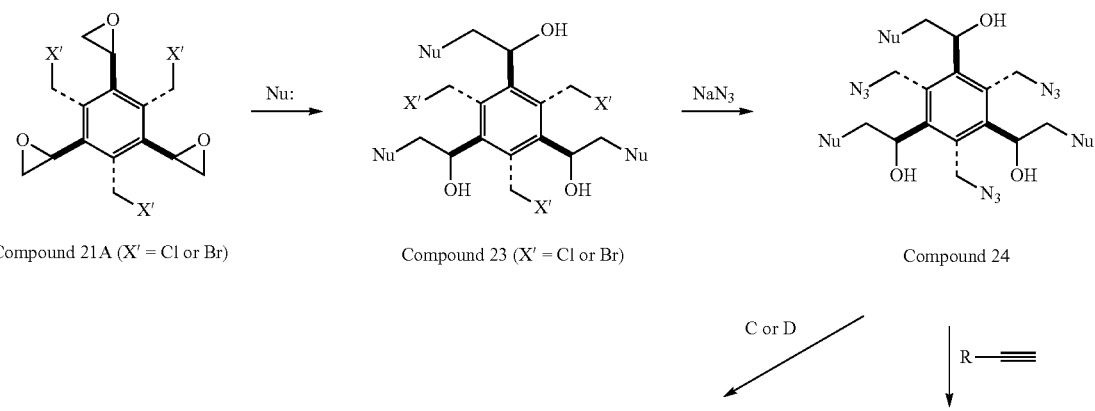

Compound 21A (X' = Cl or Br)   Compound 23 (X' = Cl or Br)   Compound 24

C = $H_2$, Pd/C, (Y = H)
D = $PPh_3$, (Y = OH)

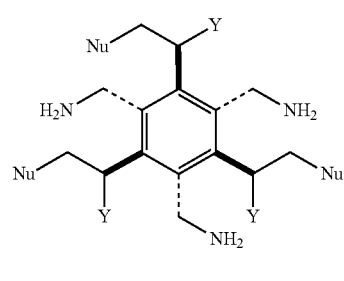

Compound 25 (Y = H or OH)

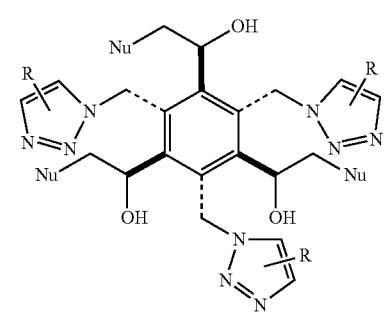

Compound 26 such as primary or secondary amines, any of which may introduce a sensing functionality and/or binding moiety to the phenyl ring. Particular examples may include the one or more nucleophiles featuring one or more spectroscopically active molecules, one or more molecules capable of binding a contaminant, and/or one or more molecules capable of promoting a desired chemical environment to promote sensing, such as through providing a buffering moiety. After epoxide ring opening has taken place, the benzylic halides may then undergo a reaction with sodium azide to form the corresponding benzylic azides (Compound 24). The benzylic azides may then undergo reduction to an amine to form Compound 25 or undergo dipolar cycloaddition with an alkyne to form Compound 26 to introduce further functionality onto the phenyl rings. Mono- or bis-epoxides, prepared by epoxidizing Compounds 20B or 20A, respectively, may undergo a similar series of reactions. The alkyne of Compound 26 may be bound to the surface of the macroparticulates to promote attachment of the hexasubstituted benzene to the macroparticulate surface through 1,2,3-triazine formation. The benzylic amines in Compound 25 may open at least a portion of the epoxide groups upon the macroparticulate surface to promote attachment of the hexasubstituted benzene to the (meth)acrylic polymer or copolymer.

Referring still to Scheme 5, the nucleophile that promotes epoxide ring opening may become appended at the β-position with respect to the phenyl ring, thereby placing a hydroxyl group at the α-position, as shown in Compound 23. Without being bound by any theory or mechanism, the presence of the α-hydroxyl groups may enhance microenvironment solubility in proximity to the phenyl ring to promote enhanced contaminant binding once surface bound. The other regioisomer may form to a limited extent in some cases to introduce the hydroxyl group at the β-position and the nucleophile at the α-position. Although Scheme 5 has a shown a single nucleophile opening each epoxide, it is to be recognized that multiple nucleophiles may be used, in which case statistical opening of the epoxides with the various nucleophiles may occur to form a range of products, provided that the multiple nucleophiles exhibit a comparable rate of reaction during epoxide ring opening. Thus, in some embodiments of the present disclosure, a first epoxide may be opened with a first nucleophile, a second epoxide may be opened with a second nucleophile, and a third epoxide may be opened with a third nucleophile, in which the first, second and third nucleophiles are all different. If formed and if needed, product mixtures may be separated by a suitable laboratory separation technique such as column chromatography, crystallization, or the like. Optionally, the α-hydroxyl group may be removed by reduction prior to displacing the benzylic halides (not shown in Scheme 5). Still other strategies may react the epoxides with orthogonally protected nucleophiles which may be deprotected at a later time for sequential attachment of functionalities suitable to promote sensing or binding of a contaminant of interest. As a non-limiting example, two or more protected amines may comprise Nu: in Scheme 5 above (e.g., any combination of BOC, imide, FMOC or sulfonamide groups, as non-limiting examples), which may be individually deprotected and further functionalized to introduce functionalities suitable for sensing or binding an analyte of interest.

Referring still to Scheme 5, the benzylic azides in Compound 24 may be further manipulated to introduce additional functionality upon the hexasubstituted benzene (i.e., directed toward the face of the phenyl ring opposite the ring-opened epoxides). In some embodiments, the benzylic azides may be reduced to a benzylic amine to form Compound 25, such as through Staudinger reduction with triphenylphosphine or catalytically using hydrogen and a Pd/C catalyst. Catalytic reduction of the azides using hydrogen and Pd/C may concurrently reduce the α-hydroxyl group to form the corresponding methylene compound. Staudinger reduction, in contrast, may leave the α-hydroxyl group intact. In other embodiments, the azides may undergo a 1,3-dipolar cycloaddition reaction with a terminal alkyne to form the corresponding 1,2,3-triazole, as shown for Compound 20. The benzylic amine or the 1,2,3-triazole may be further exploited to promote surface attachment, as referenced above. In addition or alternately, the α-hydroxyl groups may be further manipulated, such as under Mitsunobu conditions (triphenylphosphine, diethylazodicarboxylate (DEAD)) to introduce a nucleophile at the α-position, such as a carboxylic acid ester, an azide, an imide, an aryl ether, or a sulfonamide. Should removal of the α-hydroxyl groups be desired, the carboxylic acid ester may be reduced with a hydride reagent to affect removal.

Similar to the discussion for Compound 21A, Compound 21B has three epoxides directed toward one face of the phenyl ring and three benzylic azides directed toward the opposite face of the phenyl ring. Each group of reactive functionalities may be reacted separately to introduce further functionality to the hexasubstituted benzenes, as discussed in reference to Scheme 6.

Scheme 6

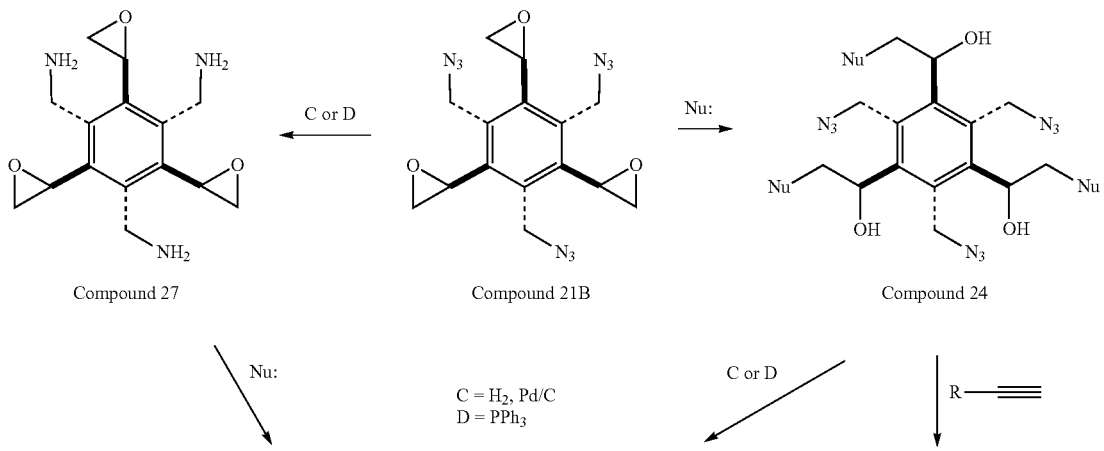

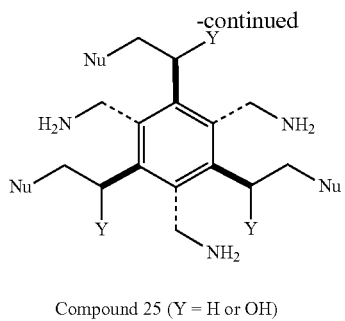

Compound 25 (Y = H or OH)

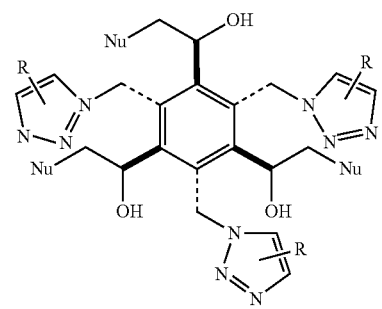

Compound 26

As shown in Scheme 6, the epoxide rings in Compound 21B may be opened with a nucleophile without disturbing the benzylic azides to form Compound 24, the same intermediate formed in Scheme 5 above. The benzylic azides of Compound 24, in turn, may be transformed in a similar manner to that described above in reference to Scheme 5 to form Compound 25 or Compound 26. Alternately, the benzylic azides may be reduced to the corresponding benzylic amines without disturbing the epoxides, thereby forming Compound 27. The epoxides in Compound 27, in turn, may then undergo nucleophilic opening to afford Compound 26. Thus, depending on particular synthetic needs, the order of epoxide ring opening and benzylic halide displacement may be reversed. As with Scheme 5 above, a first epoxide in Scheme 6 may be opened with a first nucleophile, a second epoxide may be opened with a second nucleophile, and a third epoxide may be opened with a third nucleophile, in which the first, second and third nucleophiles are all different. Product mixtures may be resolved by a suitable laboratory separation technique. Mono- or bis-epoxides, prepared by epoxidizing Compounds 20B or 20A, respectively, may undergo a similar series of reactions. Attachment to the surface of the macroparticulates may then take place in a manner similar to that described above.

Accordingly, various embodiments of the present disclosure provide hexasubstituted benzenes having a structure of Compound 28 below,

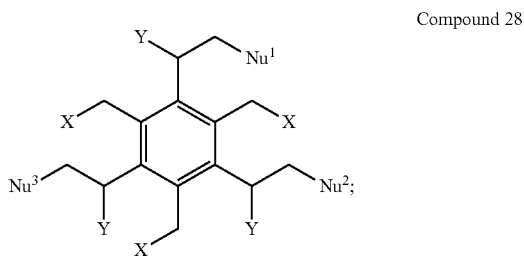

Compound 28 wherein $Nu^1$, $Nu^2$ and $Nu^3$ are each nucleophiles, each X is independently Cl, Br, $N_3$, or $NH_2$, and each Y is independently H or OH. Nucleophiles $Nu^1$, $Nu^2$ and $Nu^3$ may be chosen to afford sensing or binding functionality to the hexasubstituted benzene. In non-limiting embodiments, at least one of $Nu^1$, $Nu^2$ and $Nu^3$ may comprise a binder moiety capable of binding at least one contaminant. In addition, a reporter moiety and/or a buffer moiety may be present among $Nu^1$, $Nu^2$ and $Nu^3$.

In more particular embodiments, $Nu^1$, $Nu^2$ and $Nu^3$ are each different. As used herein respect to the nucleophiles, the term "different" refers to $Nu^1$, $Nu^2$ and $Nu^3$ differing structurally from one another, either compositionally or isomerically. $Nu^1$, $Nu^2$ and $Nu^3$ may each be of the same class of nucleophile or different. Illustrative classes of nucleophiles that may be suitable for use in epoxide ring opening according to the disclosure herein include, for example, nitrogen nucleophiles, such as primary or secondary amines. Phosphines, thiols, selenols, selenides, diselenides, alkoxides, and/or carbanions may also be suitable nucleophiles. In an illustrative embodiment, $Nu^1$, $Nu^2$ and $Nu^3$ may comprise orthogonally protected amines, such amines protected with any combination of BOC, imide, FMOC or sulfonamide groups. For example, when $Nu^1$, $Nu^2$ and $Nu^3$ are amines orthogonally protected with BOC, phthalimide and a sulfonamide, respectively, the amine corresponding to Nu' may be exposed with dilute acid, the amine corresponding to $Nu^2$ may be exposed with dilute base, and amine corresponding to $Nu^3$ may carry a suitable sensing functionality upon the sulfonamide hydrocarbyl group. Other combinations of orthogonal protecting groups for amines may also be suitable, as can be appreciated by one having ordinary skill in the art. For instance in another non-limiting example, $Nu^1$, $Nu^2$ and $Nu^3$ may be amines that are orthogonally protected with BOC, FMOC or phthalimide, or CBZ to allow the amines to be exposed through staged exposure to acid, base, and reducing conditions (e.g., catalytic hydrogenolysis), respectively. Such strategies may allow the amines to be sequentially exposed and reacted with a sensing functionality, a spectroscopically active functionality and/or a buffering functionality to promote sensing or contaminant binding under various conditions.

According to more particular embodiments, each X in Compound 28 may be Br or each X may be Cl. Alternatively, each Br or Cl may be displaced with azide, such that each X in Compound 28 is $N_3$. In still other embodiments, each azide in Compound 28 may be reduced to form a benzylic amine, such that each X in Compound 28 is $NH_2$ and Y is either H or OH depending on how the reduction is performed, as discussed above. For example, catalytic reduction of the benzylic azide may reduce the benzylic alcohol to a methylene group, whereas triphenylphosphine reduction (Staudinger reduction) of the benzylic azide may leave the benzylic alcohol intact.

As referenced above, the hexasubstituted benzenes may be covalently bound to the surface of the macroparticulates in various ways. Up to tripodal covalent bonding of the hexasubstituted benzene to the macroparticulate surface may be present. Less than tripodal covalent bonding of the hexasubstituted benzenes is also possible if not all of the reactive functional groups directed toward the macroparticulate surface react. The remaining group of reactive functionalities directed toward the opposite face of the phenyl ring face away from the macroparticulate surface may be reacted with various functionalities to promote sensing or binding of a contaminant, as discussed above. In non-limiting examples, up to three different nucleophiles may be reacted with the reactive functionalities directed away from the macroparticulate surface.

To promote surface attachment, benzylic azides may form a 1,2,3-triazine as a reaction product, optionally with a linking group between the 1,2,3-triazine and the surface of the macroparticulates. In the case of macroparticulates comprising a surface-bound terminal alkyne, the terminal alkyne may be introduced by opening the epoxide ring with an alkyne-functionalized amine, such as with propargyl amine, or by reacting the hydroxyl group obtained from epoxide ring opening upon the macroparticulate surface with an electrophilic alkyne species, such as propargyl bromide. With both propargyl amine and propargyl bromide, a methylene linker group results between the macroparticulate surface and the 1,2,3-triazine once formed. Other routes for introducing an alkyne group to the macroparticulate surface may be envisioned.

There may similarly be a linking group between the benzylic amine and the macroparticulate surface when covalently bonding the benzylic amine with a complementary functional group upon the macroparticulate surface. As an illustrative example, the macroparticulate surface may bear an electrophile that is reactive with the benzylic amine. Suitable electrophiles that may react with the benzylic amine include, but are not limited to, leaving groups such as halides or sulfonates, acyl halides, Michael acceptors, epoxides, or the like, wherein any of these groups may be present within a linking group bound to the macroparticulate surface. Benzylic amines may promote surface attachment without disturbing the epoxide groups of the hexasubstituted benzene until a desired time. Once the hexasubstituted benzene has been covalently bonded to the macroparticulate surface, the epoxide groups may be opened with one or more nucleophiles to confer sensing and/or binding capabilities to the macroparticulate surface. Alternately, sensing functionalities may be introduced nucleophilically to the hexasubstituted benzenes before attachment to the macroparticulate surface.

In another particular example, surface attachment of the hexasubstituted benzene may be realized by attachment of (meth)acrylic acid or a derivative thereof (e.g., acrylic acid, methacrylic acid, acrylamide, methacrylamide, and the like) to the hexasubstituted benzene. The vinyl group of the (meth)acrylic acid may be reacted thermally or optically through a free radical mechanism with a corresponding vinyl group on the macroparticulate surface, wherein the vinyl group may be introduced through a reaction with a reactive vinyl compound, such as allyl bromide. Once introduced to the macroparticulate surface, the free vinyl group may then undergo a reaction with the vinyl group present in the hexasubstituted benzene. Scheme 7 below shows an illustrative process whereby an acrylate-functionalized hexasubstituted benzene may undergo attachment to a vinyl-functionalized macroparticulate surface.

Scheme 7

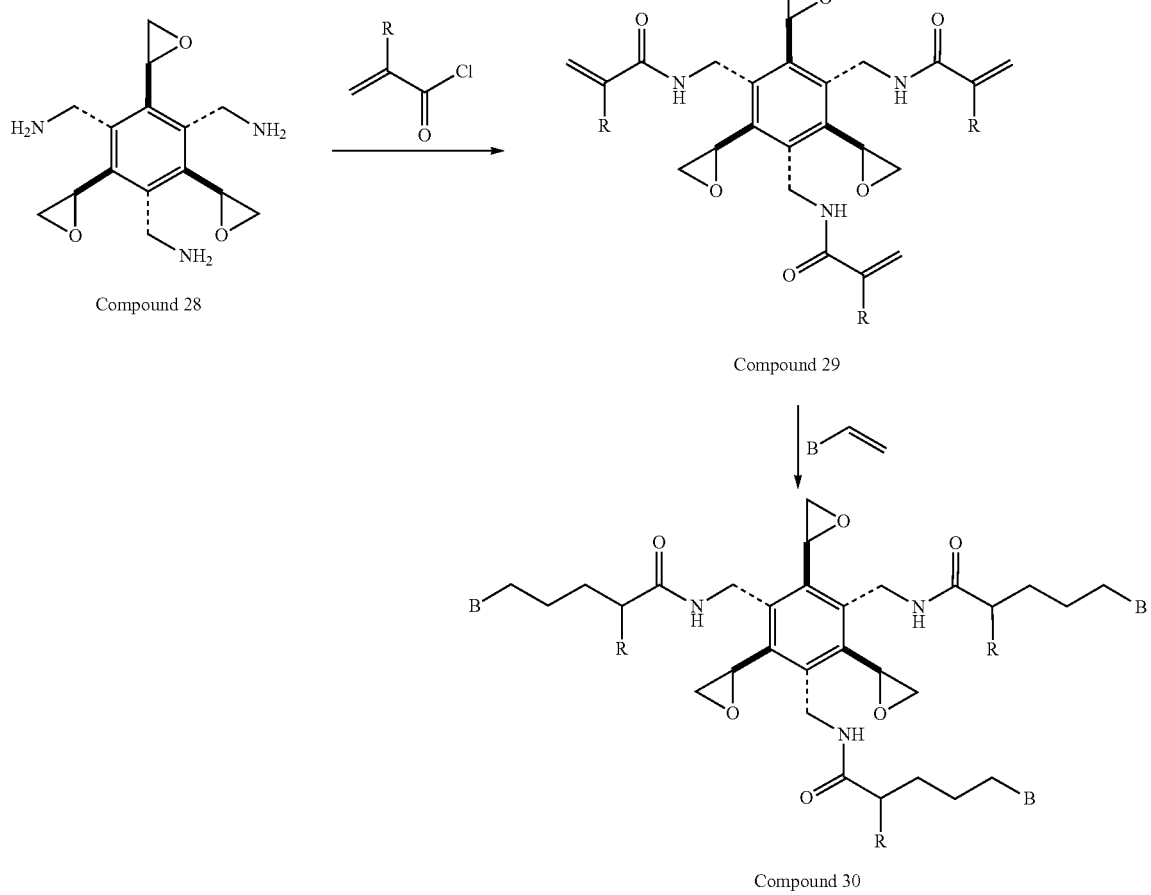

Compound 28

Compound 29

Compound 30

In Scheme 7, B represents the macroparticulate surface and R represents H or a hydrocarbyl group, particularly a methyl group. Once surface deposition and covalent bonding has taken place (Compound 30), the epoxide groups may be reacted to introduce functionalities suitable to promote sensing or binding of a desired contaminant.

Another synthetic variant may be obtained by epoxidizing the product mixture in Scheme 3A and then reacting the various epoxides with methacrylic acid or a derivative thereof under basic conditions, such as in the presence of cesium carbonate, to promote nucleophilic epoxide opening. The resulting α-hydroxymethacrylate esters may then be reacted with an olefinic monomer or a surface olefin to promote attachment to the macroparticulate surface.

In the description above, covalent bonding of the hexasubstituted benzenes takes place through the benzylic carbon atoms and introduction of additional functionality takes place through nucleophilic opening of the epoxides. In alternative embodiments of the present disclosure, covalent bonding to a surface may take place through the epoxides, and the benzylic carbon atoms may be employed for introducing further functionality.

As illustrated above, the hexasubstituted benzenes disclosed herein are designed such that they may be reacted with one or more nucleophiles or other reactive compounds to introduce a range of further functionality directed toward a particular face of the hexasubstituted benzenes. In particular embodiments, the hexasubstituted benzenes may be reacted with a first nucleophile, a second nucleophile, and a third nucleophile or a similar group of reactive molecules that differ from one another to introduce three different moieties onto the hexasubstituted benzene. The moieties introduced with the nucleophiles may be configured to promote sensing and/or binding of a contaminant of interest. In other embodiments, the hexasubstituted benzenes may be reacted with a first nucleophile and a second nucleophile that differ from one another, such that the hexasubstituted benzenes incorporate two of one of the nucleophiles and one of the other nucleophile. The nucleophiles may all be the same in still other embodiments. Particularly suitable nucleophiles for use in the disclosure herein are nitrogen nucleophiles, wherein the nitrogen nucleophiles bear further functionality of interest for incorporation upon the hexasubstituted benzenes. In particular embodiments, one or more of the nucleophiles may bear sensing functionality that undergoes a molecular association with an analyte of interest to afford a measurable response for quantifying the amount of analyte present in a complex fluid. Other of the nucleophiles may be spectroscopically active to promote detection of the molecular association, and optionally one of the nucleophiles may comprise a buffering functionality to promote a desired pH range at which the molecular association of interest occurs.

The hexasubstituted benzenes of the present disclosure may be utilized in various sensing applications when functionalized with moieties capable of undergoing a molecular association with a particular analyte of interest. The term "molecular association" refers to covalent bonding or a specific non-covalent interaction with an analyte or contaminant of interest. Non-covalent interactions suitable for producing a sensor response are listed above. The moieties capable of undergoing a molecular association with an analyte or contaminant of interest may be introduced to the hexasubstituted benzenes by a nucleophile that reacts with the epoxides. In particular embodiments, surface-bound hexasubstituted benzenes of the present disclosure may be especially applicable to use in sensing applications.

In particular embodiments, more than one type of nucleophile may be incorporated in the hexasubstituted benzenes, such that at least one of the nucleophiles includes functionality that may associate with an analyte or contaminant of interest and an extent of the association between the analyte or contaminant of interest and the surface-bound molecular scaffold is analytically detectable and correlatable to an amount of the analyte or contaminant that is present. For example, the sensor response may be referenced against a calibration curve or lookup table associated with the analyte or contaminant being assayed with a particular hexasubstituted benzene.

Macroparticulates of the present disclosure may include those featuring multiple hexasubstituted benzenes, or multiple hexasubstituted benzenes differing in structure from one another may be used in macroparticulates disposed in parallel or series to facilitate detection or binding of multiple contaminants of interest. The multiple functionalities upon a given hexasubstituted benzene may include those configured for binding an analyte or contaminant of interest (binder moiety) and producing a detectable output when an analyte or contaminant of interest is bound to or associated with the hexasubstituted benzene (reporter moiety). An optional buffering functionality may be present in some cases as well. In some instances, a binder moiety alone may be sufficient to promote detection of an analyte or contaminant of interest. In other instances, both a binder moiety and a reporter moiety may be present. In still other instances, the combination of a binder moiety, a reporter moiety, and a buffer moiety may be present to promote detection of an analyte or contaminant of interest.

As a non-limiting example, functionality specific for analyzing a metal or ion of interest (e.g., a crown ether, supramolecular receptor, or ligand) may be appended to the hexasubstituted benzenes to allow specific analyses to be made. Non-limiting examples of metals or ions of interest that may be detected include, for example, iron (particularly $Fe^{3+}$), calcium, potassium sodium, sulfate, borate, and chloride. Other suitable examples of metals or other analytes are noted above.

Should a particular hexasubstituted benzene provide a signal containing a contribution from two or more analytes or contaminants or an analyte or contaminant of interest and a non-analyte substance (e.g., as a result of chemical or spectroscopic interference) the signal contribution from each analyte of interest may be resolved/deconvoluted if another hexasubstituted benzene is capable of detecting one of the analytes or contaminants or a similar interfering substance specifically. For example, if a first hexasubstituted benzene provides a specific output proportional to the amount of a first analyte or contaminant present and a second hexasubstituted benzene produces an output proportional to the combined amount of the first analyte or contaminant and a second analyte, contaminant or interfering substance, the amount of the second analyte or contaminant may be determined by subtracting the output obtained from the first hexasubstituted benzene from that obtained from the second hexasubstituted benzene.

Moieties capable of undergoing a molecular association or bonding interaction with a specific analyte of interest are not considered to be particularly limited. Suitable moieties may include entities such as chelating ligands, crown ethers and other supramolecular receptors, analyte-sensitive dyes, pH sensitive compounds, antibodies, enzymes, proteins, or similar entities capable of undergoing a specific molecular interaction with an analyte of interest or a class of related analytes. Choice of a specific entity may be based upon the analyte of interest to be detected. The specific entity chosen may be appended to a suitable nucleophile or other reactive moiety to promote functionalization of a hexasubstituted benzene in the manner described hereinabove.

Analysis of the molecular association between a contaminant of interest and the moiety upon the hexasubstituted benzene may be determined by any suitable analytical technique. In illustrative embodiments, suitable analytical techniques may include spectrophotometry or electrochemical detection techniques. The magnitude of the analytical response (e.g., signal intensity) may be correlated to a known amount of contaminant using a lookup table, calibration curve, or the like.

In addition to a moiety capable of undergoing a specific molecular association with a contaminant of interest, the surface-bound hexasubstituted benzenes may further include a moiety that allows the molecular interaction to be detected more readily. Specifically, a second nucleophile or other reactive compound may introduce a moiety configured to promote spectroscopic or electrochemical detection of the hexasubstituted benzene. The spectroscopic or electrochemical signature of such a moiety may change when a contaminant of interest is associated with the hexasubstituted benzene compared to when the contaminant is not associated.

The surface-bound hexasubstituted benzenes may also include an additional moiety that may increase or decrease the strength of the molecular association with a contaminant of interest. For example, the hexasubstituted benzene may carry a pH buffer that may increase or decrease the strength of molecular association of pH-sensitive contaminants or levelize a pH-dependent sensor response. In other embodiments, the hexasubstituted benzene may carry functionality that may scavenge reactive species that may otherwise preclude molecular association with a contaminant of interest. Other choices for the additional moiety may increase or decrease the electron density upon the phenyl ring to increase or decrease the strength of the molecular association with a contaminant of interest as needed.

Accordingly, certain hexasubstituted benzenes may comprise three different moieties introduced by nucleophiles to promote sensing of one or more analytes or sequestration of one or more contaminants under appropriate conditions. In particular embodiments, at least one of the first nucleophile, the second nucleophile and the third nucleophile may carry functionality that is capable of associating with an analyte or contaminant of interest in order to promote sequestration thereof. In some or other embodiments, at least one of the first nucleophile, the second nucleophile and the third nucleophile may carry functionality that aids in promoting detection of the analyte or contaminant of interest, specifically molecular association of the analyte or contaminant of interest with the hexasubstituted benzene. In still additional embodiments, at least one of the first nucleophile, the second nucleophile, and the third nucleophile may carry functionality that changes the strength of the molecular association of the analyte or contaminant of interest with the hexasubstituted benzene. In more specific embodiments, at least one of the first nucleophile, the second nucleophile, and the third nucleophile may serve as a buffer to prevent sensing from being triggered by an environmental change in pH or a similar event. Alternately, a buffer may facilitate a desired molecular association with an analyte or contaminant of interest within a specific pH range. In addition, pH buffering or scavenging may sequester interfering analytes or substances that may otherwise preclude successful sequestration of an analyte or contaminant of interest.

Thus, in some embodiments, hexasubstituted benzenes may comprise three different moieties introduced by nucleophiles to aid in promoting detection or binding of an analyte or contaminant of interest. A first moiety may undergo molecular association with the analyte or contaminant of interest, a second moiety may promote detection of the molecular association, and the third moiety may include functionality that alters the strength of the molecular association. Alternative hexasubstituted benzene configurations include those in which: 1) the first moiety is present in combination with two third moieties or two first moieties are present in combination with a third moiety, 2) the first moiety is present in combination with two second moieties or two first moieties are present in combination with a second moiety, or 3) three occurrences of the first moiety are present upon the hexasubstituted benzene. The alternative hexasubstituted benzene configurations may be used if the molecular association of the analyte or contaminant of interest may be satisfactorily detected without introducing further functionality to the hexasubstituted benzenes.

For example, in particular embodiments of the present disclosure, the hexasubstituted benzenes may feature a first nucleophile carrying functionality capable of undergoing chemical bonding or association with an analyte or contaminant of interest, and a second nucleophile carrying functionality that demonstrates a different spectroscopic, electrochemical, or electromechanical response when an analyte or contaminant is bonded to or associated with the functionality carried by the first nucleophile. Moreover, the hexasubstituted benzenes may feature a third nucleophile carrying functionality that may further tailor the bonding or association of the analyte or contaminant with the first nucleophile or alter the detection signature provided by the second nucleophile.

Illustrative analytes or classes of analytes that may undergo detection or contaminants that may undergo sequestration according to the disclosure herein are not considered to be particularly limited and include substances such as, for example, trace metals, salts, organics, poisons, biomarkers, metabolites, hormones, drugs, nerve agents and other chemical warfare agents, explosives, microorganisms (including bacteria, viruses, protozoa, fungi, and the like), and the like. These and similar analytes or contaminants may be analyzed in a diverse range of fields including, for example, process and system monitoring, water and other environmental analyses, health and safety, medical and diagnostic testing, oilfield testing and servicing, agricultural testing, industrial testing, and the like. Other analytes and contaminants and fluids containing the analytes and contaminants may be envisioned by one having ordinary skill in the art.

Processing of a substance in need of contaminant remediation may also be conducted using the macroparticulates disclosed herein, including macroparticulates containing a hexasubstituted benzene or those lacking a hexasubstituted benzene. Contaminant remediation methods of the present disclosure may comprise: exposing a substance in need of contaminant remediation to a plurality of macroparticulates of the present disclosure, forming contaminant-laden macroparticulates by adsorbing or bonding a contaminant from the substance in need of contaminant remediation onto a surface of the macroparticulates, and separating the contaminant-laden macroparticulates from the substance in need of contaminant remediation. The contaminant-laden macroparticulates may comprise any amount one or more contaminants up to a saturation content. As such, the term "contaminant-laden" is not intended to imply that the macroparticulates are necessarily saturated with the contaminant(s) when separated from the substance. Instead, any non-zero amount of contaminant may be present in contaminant-laden macroparticulates.

Contaminants subject to sequestration according to the disclosure herein may include contaminants within contaminated water (e.g., industrial water, waste water, produced water from a wellbore, cooling tower water, mining runoff water, agricultural runoff water, catalyst refining water, electronics etching water, flood water, sea water, or the like) or aqueous fluids containing a water-miscible solvent (trace or non-trace amounts of water-miscible solvent). Organic liquids in need of contaminant remediation may also undergo processing according to the disclosure herein, provided that the macroparticulates are not incompatible with the organic liquid. Contaminants that may be at least partially sequestered according to the present disclosure include, for example, divalent metals, such as calcium, magnesium, barium or strontium; monovalent metals, such as lithium, sodium, potassium, rubidium or cesium; monovalent anions such as chloride, bromide or iodide; transition metals, particularly divalent and trivalent transition metals; polyatomic anions such as $BO_4^-$, $SO_4^{2-}$, or $PO_4^{3-}$; or hydrophobic substances, such as oil and oil components. An oil spill, for example, may be contacted with the macroparticulates and then collected for removal of the oil. On water, free macroparticulates having substantial water buoyancy may be retained with a containment boom, if desired. The morphology of the macroparticulates disclosed herein may provide advantageous buoyancy in this regard. Divalent alkaline earth metal ions may be particularly desirable to remove from a contaminated water source due to their propensity to promote scaling and precipitation, particularly during a subterranean treatment operation. Other specific examples of contaminants that may be sequestered include particular metal ions or their counterions, as specified above.

Remediation methods and systems of the present disclosure may incorporate any of the macroparticulates described herein, particularly with the plurality of macroparticulates being disposed in a removable cartridge or filter pod to facilitate disposition of the macroparticulates within a continuous flow or continuous flow line. Alternately, the plurality of macroparticulates may freely circulate in the continuous flow while still performing their contaminant remediation function. Systems featuring static or batch contacting conditions between the macroparticulates and the substance in need of contaminant remediation are also contemplated herein.

The substance in need of contaminant remediation may be provided as a continuous flow to the plurality of macroparticulates. Particular embodiments employing a continuous flow of a substance in need of contaminant remediation may comprise providing a continuous flow of a substance in need of contaminant remediation; determining a pre-purification contaminant profile of the substance in the continuous flow; exposing the substance to a plurality of macroparticulates, particularly with the macroparticulates being housed in a removable cartridge that may be replaced without disrupting the continuous flow; forming contaminant-laden macroparticulates by adsorbing or bonding a contaminant from the substance in need of contaminant remediation onto a surface of the macroparticulates; and determining a post-purification contaminant profile of the substance in need of contaminant remediation in the continuous flow after exposing the substance to the plurality of macroparticulates.

The contaminant-laden macroparticulates may comprise any amount of contaminant up to a saturation content. To determine whether the contaminant-laden macroparticulates have reached a saturation content, the remediation methods of the present disclosure may further comprise visually or spectroscopically interrogating the plurality of macroparticulates while the plurality of macroparticulates is exposed to the continuous flow, and determining whether the plurality of macroparticulates has become saturated with the contaminant. Spectroscopic interrogation, for example, may comprise measuring an intensity of a spectroscopic signature associated with a dye that is adsorbed on a surface of the macroparticulates or a spectroscopically active group associated with the macroparticulates, wherein the spectroscopic signature of the spectroscopically active group varies with the amount of contaminant sequestered by the macroparticulates. If the spectroscopic signature continues to change in intensity over time, the changing intensity may be indicative that the macroparticulates are continuing to sequester additional contaminants and have not yet become saturated. Conversely, if the spectroscopic signature begins to plateau, this may be indicative that the macroparticulates have become saturated. In some instances, a spectroscopic signature associated with a sequestered contaminant may be interrogated to determine whether saturation has occurred, which may take place with or without an adsorbed dye being present.

Alternately, the substance in need of contaminant remediation within the continuous flow may be directly interrogated visually or spectroscopically to determine if the macroparticulates are still functioning effectively and potentially in need of replacement. A changing or plateauing spectroscopic signature of a contaminant in the substance in need of contaminant remediation may be indicative of whether saturation of the macroparticulates has occurred.

Should it be determined that the contaminant-laden macroparticulates have become saturated with one or more contaminants, methods of the present disclosure may comprise replacing the plurality of macroparticulates without disrupting the continuous flow. Replacing the plurality of macroparticulates without disrupting the continuous flow may be particularly facile when the macroparticulates are housed in one or more removable cartridges that are disposed within or in latent fluid communication with the continuous flow. Suitable configurations for the one or more removable cartridges to avoid disruption of the continuous flow are described in more detail hereinbelow in reference to the drawings of remediation systems capable of processing a continuous flow line.

After the substance in need of contaminant remediation has interacted with the plurality of macroparticulates, a post-purification contaminant profile may be determined in-line within the continuous flow in order to determine if remediation of the substance has succeeded. If contaminant levels have been decreased to sufficiently low concentrations, the substance in need of contaminant remediation (now sufficiently remediated) may continue to the end of the continuous flow line for further processing or disposal. If contaminant levels have not been decreased sufficiently and the post-purification contaminant profile exceeds a specified contaminant threshold, the substance in need of contaminant remediation (now partially remediated) may be recirculated to a location upstream of the plurality of macroparticulates or directly to the plurality of macroparticulates, such that the substance may pass through the macroparticulates one or more additional times until contaminant levels have been decreased sufficiently. Thus, depending on the post-purification contaminant profile, methods of the present disclosure may comprise recirculating the substance in need of contaminant remediation to the plurality of macroparticulates if the post-purification contaminant profile exceeds a specified contaminant threshold.

In addition, the remediation methods disclosed herein may further include recovering a contaminant of interest from the macroparticulates as a valuable resource. In the case of one or more metals captured by the macroparticulates, the macroparticulates may be separated from a remediated water source and then undergo a decomplexation reaction to recover the one or more metals. In some instances, decomplexation may be accomplished by exposing the macroparticulates to an aqueous acid or other suitable reagent that promotes a less favorable binding environment. Alternately, the macroparticulates and their associated ligands may be pyrolyzed to recover the one or more metals as an oxide residue. Hydrophobic substances may be recovered by exposing the macroparticulates to a larger quantity of a low-value hydrophobic material that may competitively displace a higher-value hydrophobic substance from the macroparticulates. Alternately, one may apply a mechanical load and physically press (squeeze) captured hydrophobic materials, such as oil, from the macroparticulates.

The substance undergoing contaminant remediation according to the disclosure herein may comprise contaminated water, according to particular embodiments of the present disclosure. The contaminated water may be obtained from a wellbore at a job site, and may comprise produced water or flowback water obtained from a wellbore, according to particular embodiments of the present disclosure. The flowback water may comprise a spent or partially spent treatment fluid in some instances. Other industrial or commercial water sources in need of contaminant remediation also may be processed according to the disclosure herein, such as cooling tower water, mining runoff water, agricultural runoff water, pool water, drinking water sources, electronic etching water, catalyst refining water, flood water, sea water or the like. It is to be appreciated that aqueous fluids containing a water-miscible solvent (trace or non-trace amounts of water-miscible solvent) may also undergo processing according to the disclosure herein. Organic liquids in need of contaminant remediation may also undergo processing according to the disclosure herein, provided that the macroparticulates are not incompatible with the organic liquid. Incompatible organic liquids may at least partially dissolve the macroparticulates, for example.

The contaminant that becomes sequestered upon the macroparticulates is not believed to be particularly limited. A single contaminant from the substance in need of contaminant remediation may become sequestered upon the macroparticulates, or multiple contaminants may become sequestered. It is to be appreciated that multiple contaminants may become sequestered via different ligands and/or by different sequestration mechanisms. Multiple types of macroparticulates having different functionality thereon may be employed within a continuous flow line in order to promote purification to desired levels for each contaminant. A pre-purification contaminant profile may be used to determine which of the plurality of macroparticulates that the substance in need of contaminant remediation eventually circulates through within the continuous flow, such as through valves that divert the continuous flow to contact only a desired subset of multiple types of macroparticulates. Contaminants that may be at least partially sequestered from a contaminated water source according to the present disclosure include, for example, divalent metals, such as calcium, magnesium, barium or strontium; monovalent metals, such as lithium, sodium, potassium, rubidium or cesium; monovalent anions such as chloride, bromide or iodide; transition metals, particularly divalent and trivalent transition metals; polyatomic anions such as $BO_4^-$, $SO_4^{2-}$, or $PO_4^{3-}$; or hydrophobic substances, such as oil and oil components. Divalent alkaline earth metal ions may be particularly desirable to remove from a water source due to their propensity to promote scaling and precipitation. Other specific examples of contaminants that may be sequestered by particular functionality upon the macroparticulates include, for example, barium cations, iron cations, sulfate anions, or any combination thereof. Other specific examples of contaminants that may be sequestered include particular metal ions or their counterions, as specified above.

The macroparticulates may have one or more dyes adsorbed thereon when sequestering one or more contaminants according to the disclosure herein. As discussed above, suitable dyes are not considered to be particularly limited and may be chosen based upon the specific contaminants that are present in a given water source undergoing remediation according to the disclosure herein. When present, the dye may be assayed visually or spectrophotometrically to determine the course of a sequestration process employing the macroparticulates. More specifically, suitable dyes may be chosen such that when they interact with a particular analyte of interest, a change in absorbance, fluorescence or luminescence occurs, typically in the wavelength of about 400 nm to about 700 nm. In addition, dyes may be suitably covalently bonded to the macroparticulates as well.

The remediation methods described herein may be further used in conjunction with a subterranean treatment operation in particular embodiments of the present disclosure. Any of the macroparticulates described hereinabove may be used in conjunction with such treatment operations. Selection of particular macroparticulates and functionality associated therewith may be conducted to address one or more specific contaminants present in produced water and/or flowback water obtained from a wellbore at a job site. It is to be understood that produced water and flowback water may be similar in character, since both types of water are obtained from a wellbore concurrently or separately when obtaining a hydrocarbon resource from a wellbore. To provide a source of distinction between the two herein, the term "produced water" refers to the water natively present in a subterranean formation and released in the course of operating a well, and the term "flowback water" refers to water that is introduced into a wellbore (e.g., as a treatment fluid) and is subsequently re-covered from the wellbore at a later time. As such, flowback water may comprise a spent or partially spent treatment fluid in some instances. The water obtained from a wellbore during a treatment operation or during production may be a combination of produced water and flowback water in any proportion. Thus, the contaminant profile of the water may vary widely.

More particularly, embodiments of the remediation methods disclosed herein may allow a treatment fluid to be formulated from produced water or flowback water for subsequent re-introduction into a wellbore. Reclaimed water having a decreased concentration of contaminant compared to contaminated water (e.g., produced water or flowback water) from which the reclaimed water was formed may be separated from contaminant-laden macroparticulates. Thereafter, a treatment fluid may be formed with the reclaimed water, and the treatment fluid may be introduced into a wellbore penetrating a subterranean formation. Provided that remediated water with a sufficient contaminant profile may be provided, any type of treatment fluid may be formulated in accordance with the disclosure herein.

Accordingly, more specific methods may comprise: providing produced water or flowback water from a wellbore; exposing the produced water or flowback water to a plurality of macroparticulates of the present disclosure in a continuous flow path, after determining a contaminant profile of the produced water or flowback water; forming contaminant-laden macroparticulates by adsorbing or bonding a contaminant from the produced water or flowback water onto a surface of the macroparticulates; determining a post-purification contaminant profile after contacting the plurality of macroparticulates with the produced water or flowback water in the continuous flow path; forming a treatment fluid with the produced water or flowback water after a desired contaminant profile has been reached; and introducing the treatment fluid in a wellbore penetrating a subterranean formation.

Suitable treatment operations and treatment fluids that may be facilitated through use of the disclosure herein are not considered to be particularly limited. Illustrative treatment operations that may be facilitated through use of the disclosure herein include, without limitation, drilling operations, stimulation operations, production operations, remediation operations, sand control operations, and the like, which may include, for example, fracturing operations, gravel packing operations, acidizing operations, descaling operations, consolidation operations, workover operations, cleanup operations, and the like.

As used herein, the term "drilling operation" refers to the process of forming a wellbore in a subterranean formation. As used herein, the term "drilling fluid" refers to a fluid used in drilling a wellbore. Suitable drilling fluids may aid in cooling the drill bit, conveying drill cuttings to the surface, and the like.

As used herein, the term "stimulation operation" refers to an activity conducted within a wellbore to increase production therefrom. As used herein, the term "stimulation fluid" refers to a fluid used downhole during a stimulation activity to increase production of a hydrocarbon resource from the subterranean formation. In particular instances, stimulation fluids may include a fracturing fluid or an acidizing fluid.

As used herein, the terms "clean-up operation" or "damage control operation" refer to any operation for removing extraneous material from a wellbore to increase production. As used herein, the terms "clean-up fluid" or "damage control fluid" refer to a fluid used for removing an unwanted material from a wellbore that otherwise blocks flow of a desired fluid therethrough. In one example, a clean-up fluid can be an acidified fluid for removing material formed by one or more perforation treatments. In another example, a clean-up fluid can be used to remove a filter cake upon the wellbore walls.

As used herein, the term "fracturing operation" refers to a high-pressure operation that creates or extends a plurality of flow channels (fractures) within a subterranean formation. As used herein, the term "fracturing fluid" refers to a viscosified fluid used in conjunction with a fracturing operation, particularly to deliver a plurality of proppant particulates a fracture to maintain the fracture in an open condition once hydraulic pressure has been released. Fracturing fluids, in particular, may be especially susceptible to the presence of contaminants, which may inhibit proper viscosification for conveying the proppant particulates.

As used herein, the term "remediation operation" refers to any operation designed to maintain, increase, or restore a specific rate of production from a wellbore, which may include stimulation operations or clean-up operations. As used herein, the term "remediation fluid" refers to any fluid used in conjunction with a remediation operation.

As used herein, the term "acidizing operation" refers to any operation designed to remove an acid-soluble material from a wellbore, particularly an acid-soluble material that comprises at least a portion of the subterranean formation. As used herein, the term "acidizing fluid" refers to a fluid used during an acidizing operation.

As used herein, the term "spotting fluid" refers to a fluid designed for localized treatment of a subterranean formation. In one example, a spotting fluid can include a lost circulation material for treatment of a specific section of the wellbore, such as to seal off fractures in the wellbore and prevent sag. In another example, a spotting fluid can include a water control material or material designed to free a stuck piece of drilling or extraction equipment.

As used herein, the term "completion fluid" refers to a fluid used during the completion phase of a wellbore, including cementing compositions and cementing fluids.

As used herein, the term "cementing fluid" refers to a fluid used during cementing operations within a wellbore penetrating a subterranean formation.

Treatment fluids formulated with reclaimed water generated from produced water or flowback water may comprise any number of further additives that are commonly used in the oilfield services industry. Illustrative additives that may be present in the treatment fluids disclosed herein include, for example, surfactants, viscosifiers, gelling agents, gel stabilizers, anti-oxidants, polymer degradation prevention additives, relative permeability modifiers, scale inhibitors, corrosion inhibitors, chelating agents, foaming agents, defoaming agents, antifoaming agents, emulsifying agents, de-emulsifying agents, iron control agents, proppants or other particulates, particulate diverters, salts, acids, fluid loss control additives, gas, catalysts, other clay control agents, dispersants, flocculants, scavengers (e.g., $H_2S$ scavengers, $CO_2$ scavengers or $O_2$ scavengers), lubricants, breakers, friction reducers, bridging agents, weighting agents, solubilizers, pH control agents (e.g., buffers), hydrate inhibitors, consolidating agents, bactericides, catalysts, the like, and any combination thereof. Suitable examples of these additives will be familiar to one having ordinary skill in the art.

Remediation systems of the present disclosure incorporating the concepts described hereinabove may include those capable of continuously processing a substance in need of contaminant remediation, such as a continuous stream of contaminated water. Particular implementations of the remediation systems may comprise: a continuous flow line configured to receive a substance in need of contaminant remediation; a plurality of macroparticulates of the present disclosure located within the continuous flow line; and at least one detector configured to interrogate the substance in need of contaminant remediation or the plurality of macroparticulates within the continuous flow line. Any of the macroparticulates disclosed herein may be employed in the remediation systems. In some embodiments, the remediation systems may further comprise a first contaminant interrogation zone upstream of the plurality of macroparticulates; and a second contaminant interrogation zone downstream of the plurality of macroparticulates.

The plurality of macroparticulates may be housed in one or more removable cartridges when disposed within the continuous flow line. Accordingly, particular remediation systems of the present disclosure may comprise: a continuous flow line configured to receive a substance in need of contaminant remediation; one or more removable cartridges disposed within the continuous flow line, the one or more removable cartridges containing a plurality of macroparticulates; and a detector configured to interrogate the substance in need of contaminant remediation or the plurality of macroparticulates within the continuous flow line. The remediation systems may further comprise a first contaminant interrogation zone upstream of the one or more removable cartridges; and a second contaminant interrogation zone downstream of the one or more removable cartridges. One or more detectors may be configured for interrogating the substance in each contaminant interrogation zone. The one or more cartridges may be removable without disrupting a flow of the substance in need of contaminant remediation through the continuous flow line. In further particular embodiments, contaminant-laden macroparticulates not within the continuous flow, but in latent fluid communication therewith, may themselves be exposed to a continuous flow of a reagent suitable to promote decomplexation or removal of a contaminant from the macroparticulates. If desired, the contaminant may then be recovered from the reagent following decomplexation or removal of the contaminant. Thus, particular embodiments may employ at least a first plurality of macroparticulates located within a continuous flow containing at least one contaminant, and a second plurality of macroparticulates in latent fluid communication with the continuous flow containing the at least one contaminant, wherein the macroparticulates in latent fluid communication with the continuous flow are themselves exposed to a separate continuous flow of a reagent suitable for promoting removal of a contaminant from the macroparticulates.

As discussed above, suitable macroparticulates for use in the remediation systems may comprise a reaction product of an epoxide-containing (meth)acrylic polymer or copolymer and a compound bearing a nitrogen nucleophile, in which the epoxide-containing acrylic polymer is formed into a predetermined shape prior to conversion into the reaction product, and the reaction product has a larger volume than does the predetermined shape from which the reaction product was produced. Any of the macroparticulates described herein may be employed in the remediation systems.

Alternative remediation systems of the present disclosure may incorporate macroparticulates that are not housed in a removable cartridge. The remediation systems may circulate a substance in need of contaminant remediation through a packed bed of the macroparticulates (e.g., in a filter pod) or freely circulate the macroparticulates within the continuous flow line to promote contaminant removal. When free macroparticulates become saturated with a contaminant of interest, the macroparticulates may be replaced, as may be performed for macroparticulates housed within a removable cartridge. Swing bed configurations for free macroparticulates in a packed bed within a continuous flow line, similar to those discussed below for macroparticulates housed in a removable cartridge, may be employed to allow continuous processing of a substance to take place for promoting contaminant remediation. Accordingly, such remediation systems may comprise a continuous flow line configured to receive a substance in need of contaminant remediation; one or more types of macroparticulates disposed within the continuous flow line, in sequence and/or parallel; and a detector configured to interrogate the substance in need of contaminant remediation or the plurality of macroparticulates within the continuous flow line. The macroparticulates may be present in a packed bed or freely circulate in the continuous flow line. When employing a packed bed, the remediation systems may further comprise a first contaminant interrogation zone upstream of the one or more types of macroparticulates, and a second contaminant interrogation zone downstream of the one or more types of macroparticulates. The systems are operable to promote removal of a contaminant in the continuous flow line without disrupting a flow through the continuous flow line. Any of the macroparticulates described herein may be employed. Freely circulating macroparticulates may be filtered or decanted off when macroparticulate replacement is needed. Static treatment of a contaminated fluid with contained (e.g., in a cartridge or similar vessel) or free macroparticulates are also contemplated herein.

When used, the one or more removable cartridges may be configured for visual or spectroscopic interrogation of the plurality of macroparticulates. Visual or spectroscopic interrogation may be conducted by viewing or spectroscopically analyzing the color of a dye adsorbed or covalently bonded to the macroparticulates in particular embodiments of the present disclosure. Spectroscopically active groups upon the macroparticulates may be assayed similarly. Depending on how interrogation of the macroparticulates is being performed, the cartridges may comprise one or more windows that is transparent to visible light to afford visual inspection of the condition of the one or more cartridges or transparent to a wavelength of electromagnetic radiation suitable for assaying the condition of the cartridges (e.g., UV, visible, or the like). Spectroscopic assays of the condition of the macroparticulates may be made by any suitable analysis technique, including UV/VIS spectrophotometric or colorimetric techniques, fluorescence, or the like.

The remediation systems of the present disclosure may employ a plurality of removable cartridges, which may comprise two or more cartridges configured to sequester a particular contaminant of interest. As such, the one or more removable cartridges may comprise at least one or more first cartridges configured to sequester a first contaminant and one or more second cartridges configured to sequester a second contaminant different than the first contaminant. When sequestration of multiple contaminants is desired, the remediation systems may employ two or more cartridges configured to sequester each type of contaminant. Thus, when sequestering two different contaminants that are not addressable with a single type of macroparticulate, the remediation systems may comprise two or more first cartridges and two or more second cartridges containing different macroparticulates than the at least two first cartridges.

When two or more cartridges containing macroparticulates of a particular type are present in the remediation systems, at least one of the two or more cartridges may be disposed in the continuous flow line and at least one of the two or more cartridges may be in latent fluid communication with the continuous flow line. Particular configurations may include those in which the two or more cartridges are disposed in a swing bed configuration within the continuous flow line or the two or more cartridges are arranged upon a movable assembly in fluid communication with the continuous flow line. Movable assemblies may include those capable of moving linearly, rotationally, or in a loop. Further disclosure is provided hereinafter in reference to the drawings. By maintaining at least one cartridge in latent fluid communication with the continuous flow line, processing of the substance in need of contaminant remediation may take place continuously without disrupting flow while replacing a cartridge containing macroparticulates that are no longer performing effectively. Likewise, the macroparticulates within the cartridges in latent fluid communication with the continuous flow may be regenerated with a continuous flow of a reagent suitable for promoting release of a contaminant from the macroparticulates. Thus, particular embodiments may feature at least one cartridge within the continuous flow line and at least one cartridge being regenerated for return to the continuous flow line, such that processing of a fluid within the continuous flow line may continue uninterrupted, if desired.

Figure 2A:
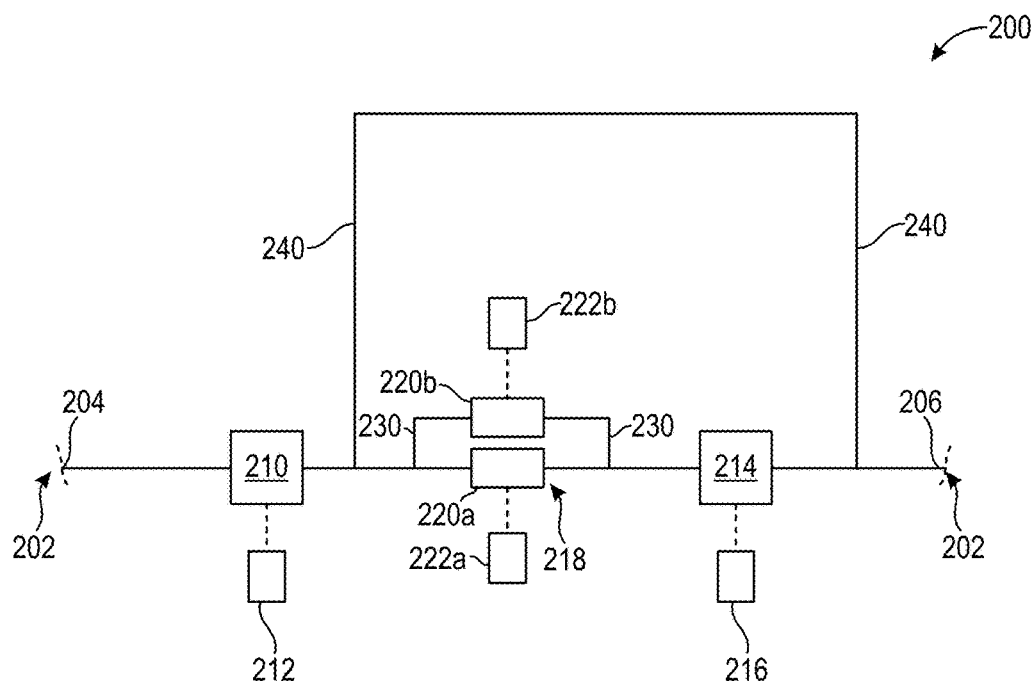
FIGS. 2A and 2B show diagrams of a remediation system employing functionalized macroparticulates disposed in removable cartridges in a swing bed arrangement.

FIG. 2A shows a diagram of a remediation system of the present disclosure in which multiple cartridges are arranged in a swing bed configuration. As shown, remediation system 200 includes continuous flow line 202 having inlet end 204 and outlet end 206. A substance in need of contaminant remediation enters continuous flow line 202 through inlet end 204 and proceeds to contaminant interrogation zone 210, in which the substance may be spectrophotometrically assayed using spectrophotometer 212. It is to be appreciated that non-spectrophotometric assays may also take place within contaminant interrogation zone 210, such as pH measurement or electrochemical assays, for example.

After being assayed to determine a contaminant profile in contaminant interrogation zone 210, the substance then proceeds to remediation section 218, which includes functionalized macroparticulates suitable for remediating a contaminant of interest. The contaminant profile determined in contaminant interrogation zone 210 may inform an operator or artificial intelligence associated with remediation system 200 whether the functionalized macroparticulates are suitably functionalized to remediate the contaminant of interest and whether a sufficient quantity of the functionalized macroparticulates are present to address the concentration of the contaminant of interest that is present in the substance. In particular, in the configuration shown in FIG. 2A, the functionalized macroparticulates are housed in two removable cartridges 220a and 220b that are arranged in a swing bed configuration. In a swing bed configuration, only one of removable cartridges 220a and 220b have substance flowing therethrough at a given point in time. For example, substance may be flowing through removable cartridge 220a, and line 230 may be shut off to preclude flow through removable cartridge 220b. Though not shown, a continuous flow of a reagent suitable for promoting contaminant removal may be flowed through removable cartridge 220b in preparation for return thereof to continuous flow line 202. Although a swing bed configuration may be desirable to allow uninterrupted flow through continuous flow line 202, it is to be appreciated that removable cartridges 220a and 220b may also be operated in parallel in some instances.

The condition of removable cartridge 220a may be monitored using spectrophotometer 222a, such as through colorimetric analysis of a spectroscopically active group or an adsorbed dye on the macroparticulates within removable cartridge 220a or a density change experienced by the macroparticulates. Alternately, the concentration of a spectrophotometrically active contaminant upon the functionalized macroparticulates may be monitored directly in some instances. Still further alternately, a color change in an adsorbed dye may be monitored visually to evaluate whether the macroparticulates have become saturated with contaminant.

When it is determined that removable cartridge 220a has become saturated with a contaminant of interest, system 200 may automatically divert the continuous flow through branch line 230 to removable cartridge 220b Manual diversion of the continuous flow may also take place in some cases. Upon being remediated in removable cartridge 220b, the remediated substance may return to continuous flow line 210 for further analysis, as described hereinafter. A continuous flow of a reagent suitable for promoting contaminant removal from the macroparticulates in removable cartridge 220a may then be employed in preparation for reuse thereof once the macroparticulates in removable cartridge 220b have become laden with contaminant. Like removable cartridge 220a, the condition of the macroparticulates within removable cartridge 220b may be monitored using spectrophotometer 222b. While flow is being diverted to removable cartridge 220b, removable cartridge 220a may be replaced, either automatically under the direction of remediation system 200 or manually, or inline regeneration thereof may take place, as discussed above. Although FIG. 2A has depicted removable cartridges 220a and 220b as being substantially the same size, it is to be appreciated that they may also be different in size. For example, removable cartridge 220a may be a larger, primary cartridge and removable cartridge 220b may be a smaller, secondary cartridge of sufficient size to support continuous flow during a brief replacement time or regeneration period for removable cartridge 220a.

After exiting remediation section 218, the substance proceeds to contaminant interrogation zone 214, wherein the contaminant profile of the substance may be evaluated a second time using spectrophotometer 216. Analysis of the substance may take place in a manner similar to that described above for contaminant interrogation zone 210. By analyzing the substance downstream of remediation section 218, a determination may be made of the remediation effectiveness promoted by the macroparticulates.

If the fluid has been satisfactorily remediated, as determined by the analyses taking place in contaminant interrogation zone 214, the fluid may proceed through continuous flow line 202 and exit via outlet end 206. If satisfactory remediation has not taken place (e.g., if contaminant concentrations in the substance have not been reduced below a threshold concentration), system 200 may automatically divert the continuous flow through recirculation line 240 to a location upstream of remediation section 218, after which the substance may pass through one of removable cartridges 220a or 220b to promote further removal of a contaminant of interest.

Figure 2B:
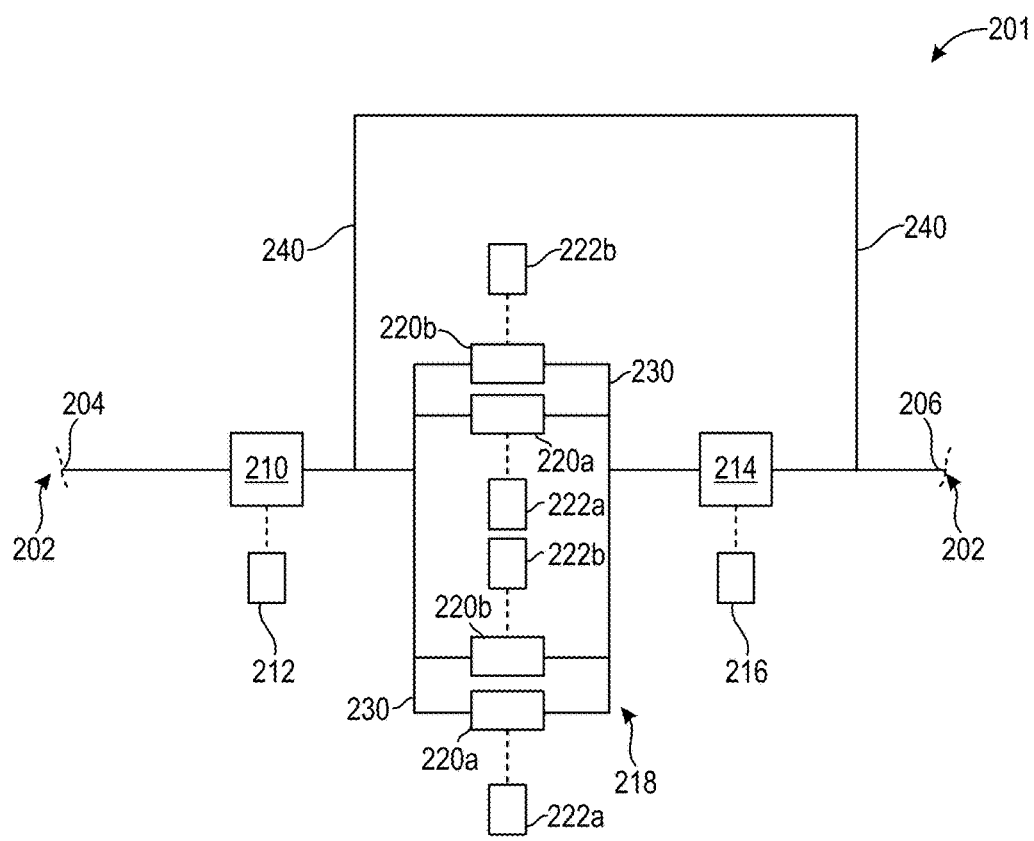

Although FIG. 2A has shown a single remediation section 218 containing two removable cartridges 220a and 220b, it is to be appreciated that additional system configurations may include those having multiple remediation sections 218, each containing macroparticulates that are suitable for addressing a particular contaminant of interest. The multiple remediation sections 218 may be arranged in parallel or in series for remediating multiple contaminants having differing remediation characteristics. For example, FIG. 2B shows a diagram of remediation system 201 of the present disclosure in which two swing bed arrangements of removable cartridges are configured in parallel.

Parallel arrangements of multiple remediation sections 218 having a swing bed arrangement of multiple removable cartridges may be desirable when a substance may contain either of two or more contaminants. Thus, in such situations, the substance may be routed by system 201 to an appropriate remediation section for addressing the particular contaminant. Parallel arrangements may also be utilized when the fluid passes through a first remediation section 218 to address a first contaminant and then is returned via recirculation line 240 for passage through a second remediation section 218 to address a second contaminant.

Series arrangements of multiple remediation sections 218 having a swing bed arrangement of multiple removable cartridges may be desirable when a substance contains two or more contaminants that each need remediation. Thus, in such situations, the substance may pass sequentially through first and second remediation sections 218 to address each contaminant in sequence. Recirculation line 240 may return the substance to either remediation section 218 for further remediation, if needed, such that the substance does not need to pass through any unnecessary upstream remediation sections 218. In addition, any remediation sections 218 in series arrangement that are not needed for conducting a particular remediation may be bypassed with a bypass line, if warranted or desired. Routing of the substance through the bypass line may be initiated automatically by the system or manually at the direction of an operator.

Other system configurations include those in which multiple removable cartridges are arranged upon a movable assembly. Movable assemblies include those that may move the removable cartridges rotationally, laterally, or in a continuous loop. Movable assemblies may convey operational flexibility to remediation systems of the present disclosure, since different types of macroparticulates may be inserted into a continuous flow line depending upon particular application needs.

It is to be appreciated that if a fluid having a known contaminant profile is being circulated in continuous flow line 202, and/or if removable cartridges 220a and 220b are being replaced on a set schedule, and/or if a fixed volume of fluid is being contacted with the macroparticulates, analysis of the fluid and/or removable cartridges 220a and 220b may optionally be omitted. Thus, in such embodiments, any of spectrophotometers 212, 222a, 222b and 216 may be optional.

Figure 3A:
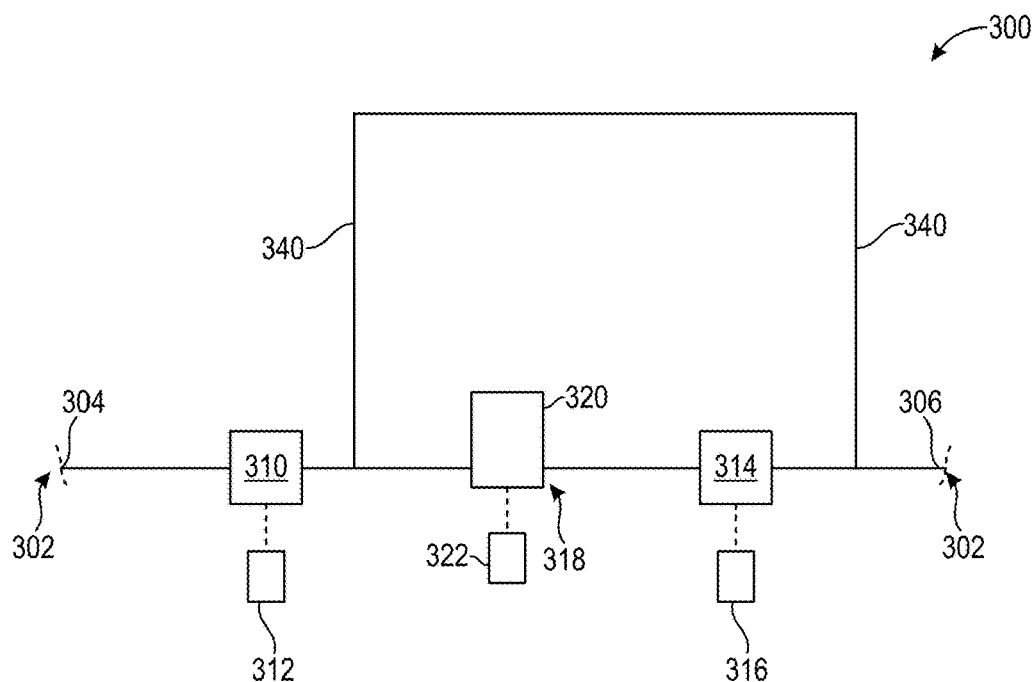
FIGS. 3A and 3B show diagrams of a remediation system employing functionalized macroparticulates disposed in removable cartridges located upon a movable assembly.

FIG. 3A shows a diagram of a remediation system of the present disclosure in which multiple removable cartridges containing functionalized macroparticulates are arranged upon a movable assembly. As shown, remediation system 300 includes continuous flow line 302 having inlet end 304 and outlet end 306. A substance in need of contaminant remediation enters continuous flow line 302 through inlet end 304 and proceeds to contaminant interrogation zone 310, in which the substance may be spectrophotometrically assayed using spectrophotometer 312. It is to be appreciated that non-spectrophotometric assays may also take place within contaminant interrogation zone 310, such as pH measurement or electrochemical assays, for example.

Figure 4A:
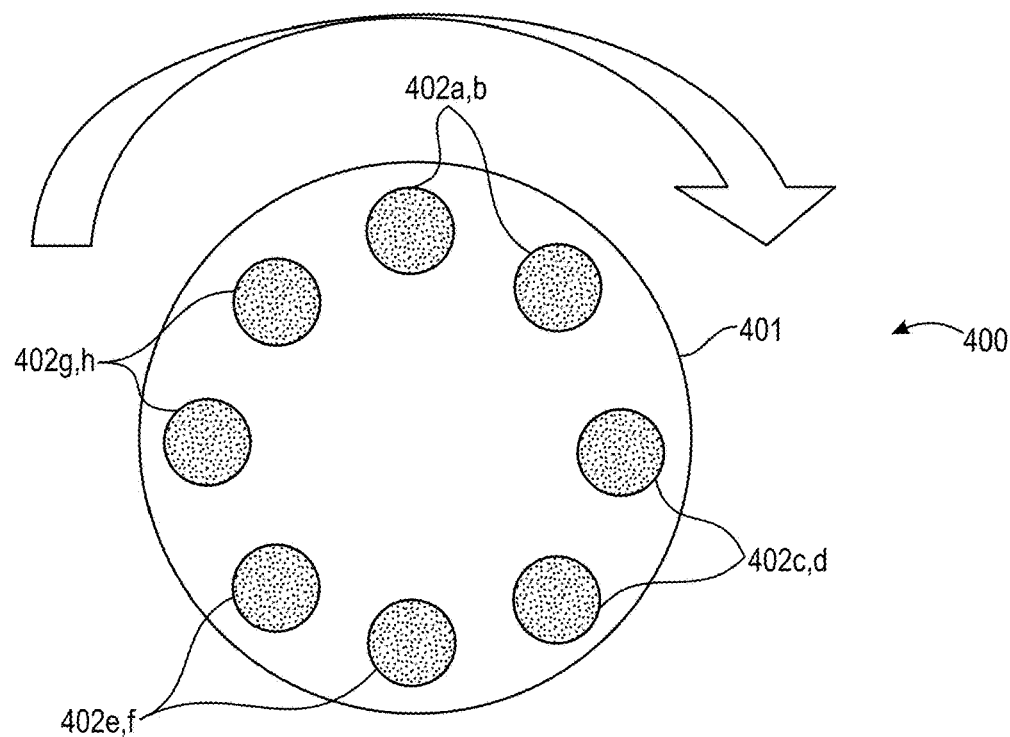
FIGS. 4A and 4B show diagrams of illustrative movable assemblies containing removable cartridges containing functionalized macroparticulates.
Figure 4B:
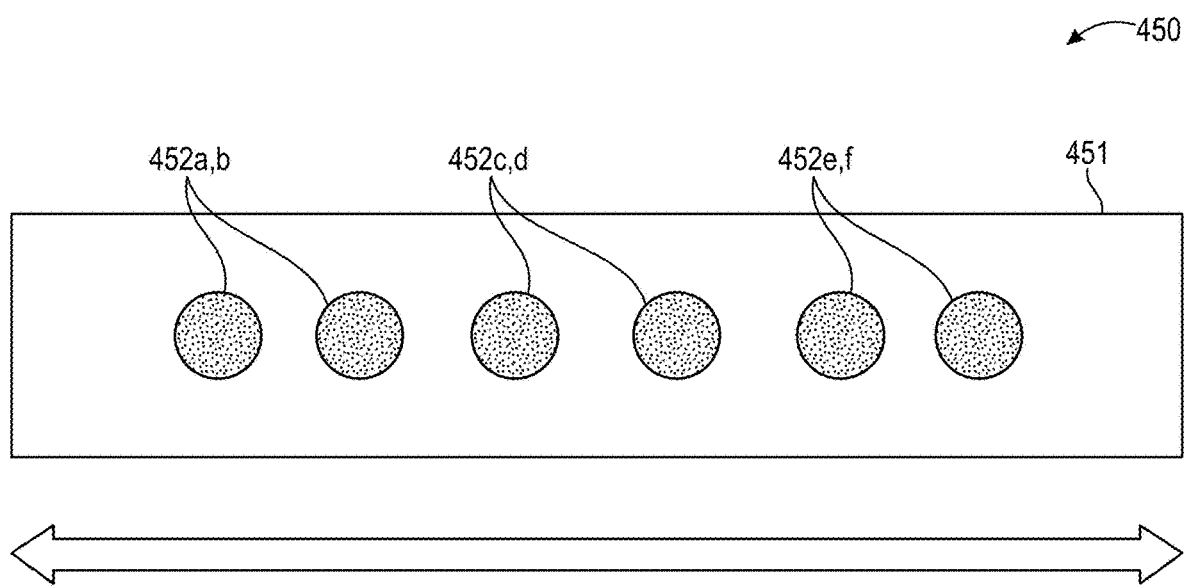

After being assayed to determine a contaminant profile in contaminant interrogation zone 310, the fluid then proceeds to remediation section 318, which may include macroparticulates of different types suitable for remediating a particular contaminant of interest. Depending on the contaminant profile determined in contaminant interrogation zone 310, appropriate macroparticulates in a removable cartridge within remediation section 318 may be selected by system 300. In particular, in the system configuration shown in FIG. 3A, macroparticulates of different types are arranged upon movable assembly 320, which may contain multiple removable cartridges containing the macroparticulates. Two suitable configurations for movable assembly 320 are shown in FIGS. 4A and 4B, which are described in further detail below. Any cartridges upon movable assembly 320 that are not located within continuous flow line 302 may undergo regeneration with a separate continuous flow of reagent suitable for promoting separation of a contaminant from the macroparticulates.

The condition of the macroparticulates within a removable cartridge within movable assembly 320 may be monitored using spectrophotometer 322, such as through colorimetric analysis of an adsorbed dye on the macroparticulates. Alternately, the concentration of a spectrophotometrically active contaminant upon the macroparticulates may be monitored directly in some instances. Still further alternately, a color change in an adsorbed dye may be monitored visually to evaluate whether the macroparticulates have become saturated with contaminant.

When it is determined that the macroparticulates within a given removable cartridge have become saturated with a contaminant of interest, system 300 may operate movable assembly 320 (i.e., by rotation or lateral movement) to insert a fresh cartridge containing suitable macroparticulates into continuous flow line 300. The spent cartridge may then be removed from movable assembly 320 and replaced with a fresh cartridge containing macroparticulates of a desired type. Alternately, regeneration of the macroparticulates within the spent cartridge may take place using a continuous flow of reagent suitable for promoting contaminant removal, as discussed above. Movable assembly 320 may contain pairs of cartridges configured for remediating a particular contaminant of interest, so as not to disrupt the continuous flow through continuous flow line 300 when remediating the particular contaminant. Upon being remediated in remediation section 318, the fluid continues to proceed through continuous flow line 310 for further analysis, as described hereinafter.

After exiting remediation section 318, the substance proceeds to contaminant interrogation zone 314, wherein the contaminant profile of the substance may be evaluated a second time using spectrophotometer 316. Analysis of the fluid may take place in a manner similar to that described above for contaminant interrogation zone 310. By analyzing the substance downstream of remediation section 318, a determination may be made of the remediation effectiveness promoted by the macroparticulates.

If the substance has been satisfactorily remediated, as determined by the analyses taking place in contaminant interrogation zone 314, the substance may proceed through continuous flow line 302 and exit via outlet end 306. If satisfactory remediation has not taken place (e.g., if contaminant concentrations in the substance have not been reduced below a threshold concentration), system 300 may automatically divert the continuous flow through recirculation line 340 to a location upstream of remediation section 318, after which the substance may again pass through the macroparticulates within remediation section 318 to promote further removal of a contaminant of interest.

Figure 3B:
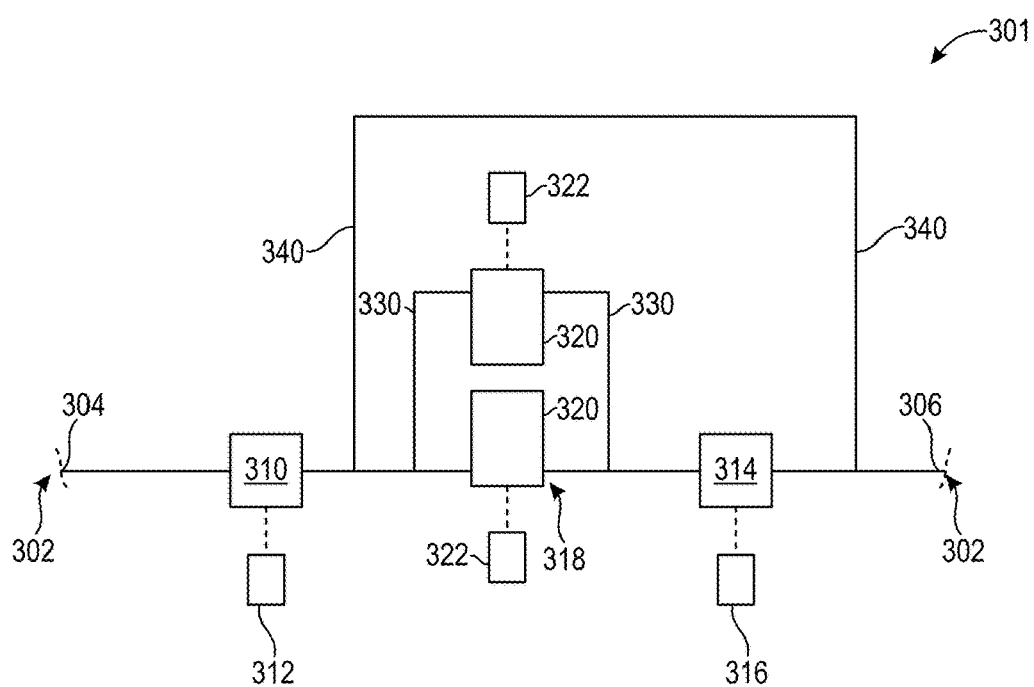

Although FIG. 3A has shown a single remediation section 318 containing removable cartridges, it is to be appreciated that additional system configurations may include those having multiple remediation sections 318. Each remediation section 318 may contain a movable assembly 320 that may contain different types of macroparticulates. Based on the analyses conducted in contaminant interrogation zone 310, appropriate macroparticulates in each remediation section 318 may be selected for remediating a contaminant of interest. Depending on particular remediation needs, the macroparticulates selected for a given remediation operation may be the same or different. The multiple remediation sections containing multiple removable cartridges may be arranged in parallel or in series for remediating multiple contaminants having differing remediation characteristics. For example, FIG. 3B shows a diagram of remediation system 301 of the present disclosure in which two movable assemblies 320 containing removable cartridges are configured in parallel along branch line 330.

FIG. 4A shows a diagram of a movable assembly that is positionable by rotational motion. As shown, movable assembly 400 may include disk 401, which contains removable cartridges 402*a-h*. Removable cartridges 402*a-h* may include matched pairs (e.g., 402*a,b*; 402*c,d*; 402*e,f* and 402*g,h*), each matched pair containing similar types of macroparticulates, thereby allowing a replacement cartridge to be rotated into place once the functionalized macroparticulates in a first cartridge have become saturated with a contaminant. By having removable cartridges in matched pairs, continuous fluid flow may be maintained while remediating a particular contaminant of interest. Although FIG. 4A has depicted 8 removable cartridges 402*a-h*, it is to be appreciated that more or fewer removable cartridges may be present in particular system configurations. It also is to be appreciated that removable cartridges 402*a-h* need not necessarily be arranged in matched pairs.

FIG. 4B shows a diagram of a movable assembly that is linearly positionable by lateral motion. As shown, movable assembly 450 may include strip 451, which contains removable cartridges 452*a-f*. Removable cartridges 452*a-f* may include matched pairs (e.g., 452*a,b*; 452*c,d*; and 452*e,f*), each matched pair containing similar types of macroparticulates, thereby allowing a replacement cartridge to be moved into place once the macroparticulates in a first cartridge have become saturated with a contaminant. By having removable cartridges in matched pairs, continuous flow may be maintained while remediating a particular contaminant of interest. Although FIG. 4B has depicted 6 removable cartridges 452*a-f*, it is to be appreciated that more or fewer removable cartridges may be present in particular system configurations. It also is to be appreciated that removable cartridges 452*a-f* need not necessarily be arranged in matched pairs.

Alternative flow through configurations include those in which the macroparticulates are disposed in parallel or series packed beds without being housed in a removable cartridge. In swing bed and similar configurations, contaminant sequestration and regeneration of the macroparticulates may take place without disrupting the continuous flow of the substance in need of contaminant remediation through the macroparticulates. Contaminant-laden macroparticulates in latent fluid communication with the continuous flow of the substance in need of contaminant remediation may be regenerated with a continuous flow of a reagent suitable for promoting release of a contaminant from the contaminant-laden macroparticulates.

Still other flow-through configurations include those in which a bag or sock containing the macroparticulates is placed in a continuous flow line, including both process flow lines and natural flow lines such as a river or a stream. Once macroparticulate saturation has occurred, or following a set replacement schedule, the bag or sock can be retrieved and fresh macroparticulates can be introduced to the continuous flow line in a suitable container.

Embodiments disclosed herein include:

A. Contaminant remediation methods. The methods comprise: exposing a substance in need of contaminant remediation to a plurality of macroparticulates; wherein the macroparticulates comprise a reaction product of an epoxide-containing (meth)acrylic polymer or copolymer and a compound bearing a nitrogen nucleophile; forming contaminant-laden macroparticulates by adsorbing or bonding a contaminant from the substance in need of contaminant remediation onto a surface of the macroparticulates; and separating the contaminant-laden macroparticulates from the substance in need of contaminant remediation.

B. Contaminant remediation systems. The systems comprise: a continuous flow line configured to receive a substance in need of contaminant remediation; a plurality of macroparticulates located within the continuous flow line; wherein the macroparticulates comprise a reaction product of an epoxide-containing (meth)acrylic polymer or copolymer and a compound bearing a nitrogen nucleophile; and at least one detector configured to interrogate the substance in need of contaminant remediation or the plurality of macroparticulates within the continuous flow line.

Each of embodiments A and B may have one or more of the following elements in any combination:

Element 1: wherein the epoxide-containing (meth)acrylic polymer or copolymer is formed into a predetermined shape prior to conversion into the reaction product, and the reaction product has a larger volume than does the predetermined shape from which the reaction product was produced.

Element 2: wherein the reaction product contains an internal cavity after reacting the epoxide-containing (meth)acrylic polymer or copolymer with the compound bearing the nitrogen nucleophile.

Element 3: wherein the epoxide-containing (meth)acrylic polymer or copolymer comprises a monomer selected from the group consisting of

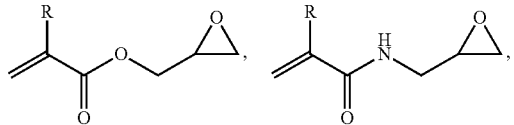

and any combination thereof, wherein R is H or a methyl group.

Element 4: wherein the compound bearing the nitrogen nucleophile comprises iminodiacetic acid, ethylenediamine, N,N'-bis(aminoethyl)ethylenediamine, or tris(aminoethyl) amine.

Element 5: wherein the compound bearing the nitrogen nucleophile is further functionalized after being reacted with the (meth)acrylic polymer or copolymer.

Element 6: wherein the reaction product is substantially spherical in shape.

Element 7: wherein the reaction product has a random shape.

Element 8: wherein the substance in need of contaminant remediation comprises contaminated water.

Element 9: wherein the contaminated water comprises produced water or flowback water obtained from a wellbore.

Element 10: wherein the method comprises separating reclaimed water from the contaminant-laden macroparticulates, the reclaimed water having a decreased concentration of the contaminant compared to the contaminated water; forming a treatment fluid with the reclaimed water; and introducing the treatment fluid into a wellbore penetrating a subterranean formation.

Element 11: wherein the contaminant comprises at least one contaminant selected from the group consisting of a divalent metal, a monovalent metal, a monovalent anion, a divalent or trivalent transition metal, a polyatomic anion, a hydrophobic substance, and any combination thereof.

Element 12: wherein the contaminant comprises at least one contaminant selected from the group consisting of a divalent metal ion, a barium cation, an iron (II) cation, an iron (III) cation, a sulfate anion, and any combination thereof.

Element 13: wherein the contaminant comprises an alkali metal ion, an alkaline earth metal ion, a halide ion, a phosphate, a nitrate, a borate, an arsenate, a silicate, a selenite, a titanium ion, a chromium ion, a manganese ion, an iron ion, a ruthenium ion, an osmium ion, a cobalt ion, a rhodium ion, an iridium ion, a nickel ion, a palladium ion, a platinum ion, a copper ion, a silver ion, a gold ion, a zinc ion, a cadmium ion, a mercury ion, an aluminum ion, a boron ion, and any combination thereof.

Element 14: wherein the method further comprises visually or spectroscopically interrogating the plurality of macroparticulates to determine whether the plurality of macroparticulates has become saturated with the contaminant.

Element 15: wherein the method further comprises recovering the contaminant from the contaminant-laden macroparticulates.

Element 16: wherein the substance in need of contaminant remediation is provided as a continuous flow to the plurality of macroparticulates.

Element 17: wherein the method further comprises determining a pre-purification contaminant profile of the substance in need of contaminant remediation in the continuous flow; and determining a post-purification contaminant profile of the substance in need of contaminant remediation in the continuous flow after exposing the substance to the plurality of macroparticulates.

Element 18: wherein the method further comprises recirculating the substance in need of contaminant remediation to the plurality of macroparticulates if the post-purification contaminant profile exceeds a specified contaminant threshold.

Element 19: wherein the method further comprises visually or spectroscopically interrogating the plurality of macroparticulates or the substance in need of contaminant remediation while the plurality of macroparticulates is exposed to the continuous flow; and determining whether the plurality of macroparticulates has become saturated with the contaminant.

Element 20: wherein the method further comprises replacing the plurality of macroparticulates without disrupting the continuous flow.

Element 21: wherein the plurality of macroparticulates is housed in a removable cartridge.

Element 22: wherein the reaction product is formed from the epoxide-containing (meth)acrylic polymer or copolymer and a polyamine, a first amine of the polyamine forming a covalent bond to the (meth)acrylic polymer or copolymer through opening of an epoxide group or aminolysis of an ester and one or more second amine groups of the polyamine being further modified with one or more functionalities capable of binding or adsorbing at least one contaminant from the substance in need of contaminant remediation after the first amine group has reacted.

Element 23: wherein the polyamine comprises a $C_2$-$C_8$ alkylenediamine, N,N'-bis(aminoethyl)ethylenediamine, or a branched polyamine.

Element 24: wherein one or more removable cartridges are disposed within the continuous flow line, the one or more removable cartridges containing the plurality of macroparticulates.

Element 25: wherein the system further comprises a first contaminant interrogation zone upstream of the one or more removable cartridges; and a second contaminant interrogation zone downstream of the one or more removable cartridges.

Element 26: wherein the one or more removable cartridges comprise a plurality of removable cartridges.

Element 27: wherein the one or more removable cartridges at least comprise one or more first cartridges configured to sequester a first contaminant and one or more second cartridges configured to sequester a second contaminant different than the first contaminant.

Element 28: wherein the one or more first cartridges comprise two or more first cartridges and the one or more second cartridges comprise two or more second cartridges.

Element 29: wherein the one or more removable cartridges comprise two or more cartridges, at least one of the two or more cartridges being disposed in the continuous flow line and at least one of the two or more cartridges being in latent fluid communication with the continuous flow line.

Element 30: wherein the two or more cartridges are arranged in a swing bed configuration within the continuous flow line.

Element 31: wherein the two or more cartridges are arranged upon a movable assembly in fluid communication with the continuous flow line.

Element 32: wherein the one or more removable cartridges are configured for visual or spectroscopic interrogation of the plurality of macroparticulates.

Element 33: wherein the system further comprises a recirculation line configured to recirculate at least a portion of the substance in need of contaminant remediation in the continuous flow line to a location upstream of the one or more removable cartridges.

Element 34: wherein the system further comprises a processor configured to select a plurality of macroparticulates having a selected functionalization based upon a pre-purification contaminant profile of the substance in need of contaminant remediation.

By way of non-limiting example, exemplary combinations applicable to A include, but are not limited to, 1 and 2; 1 and 3; 1 and 4; 1, 3 and 4; 1, 3 and 5; 1 and 3-5; 1, 4 and 5; 1 and 6; 1 and 7; 1 and 8; 1, 8 and 9; 1, 8 and 10; 1 and 8-10; 1, and 11, 12 or 13; 1 and 14; 1 and 15; 1 and 16; 1, 16 and 17; 1 and 16-18; 1, 16 and 19; 1 and 20; 1 and 16-20; 1 and 21; 1 and 16-21; 1 and 22; 1, 22 and 23; 2 and 3; 2 and 4; 2-4; 2, 3 and 5; 2-5; 2, 4 and 5; 2 and 6; 2 and 7; 2 and 8; 2, 8 and 9; 2, 8 and 10; 2 and 8-10; 2, and 11, 12 or 13; 2 and 14; 2 and 15; 2 and 16; 2, 16 and 17; 2 and 16-18; 2, 16 and 19; 2 and 20; 2 and 16-20; 2 and 21; 2 and 16-21; 3 and 4; 3 and 5; 3-5; 3 and 6; 3 and 7; 3 and 8; 3, 8 and 9; 3, 8 and 10; 3 and 8-10; 3, and 11, 12 or 13; 3 and 14; 3 and 15; 3 and 16; 3, 16 and 17; 3 and 16-18; 3, 16 and 19; 3 and 20; 3 and 16-20; 3 and 21; 3 and 16-21; 4 and 5; 4 and 6; 4 and 7; 4 and 8; 4, 8 and 9; 4, 8 and 10; 4 and 8-10; 4, and 11, 12 or 13; 4 and 14; 4 and 15; 4 and 16; 4, 16 and 17; 4 and 16-18; 4, 16 and 19; 4 and 20; 4 and 16-20; 4 and 21; 4 and 16-21; 5 and 6; 5 and 7; 5 and 8; 5, 8 and 9; 5, 8 and 10; 5 and 8-10; 5, and 11, 12 or 13; 5 and 14; 5 and 15; 5 and 16; 5, 16 and 17; 5 and 16-18; 5, 16 and 19; 5 and 20; 5 and 16-20; 5 and 21; 5 and 16-21; 6 or 7, and 8; 6 or 7, 8 and 9; 6 or 7, 8 and 10; 6 or 7, and 8-10; 6 or 7, and 11, 12 or 13; 6 or 7, and 14; 6 or 7, and 15; 6 or 7, and 16; 6 or 7, 16 and 17; 6 or 7, and 16-18; 6 or 7, 16 and 19; 6 or 7, and 20; 6 or 7, and 16-20; 6 or 7, and 21; 6 or 7, and 16-21; 8 and 9; 8 and 10; 8-10; 8, 9, and 11, 12 or 13; 8, 10, and 11, 12 or 13; 8-10, and 11, 12 or 13; 8 and 15; 8, 9 and 15; 8, 10 and 15; 8-10 and 15; 8 and 15; 8, 9 and 15; 8, 10 and 15; 8-10 and 15; 8 and 16; 8, 9 and 16; 8, 10 and 16; 8-10 and 16; 8, and 16 and 17; 8, 9, and 16 and 17; 8, 10, and 16 and 17; 8-10, and 16 and 17; 8 and 16-18; 8, 9 and 16-18; 8, 10 and 16-18; 8-10 and 16-18; 8, and 16 and 19; 8, 9 and 16 and 19; 8, 10, and 16 and 19; 8-10, and 16 and 19; 8 and 16-19; 8, 9 and 16-19; 8, 10 and 16-19; 8-10 and 16-19; 8 and 20; 8, 9 and 20; 8, 10 and 20; 8-10 and 20; 8 and 16-20; 8, 9 and 16-20; 8, 10 and 16-20; 8-10 and 16-20; 8 and 21; 8, 9 and 21; 8, 10 and 21; 8-10 and 21; 8 and 22; 8, 9 and 22; 8, 10 and 22; 8-10 and 22; 11, 12 or 13, and 14; 11, 12 or 13, and 15; 11, 12 or 13, and 16 and 17; 11, 12 or 13, and 16 and 18; 11, 12 or 13, and 16-18; 11, 12 or 13, and 19; 11, 12 or 13, and 20; 11, 12 or 13, and 16-20; 11, 12 or 13, and 21; 11, 12 or 13, and 16-21; 11, 12 or 13, and 22; 11, 12 or 13, and 22 and 23; 14 and 15; 14 and 16; 14, and 16 and 17; 14, and 16 and 18; 14, and 16-18; 14 and 19; 14, and 20; 14, and 16-20; 14 and 21; 14, and 16-21; 14 and 22; 14, and 22 and 23; 15 and 16; 15, and 16 and 17; 15, and 16 and 18; 15, and 16-18; 15 and 19; 15, and 20; 15, and 16-20; 15 and 21; 15, and 16-21; 15 and 22; 15, and 22 and 23; 16 and 17; 16 and 18; 16-18; 16 and 19; 16-19; 16 and 20; 16 and 21; 16 and 22; 16, 22 and 23; 21 and 22; 21-23; and 22 and 23.

By way of further non-limiting example, exemplary combinations applicable to B include, but are not limited to, 1 and 2; 1 and 3; 1 and 4; 1 and 5; 1 and 6; 1 and 7; 1 and 22; 1, 22 and 23; 2 and 3; 2 and 4; 2 and 5; 2 and 6; 2 and 7; 2 and 22; 2, 22 and 23; 3 and 4; 3 and 5; 3 and 6; 3 and 7; 3 and 22; 3, 22 and 23; 4 and 5; 4 and 6; 4 and 7; 4 and 22; 4, 22 and 23; 5 and 6; 5 and 7; 5 and 22; 5, 22 and 23; 6 and 7; 6 and 22; 6, 22 and 23; 7 and 22; 7, 22 and 23; 22 and 23; 1 and 24; 1 and 25; 1 and 26; 1 and 27; 1 and 28; 1 and 29; 1 and 30; 1 and 31; 1 and 32; 1 and 33; 1 and 34; 2 and 24; 2 and 25; 2 and 26; 2 and 27; 2 and 28; 2 and 29; 2 and 30; 2 and 31; 2 and 32; 2 and 33; 2 and 34; 3 and 24; 3 and 25; 3 and 26; 3 and 27; 3 and 28; 3 and 29; 3 and 30; 3 and 31; 3 and 32; 3 and 33; 3 and 34; 4 and 24; 4 and 25; 4 and 26; 4 and 27; 4 and 28; 4 and 29; 4 and 30; 4 and 31; 4 and 32; 4 and 33; 4 and 34; 5 and 24; 5 and 25; 5 and 26; 5 and 27; 5 and 28; 5 and 29; 5 and 30; 5 and 31; 5 and 32; 5 and 33; 5 and 34; 6 and 24; 6 and 25; 6 and 26; 6 and 27; 6 and 28; 6 and 29; 6 and 30; 6 and 31; 6 and 32; 6 and 33; 6 and 34; 7 and 24; 7 and 25; 7 and 26; 7 and 27; 7 and 28; 7 and 29; 7 and 30; 7 and 31; 7 and 32; 7 and 33; 7 and 34; 22 and 24; 22 and 25; 22 and 26; 22 and 27; 22, 23 and 28; 22, 23 and 29; 22, 23 and 30; 22, 23 and 31; 22, 23 and 32; 22, 23 and 33; 22, 23 and 34; 22, 23 and 24; 22, 23 and 25; 22 and 26; 22, 23 and 27; 22, 23 and 28; 22, 23 and 29; 22, 23 and 30; 22, 23 and 31; 22, 23 and 32; 22, 23 and 33; 22, 23 and 34; 24 and 25; 24 and 26; 24, 26 and 27; 24, 26 and 28; 24, 26 and 29; 24, 26 and 30; 24, 26 and 31; 24 and 32; 24 and 33; 24 and 34; 25 and 26; 25-27; 25, 26 and 28; 24, 26 and 29; 25, 26 and 30; 25, 26 and 31; 25 and 32; 25 and 33; 25 and 34; 26 and 27; 26 and 28; 26 and 29; 26 and 30; 26 and 31; 29 and 30; 29 and 31; 29 and 32; 29 and 33; 29 and 34; 32 and 33; 32 and 34; and 33 and 34.

To facilitate a better understanding of the disclosure herein, the following examples of various representative embodiments are given. In no way should the following examples be read to limit, or to define, the scope of the invention.

EXAMPLES

Macroparticulate Formation

Exemplary polymerization conditions. A isopropyl alcohol solution of 0.01033 M CuBr and 3.127 M glycidyl methacrylate was prepared. The total solution volume was 125 mL prior to polymerization. A catalytic amount of the n-butyl imine of 2-pydridinecarboxaldehyde (N-(pyridinyl-2-ylmethylene)butan-1-amine) was added as a ligand for Cu(I), followed by addition of a catalytic amount of azobisisobutyronitrile (AIBN) as a radical polymerization initiator (2:1 molar ratio of ligand to Cu(I), 0.0066 equivalents of Cu(I) per mole of glycidyl methacrylate, and 0.005 g AIBN/g glycidyl methacrylate).

The entire reaction volume was stirred at 85° C. and monitored for signs of polymerization. The polymerization reaction was allowed to continue until the reaction mixture could no longer be stirred effectively, as determined when the magnetic stir bar would no longer spin (approximately 40 minutes at 85° C.). The increase in viscosity is indicative that polymerization to a first polymerization state occurred. Heating was discontinued when the reaction mixture could no longer be stirred effectively.

The polymer was precipitated by addition of 50-100 mL of methanol to the reaction mixture. The supernatant liquid was then decanted, and the polymer was redissolved in dichloromethane. The dichloromethane solution was then washed with an aqueous EDTA solution (0.2 M) to remove residual copper from the polymer. After EDTA extraction was performed, the polymer was again precipitated by addition of methanol (2-2.5 times the volume of the amount of dichloromethane present). Following precipitation, the polymer solids were squeezed to remove excess solvent.

The polymer solids were then cut to size, optionally following extrusion, or rolled directly into substantially spherical balls. Curing at room temperature was then allowed to take place for 12 hours.

After preparation, the spheres were placed in a freezer to keep them from sticking together. When ready to conduct a functionalization reaction, a quantity of spheres was removed from the freezer, weighed and functionalized as described below.

Exemplary Functionalization Conditions. A weighed quantity of trimethylamine (2.5 equivalents relative to the amount of glycidyl methacrylate calculated based upon the pre-weighed amount of polymer comprising the spheres) was combined with a quantity of ethanol (50 mL ethanol per 0.75 g of spheres) containing 0.50 equivalents of iminodiacetic acid (IDA) (relative to the amount of glycidyl methacrylate calculated based upon the pre-weighed amount of polymer comprising the spheres). Prior to addition of the spheres, the mixture was stirred under nitrogen until the IDA dissolved (15-20 minutes).

Once the IDA was fully dissolved, the pre-weighed quantity of poly(glycidyl methacrylate) spheres was removed from the freezer and combined with the reaction mixture. The reaction mixture was then heated for 5 hours at 74° C. or at the reflux temperature of ethanol (78° C.). As the reaction mixture was heated, the spheres expanded from their original size and a cavity formed inside the spheres. After 5 hours, the reaction medium was removed by decantation, and the functionalized macroparticulates were set aside to dry.

Figure 5A:
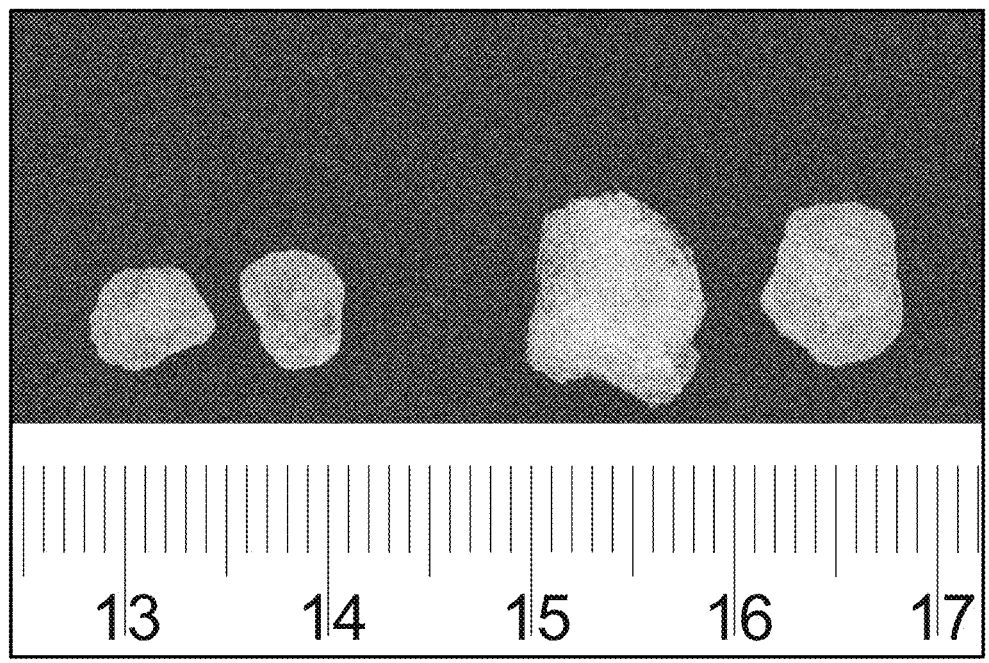
FIG. 5A is a photograph showing poly(glycidyl methacrylate) macroparticulates before and after undergoing functionalization.
Figure 5B:
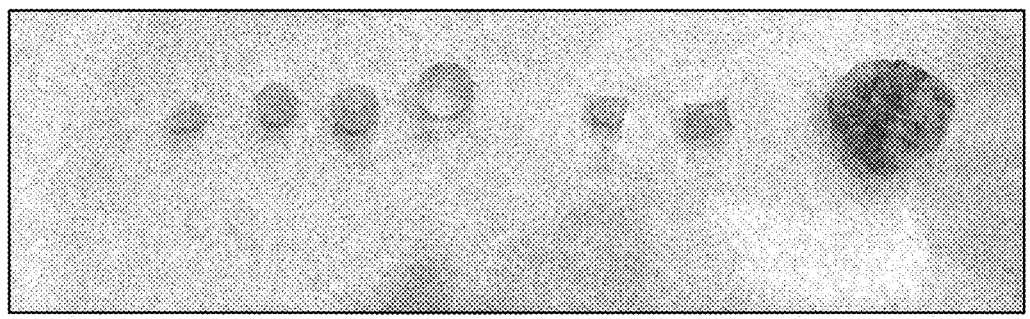
FIG. 5B is a photograph of functionalized poly(glycidyl methacrylate) macroparticulates having various shapes.

Characterization. FIG. 5A is a photograph showing poly (glycidyl methacrylate) macroparticulates before and after undergoing functionalization. FIG. 5B is a photograph of various shaped polyglycidylmethacrylate macroparticulates prepared as above. The shaped macroparticulates in FIG. 5B were prepared from a poly(glycidyl methacrylate) extrudate having an extruded diameter of 2.25 mm (extrudate not shown). Left to right, the functionalized macroparticulates shown in FIG. 5B have diameters or effective sizes of 6.16 mm (spherical), 7.01 mm (spherical), 8.55 mm (spherical), 10.51 mm (spherical), 4.71 mm (pillow-shaped), 5.58 mm (pillow-shaped), and 8-11 mm (irregular shape).

Figure 6:
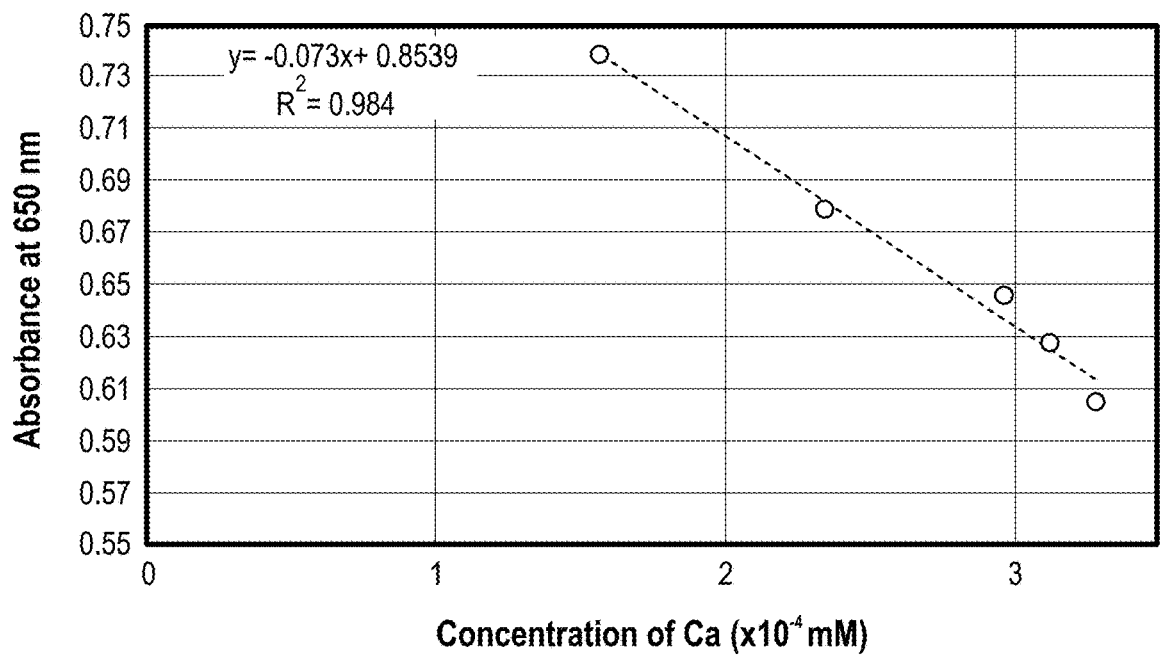
FIG. 6 is a Beer's law plot of dye absorbance at 550 nm in the presence of increasing concentrations of calcium.
Figure 7:
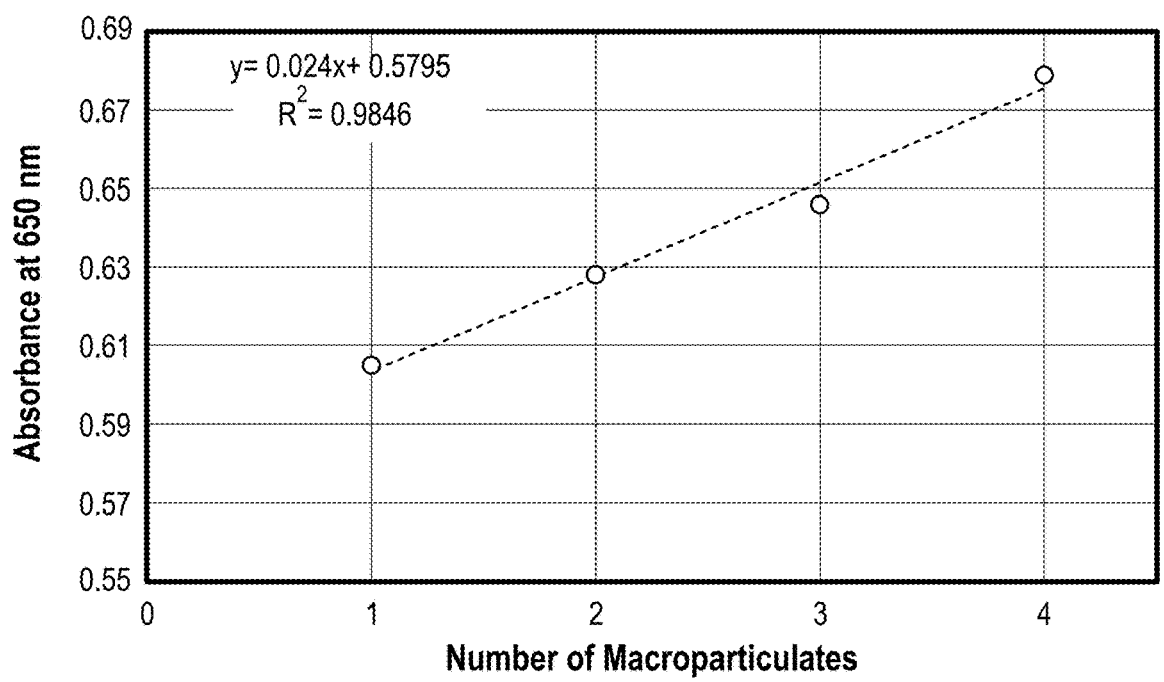
FIG. 7 is a Beer's law plot of dye absorbance at 550 nm as a function of the quantity of macroparticulates contacted with the calcium complex of the dye.

Calcium Sequestration. Arsenazo III dye was treated with Ca(II) to form a calcium complex of the dye. The calcium complex was then contacted with a quantity of the macroparticulates formed as above to promote stripping of the calcium from the dye. FIG. 6 is a Beer's law plot of the dye absorbance at 650 nm in the presence of increasing concentrations of calcium. As shown, the dye absorbance decreased with increasing calcium concentration. The decreased absorbance is indicative of increased formation of the calcium complex prior to being contacted with the macroparticulates. The same solution was treated with macroparticulates after all the Ca(II) had been added. FIG. 7 is a Beer's law plot of the dye absorbance at 650 nm as a function of the quantity of macroparticulates contacted with the calcium complex of the dye. As shown, increasing quantities of macroparticulates steadily increased the dye absorbance at 650 nm. The increased absorbance is indicative of increasing decomplexation of calcium from the dye. Although the dye absorbance was not fully restored to its initial value (FIG. 6), it is anticipated that further calcium decomplexation may be accomplished by utilizing additional macroparticulates.

Figure 8:
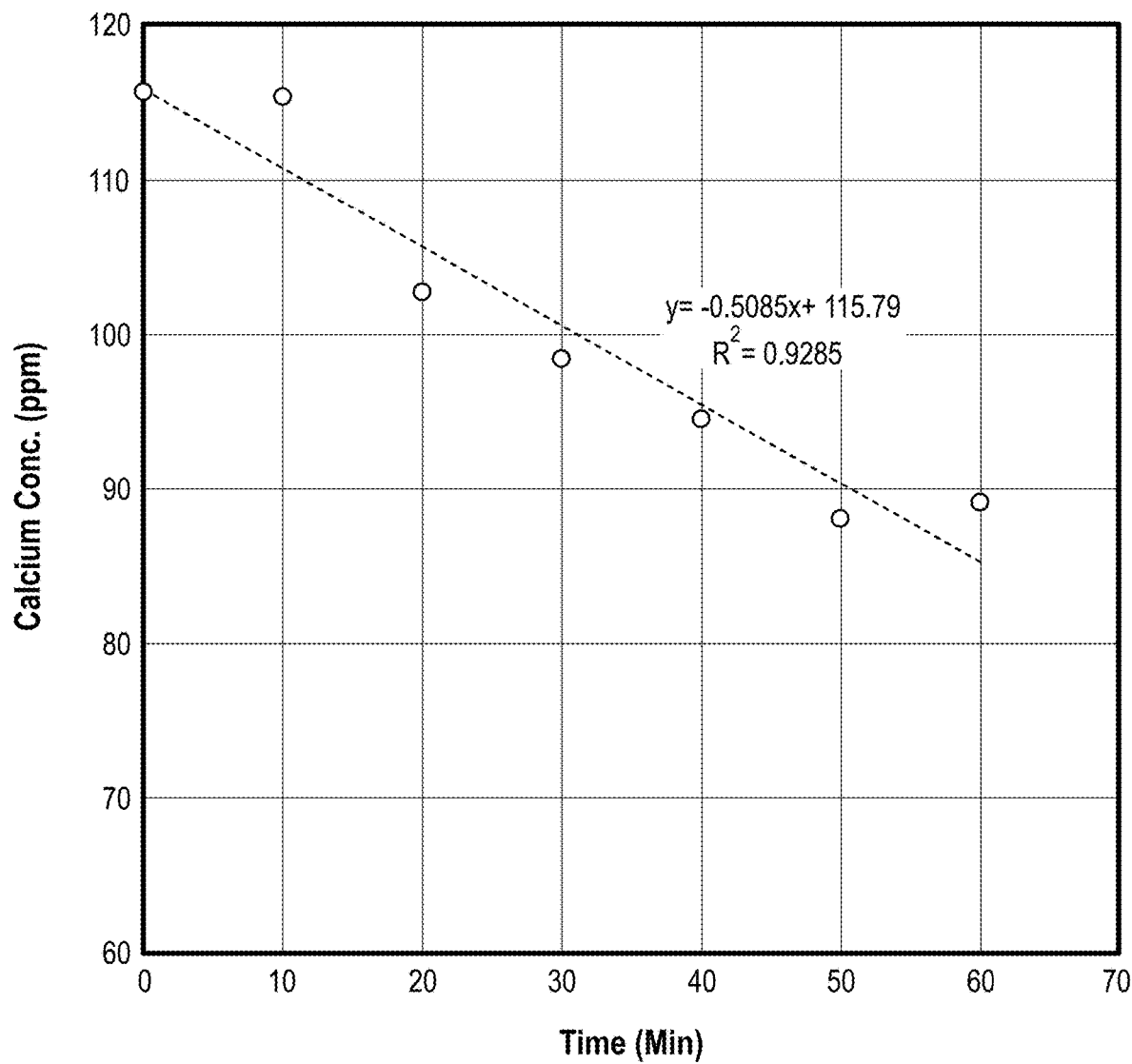
FIG. 8 is a Beer's law plot of $Ca^{2+}$ concentration as a function of time when treating a calcium salt solution with iminodiacetic acid-functionalized macroparticulates under dynamic flow conditions.

Dynamic Flow Sequestration of Calcium. A quantity of iminodiacetic acid-functionalized macroparticulates from above was placed in a 150 gallon flow loop fitted with strainer baskets. A 116 ppm $Ca^{2+}$ solution was circulated through the flow loop at a rate of 50 gallons per minute. FIG. 8 is a Beer's law plot of $Ca^{2+}$ concentration as a function of time when treating a calcium salt solution with iminodiacetic acid-functionalized macroparticulates under dynamic flow conditions. As shown, there was a greater than 20% decrease in the $Ca^{2+}$ concentration over time as a result of metal sequestration on the macroparticulates.

Figure 9:
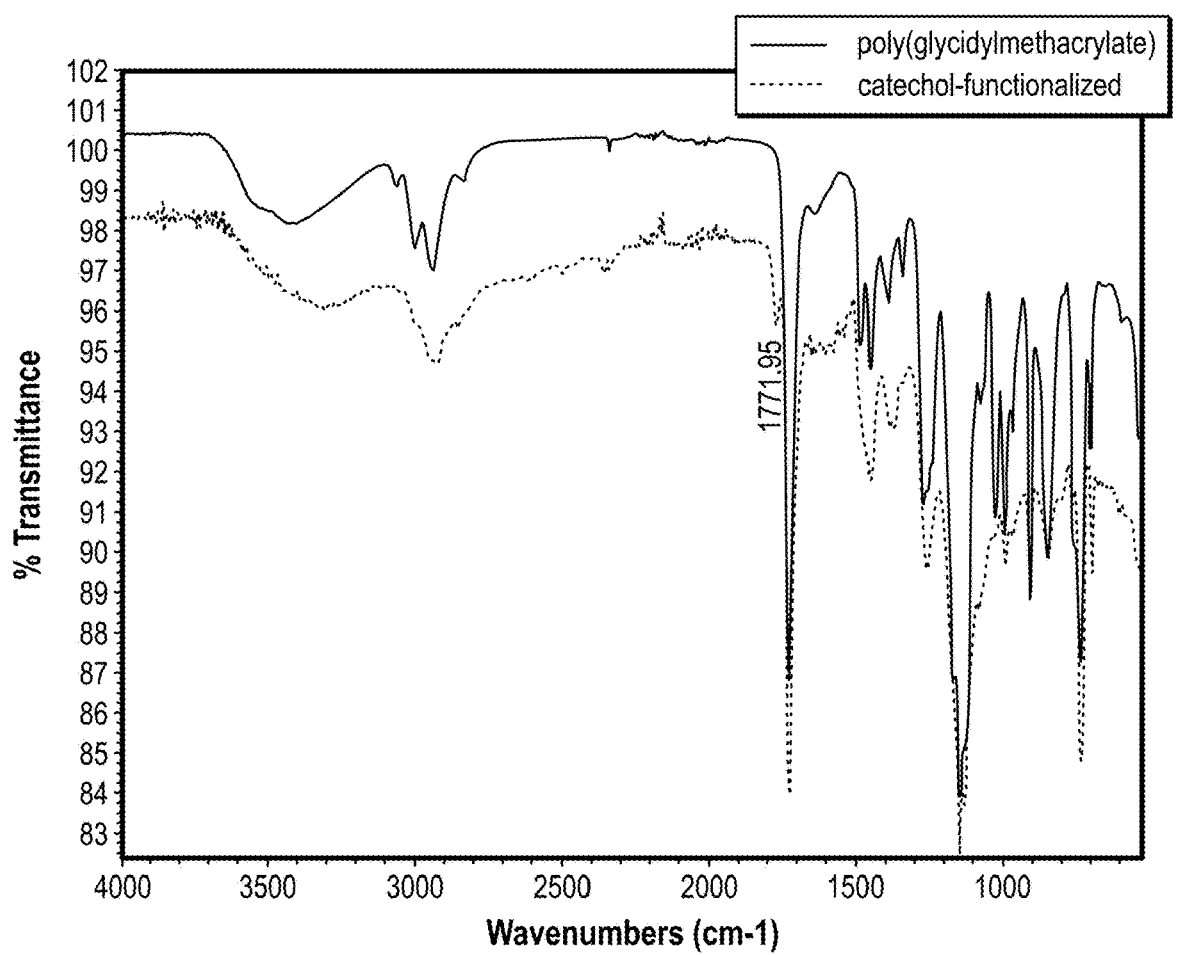
FIG. 9 shows comparative FTIR spectra of poly(glycidyl methacrylate) macroparticulates before and after functionalizing with a catechol for sequestering iron.
Figure 10:
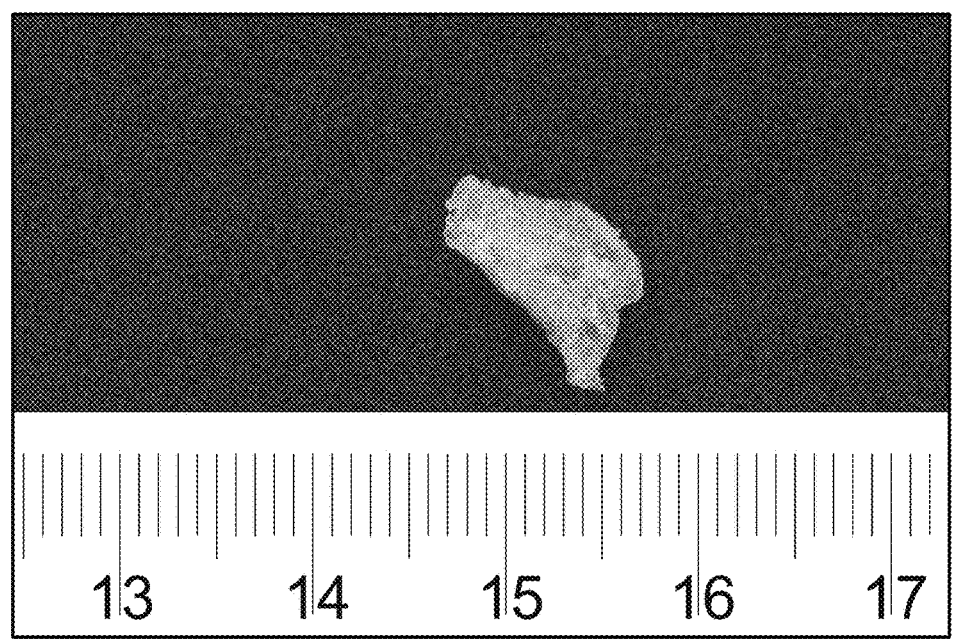
FIG. 10 is a photograph of a poly(glycidyl methacrylate) macroparticulate functionalized with a catechol for sequestering iron.

Iron Sequestration. Poly(glycidyl methacrylate) macroparticulates were functionalized with ethylenediamine under the general conditions specified above by replacing iminodiacetic acid with ethylenediamine. The functionalized macroparticulates were then reacted with 2,3-dihydroxybenzoyl chloride to form catechol-functionalized macroparticulates. FIG. 9 shows comparative FTIR spectra of poly (glycidyl methacrylate) macroparticulates before and after functionalizing with a catechol for sequestering iron. FIG. 10 is a photograph of a poly(glycidyl methacrylate) macroparticulate functionalized with a catechol for sequestering iron. The catechol-functionalized macroparticulates were stirred with various stock solutions of Fe(II) and Fe(III) and iron-containing synthetic field samples. The catechol-functionalized macroparticulates were initially buoyant in the solutions but turned purple-black and sunk to the bottom of the test vessel within 10 minutes of treatment. UV-VIS spectrophotometry and the increased macroparticulate density were indicative of adsorption of iron onto the surface of the macroparticulates.

Hexasubstituted Benzene Compounds

Compound A: 1,3,5-Tris(trichloromethyl)-2,4,6-triethylbenzene. The title compound was synthesized as described in K. J. Wallace, et al., "Preparation of 1,3,5-Tris(aminomethyl)-2,4,6-triethylbenzene from Two Versatile 1,3,5-Tri (halosubstituted) 2,4,6-Triethylbenzene Derivatives," Synthesis, 2005, pp. 2080-2083. In particular, 1,3,5-triethylbenzene was reacted with chloromethyl methyl ether in $CS_2$ in the presence of $SnCl_4$ to afford the title compound. CAUTION: chloromethyl methyl ether is a potent carcinogen.

Compound B: 1,3,5-Tris(trisbromomethyl)-2,4,6-triethylbenzene. The title compound was synthesized as described in K. J. Wallace, et al., "Preparation of 1,3,5-Tris(aminomethyl)-2,4,6-triethylbenzene from Two Versatile 1,3,5-Tri (halosubstituted) 2,4,6-Triethylbenzene Derivatives," Synthesis, 2005, pp. 2080-2083. In particular, 1,3,5-triethylbenzene was reacted with HBr, acetic acid and Zn powder to afford the title compound.

Figure 11:
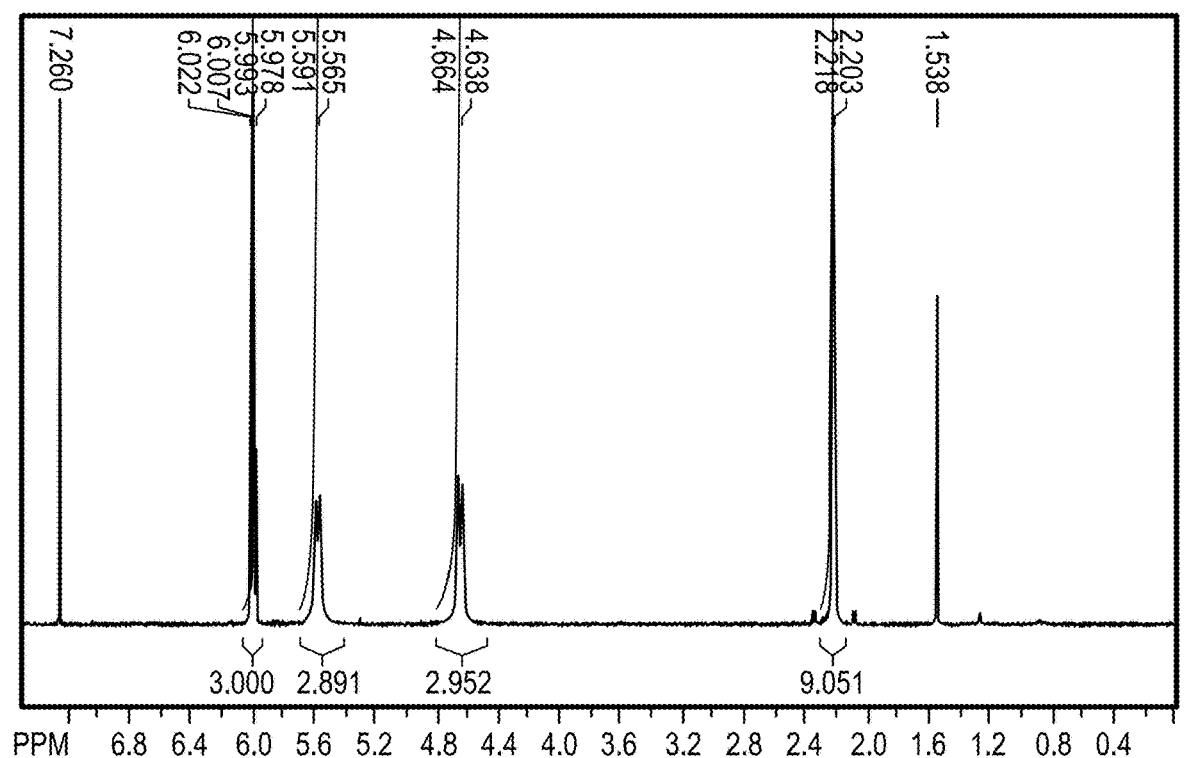
FIGS. 11 and 12 are $^1H$ and $^{13}C$ NMR spectra of Compound C in $CDCl_3$, respectively.
Figure 12:
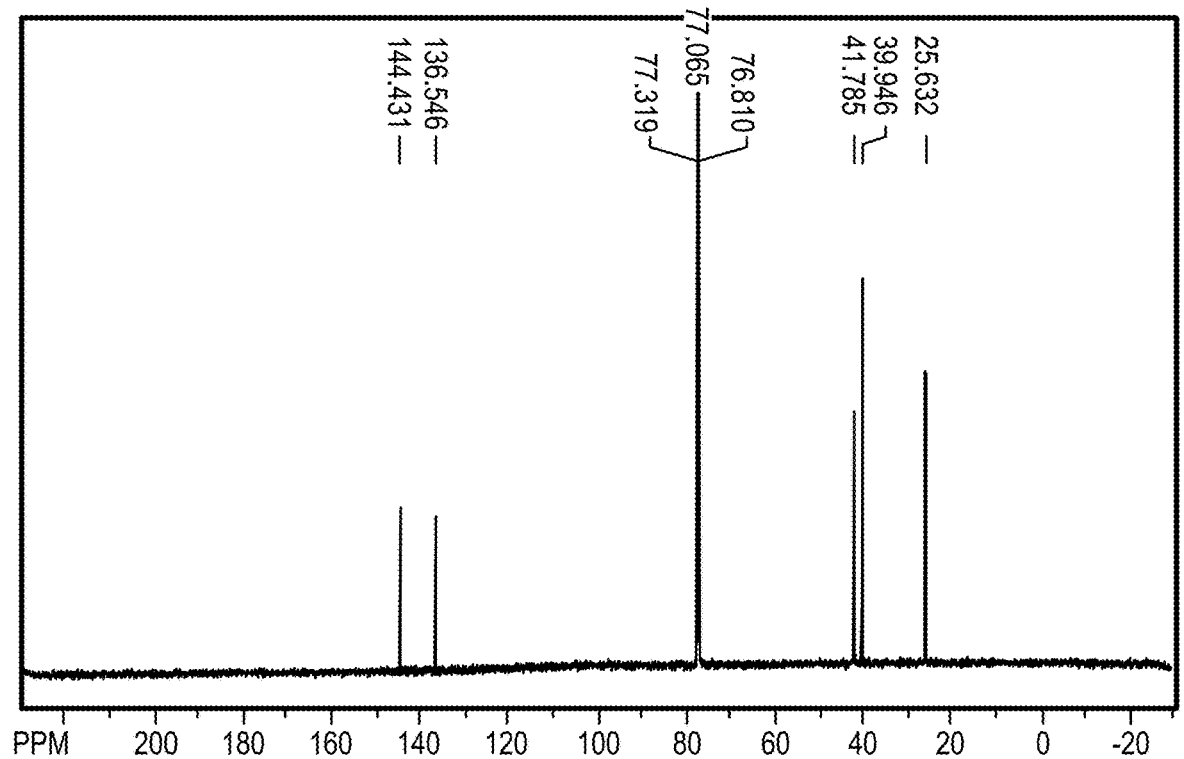
Figure 13:
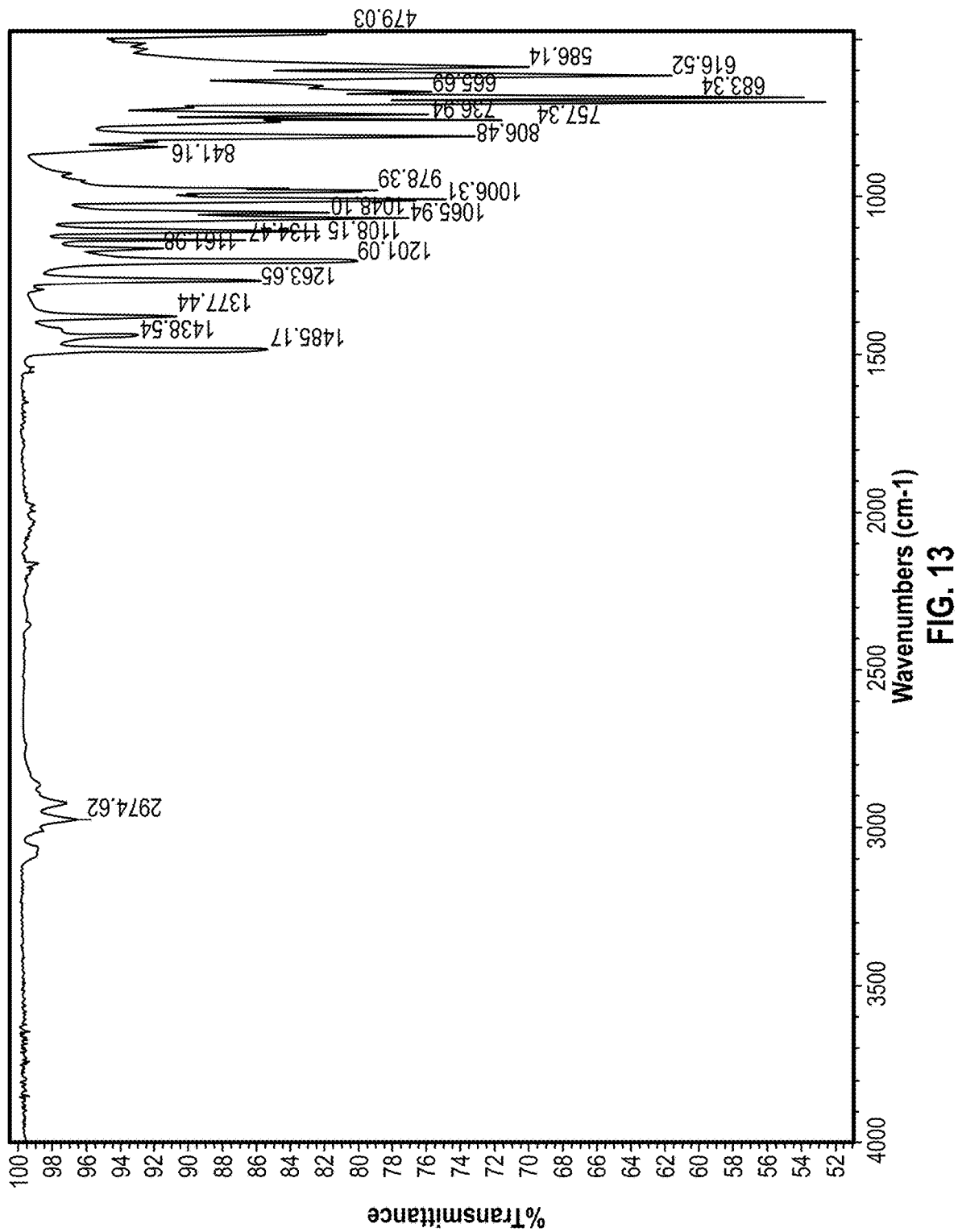
FIG. 13 is an infrared spectrum of Compound C.
Figure 14:
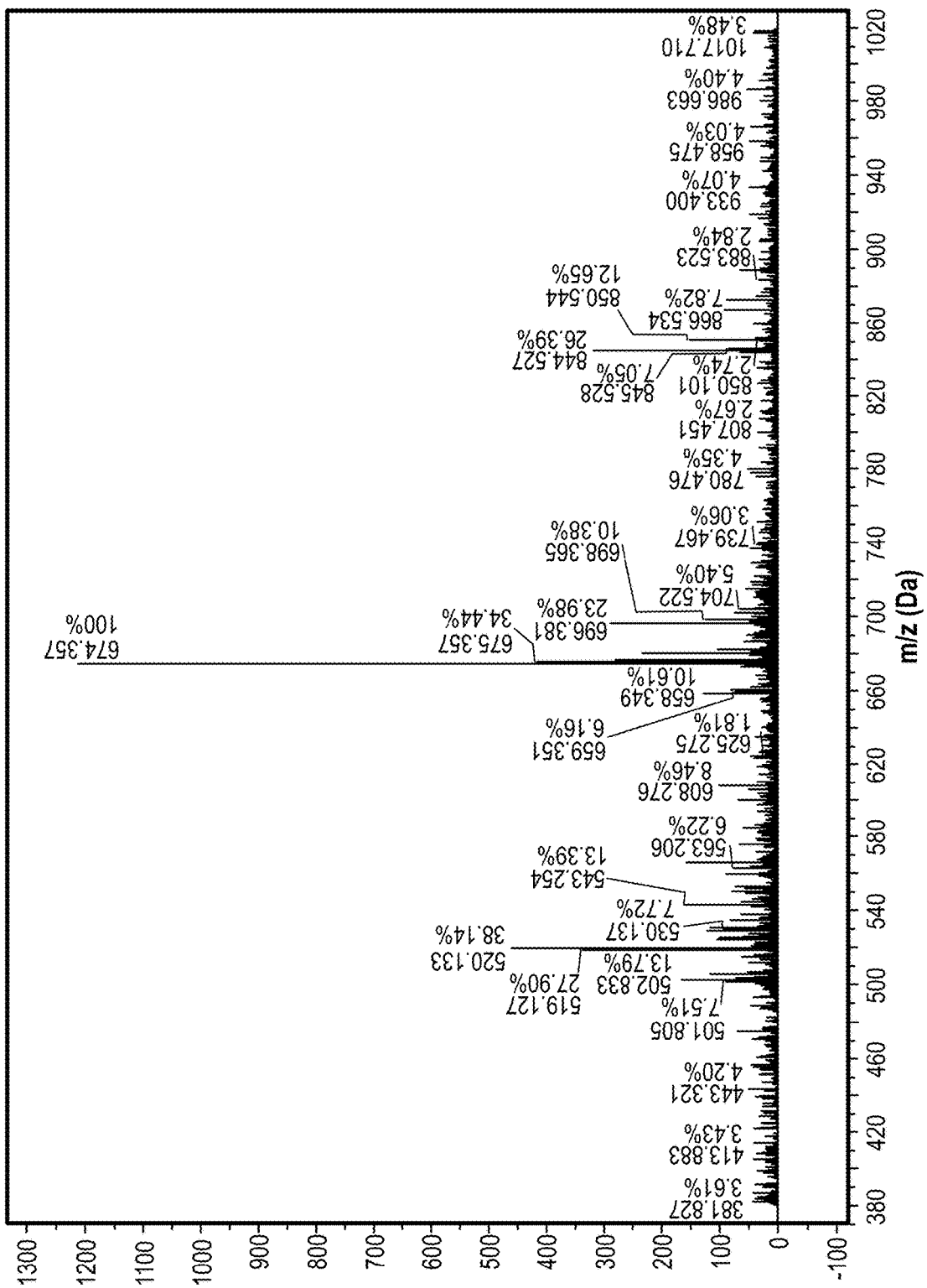
FIG. 14 is a MALDI-TOF mass spectrum of Compound C.
Figure 15:
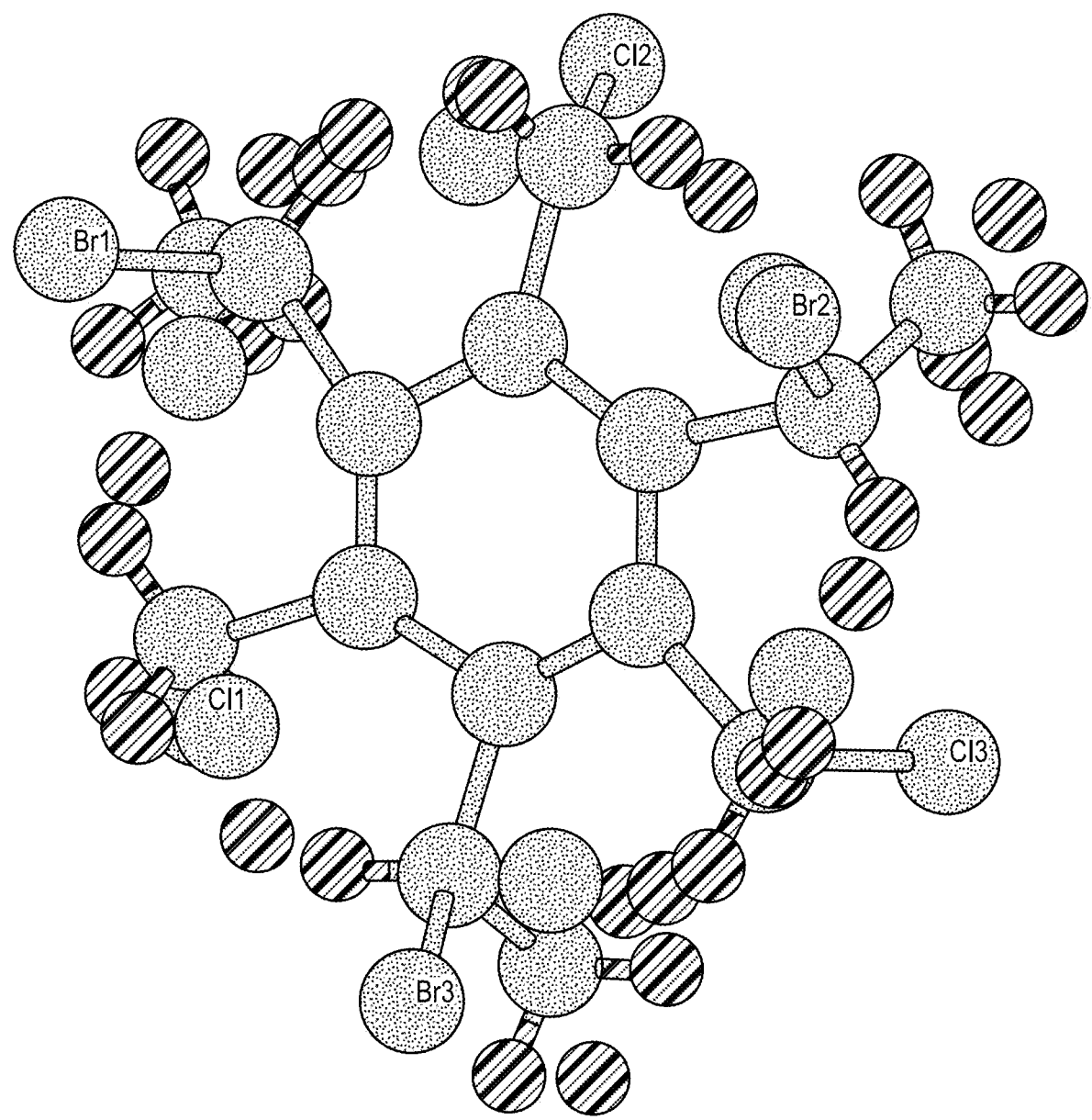
FIG. 15 is a depiction of the crystal structure of Compound C.

Compound C: 1,3,5-Tris(trisbromomethyl)-2,4,6-tris(α-bromoethyl)benzene. The title compound was synthesized by reacting Compound A or Compound B with excess N-bromosuccinimide (NBS) in $CCl_4$. In one example, Compound A was dissolved in $CCl_4$, and 3 molar equivalents of NBS were added. The reaction was heated to reflux, and 0.1 molar equivalents of AIBN were added. The title compound was isolated by aqueous workup and column chromatography. When the reaction was conducted upon Compound A with >6 molar equivalents of NBS, halide exchange of the benzylic chlorides for bromides took place. FIGS. 11 and 12 are $^1H$ and $^{13}C$ NMR spectra of the title compound in $CDCl_3$, respectively. FIG. 13 is an infrared spectrum of the title compound. FIG. 14 shows MALDI-TOF mass spectrometry data of the title compound. FIG. 15 shows a depiction of the crystal structure of the title compound.

Compound D: 1,3,5-Tris(trisbromomethyl)-2,4,6-trivinylbenzene. The title compound was synthesized by reacting Compound C with excess potassium t-butoxide in t-butanol. Compound C was combined with 3 molar equivalents of potassium t-butoxide in t-butanol and reacted at 70° C. The product was isolated essentially quantitatively after aqueous workup. FTIR showed the appearance of a new C=C stretch and a new C—H stretch centered at 1660 $cm^{-1}$ and 3084 $cm^{-1}$, respectively.

Figure 16:
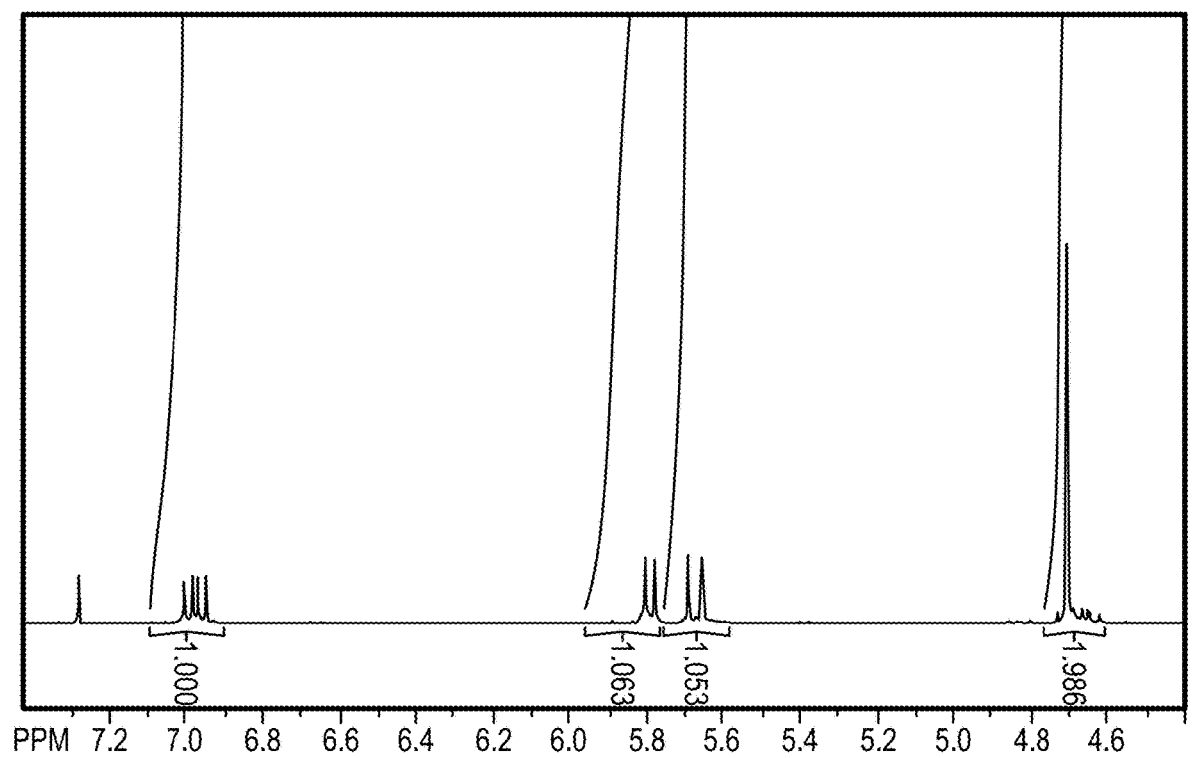
FIG. 16 is a $^1H$ NMR spectrum of Compound E in $CDCl_3$.

Compound E: 1,3,5-Tris(trisbromomethyl)-2,4,6-triepoxybenzene. The title compound was synthesized by reacting Compound D with dimethyldioxirane in acetone. Compound D was first dissolved in methylene chloride and a solution of dimethyldioxirane in acetone was added. The dimethyldioxirane was prepared in situ by reacting potassium peroxymonosulfate (OXONE) with acetone. The reaction was continued until the C=C stretch was absent by FTIR. The title compound was obtained essentially quantitatively. Alternately, the title compound may be prepared by reacting Compound D with m-chloroperoxybenzoic acid. FIG. 16 is a $^1H$ NMR spectrum of the title compound in $CDCl_3$.

Figure 17:
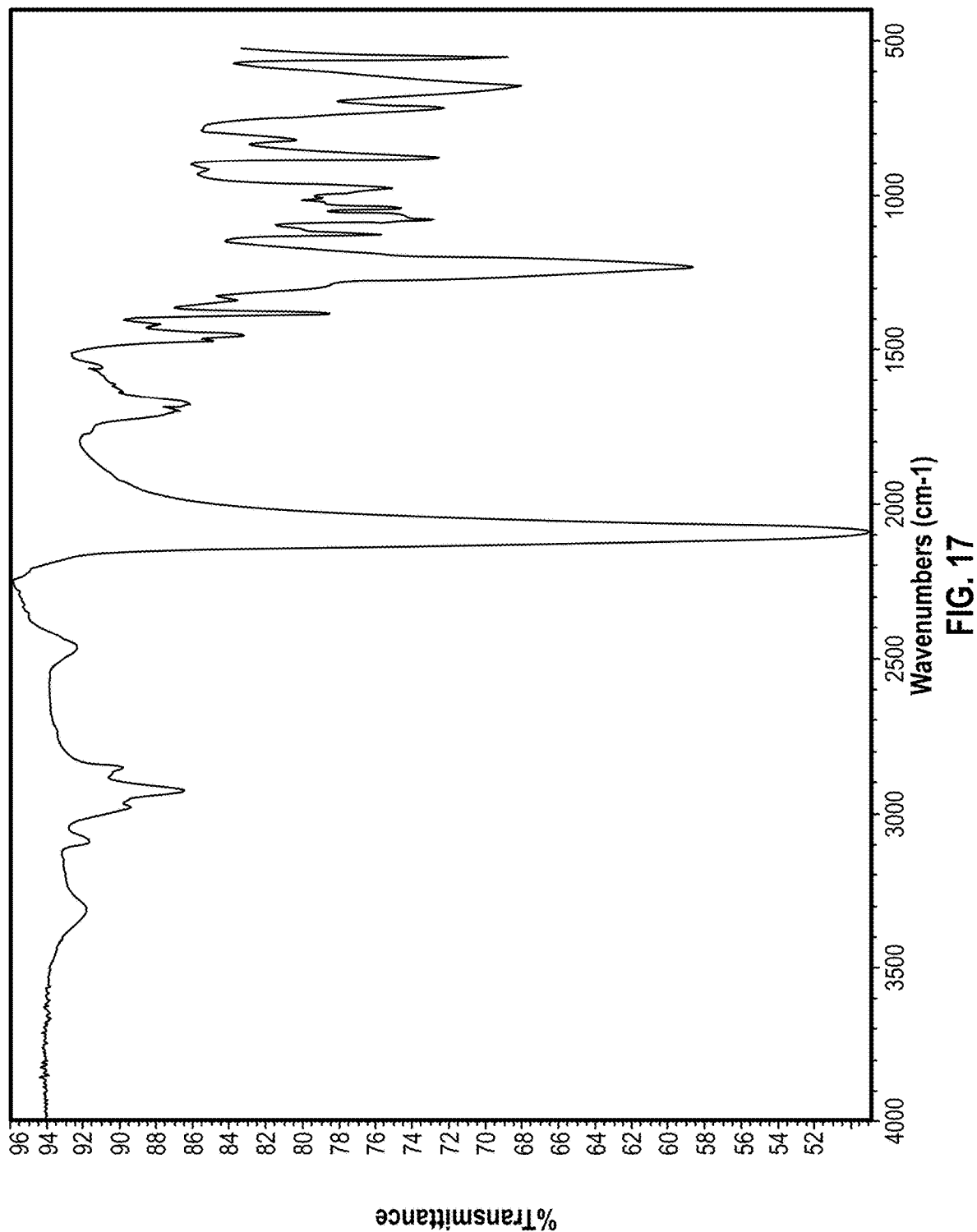
FIG. 17 is an infrared spectrum of Compound F.
Figure 18:
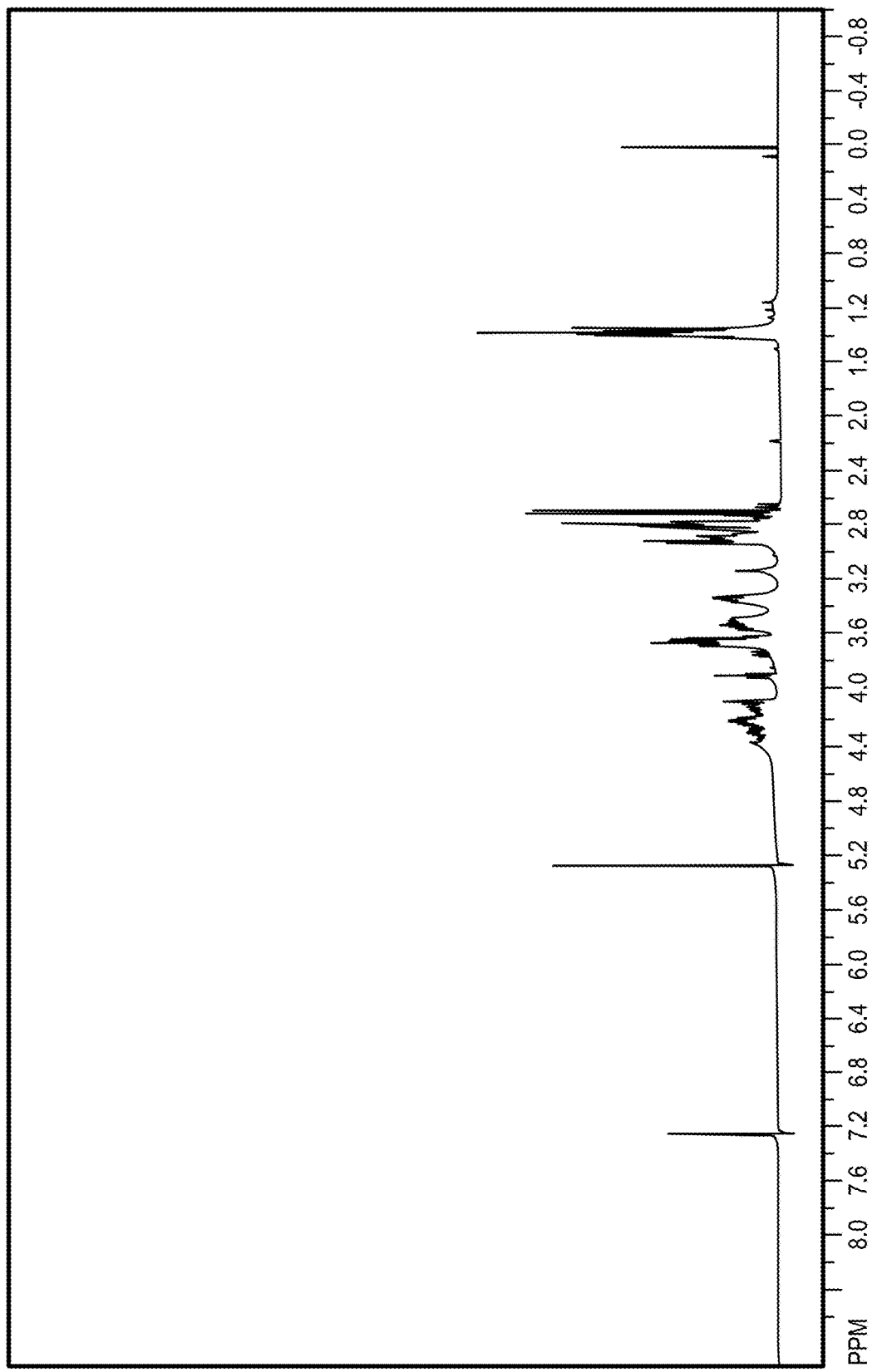
FIG. 18 is a $^1H$ NMR spectrum of the phosphorene electrophile used to promote functionalization in Scheme 1.
Figure 19:
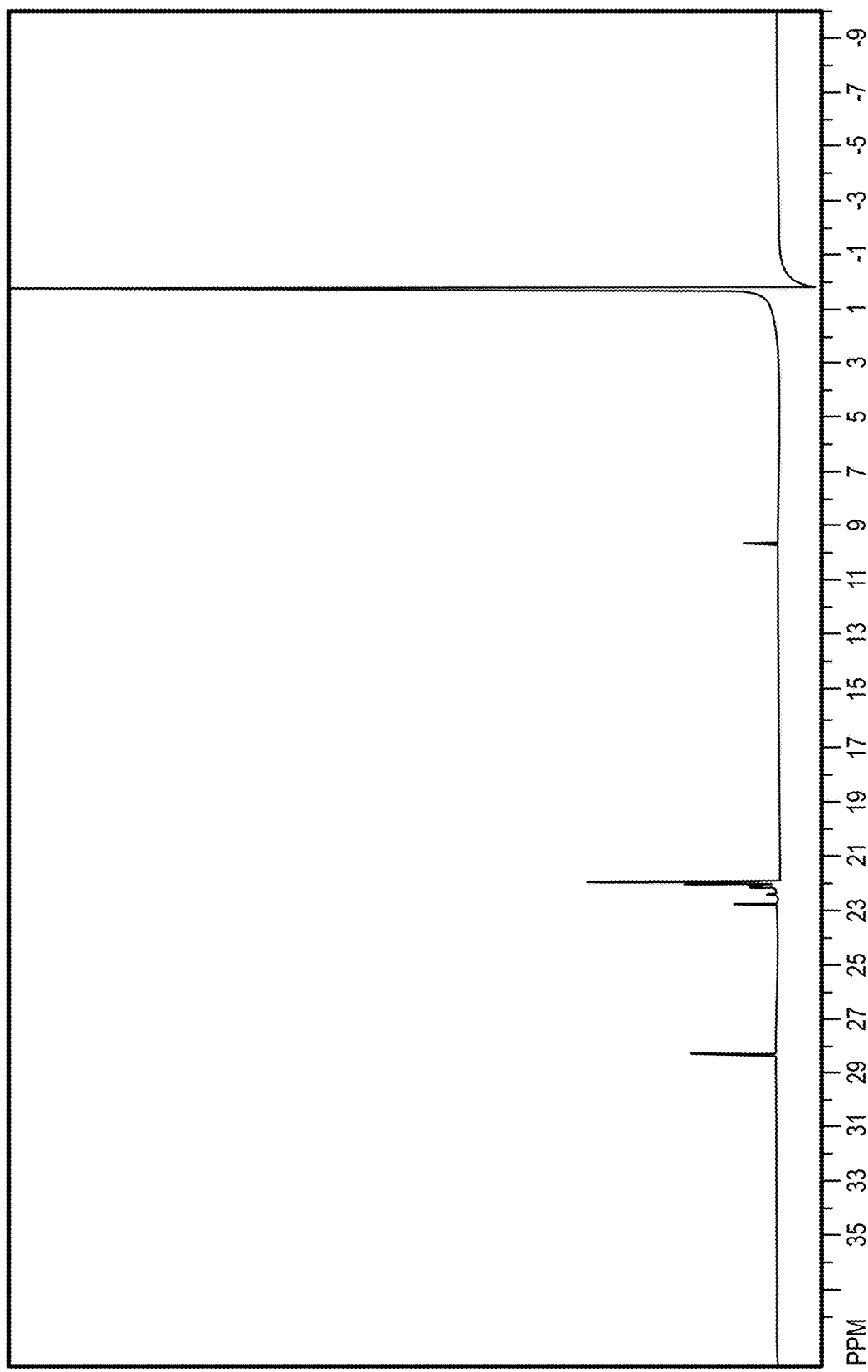
FIG. 19 is the corresponding $^{31}P$ NMR spectrum.

Compound F: 1,3,5-Tris(trisazidomethyl)-2,4,6-triepoxybenzene. The title compound was synthesized by reacting Compound E with sodium azide in DMF at room temperature. CAUTION: $NaN_3$ may be explosive under some conditions and is highly toxic. No epoxide opening was observed. FIG. 17 is an infrared spectrum of the title compound.

Unless otherwise indicated, all numbers expressing quantities and the like in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, tools and methods are described herein in terms of "comprising" various components or steps, the systems, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, tools and methods illustratively disclosed herein may suitably be practiced in the absence of any element that is not specifically disclosed herein and/or any optional element disclosed herein. While systems, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. A method comprising:
    exposing a substance in need of contaminant remediation to a plurality of macroparticulates having an average particle size of about 1 mm or more;
        wherein the macroparticulates are free particles and comprise a reaction product of an epoxide-containing (meth)acrylic polymer or copolymer and a compound bearing a nitrogen nucleophile comprising at least one amine;
        wherein the epoxide-containing (meth)acrylic polymer or copolymer comprises about 99 wt. % or greater glycidyl methacrylate; and
        wherein the epoxide-containing (meth)acrylic polymer or copolymer is formed from glycidyl methacrylate, diethyleneglycol dimethacrylate, and tris(2-(acrylolyloxy)ethyl)isocyanurate;
    forming contaminant-laden macroparticulates by adsorbing or bonding a contaminant from the substance in need of contaminant remediation onto a surface of the macroparticulates; and
    separating the contaminant-laden macroparticulates from the substance in need of contaminant remediation.

2. The method of claim 1, wherein the reaction product contains an internal cavity after reacting the epoxide-containing (meth)acrylic polymer or copolymer with the compound bearing the nitrogen nucleophile.

3. The method of claim 1, wherein the compound bearing the nitrogen nucleophile comprises iminodiacetic acid, ethylenediamine, N,N'-bis(aminoethyl)ethylenediamine, tris(aminoethyl)amine, or a polyamine, a first amine group of the polyamine forming a covalent bond to the (meth)acrylic polymer or copolymer through opening of an epoxide group or aminolysis of an ester and one or more second amine groups of the polyamine being further modified with one or more functionalities capable of binding or adsorbing at least one contaminant from the substance in need of contaminant remediation after the first amine group has reacted.

4. The method of claim 1, wherein the substance in need of contaminant remediation comprises contaminated water.

5. The method of claim 4, further comprising:
    separating reclaimed water from the contaminant-laden macroparticulates, the reclaimed water having a decreased concentration of the contaminant compared to the contaminated water;
    forming a treatment fluid with the reclaimed water; and
    introducing the treatment fluid into a wellbore penetrating a subterranean formation.

6. The method of claim 1, wherein the contaminant comprises at least one contaminant selected from the group consisting of a divalent metal, a monovalent metal, a monovalent anion, a divalent or trivalent transition metal, a polyatomic anion, a hydrophobic substance, and any combination thereof.

7. The method of claim 1, further comprising:
    visually or spectroscopically interrogating the plurality of macroparticulates to determine whether the plurality of macroparticulates has become saturated with the contaminant.

8. The method of claim 1, further comprising:
    recovering the contaminant from the contaminant-laden macroparticulates.

9. The method of claim 1, wherein the substance in need of contaminant remediation is provided as a continuous flow to the plurality of macroparticulates.

10. The method of claim 9, further comprising:
    determining a pre-purification contaminant profile of the substance in need of contaminant remediation in the continuous flow; and
    determining a post-purification contaminant profile of the substance in need of contaminant remediation in the continuous flow after exposing the substance to the plurality of macroparticulates.

11. The method of claim 10, further comprising:
    recirculating the substance in need of contaminant remediation to the plurality of macroparticulates if the post-purification contaminant profile exceeds a specified contaminant threshold.

12. The method of claim 9, wherein the plurality of macroparticulates is housed in one or more removable cartridges.

13. A method comprising:
exposing a substance in need of contaminant remediation to a plurality of macroparticulates having an average particle size of about 1 mm or more;
   wherein the macroparticulates are free particles and comprise a reaction product of an epoxide-containing (meth)acrylic polymer or copolymer and a compound bearing a nitrogen nucleophile comprising at least one amine;
      wherein the epoxide-containing (meth)acrylic polymer or copolymer is produced by living polymerization;
forming contaminant-laden macroparticulates by adsorbing or bonding a contaminant from the substance in need of contaminant remediation onto a surface of the macroparticulates; and
separating the contaminant-laden macroparticulates from the substance in need of contaminant remediation.

14. The method of claim 13, wherein the reaction product contains an internal cavity after reacting the epoxide-containing (meth)acrylic polymer or copolymer with the compound bearing the nitrogen nucleophile.

15. The method of claim 13, wherein the compound bearing the nitrogen nucleophile comprises iminodiacetic acid, ethylenediamine, N,N'-bis(aminoethyl)ethylenediamine, tris(aminoethyl)amine, or a polyamine, a first amine group of the polyamine forming a covalent bond to the (meth)acrylic polymer or copolymer through opening of an epoxide group or aminolysis of an ester and one or more second amine groups of the polyamine being further modified with one or more functionalities capable of binding or adsorbing at least one contaminant from the substance in need of contaminant remediation after the first amine group has reacted.

16. The method of claim 13, wherein the substance in need of contaminant remediation comprises contaminated water.

17. The method of claim 13, wherein the substance in need of contaminant remediation is provided as a continuous flow to the plurality of macroparticulates.

18. A method comprising:
exposing a substance in need of contaminant remediation to a plurality of macroparticulates having an average particle size of about 1 mm or more;
   wherein the macroparticulates are free particles and comprise a reaction product of an epoxide-containing (meth)acrylic polymer or copolymer and a polyamine;
      wherein a first amine group of the polyamine forms a covalent bond to the (meth)acrylic polymer or copolymer through opening of an epoxide group, and one or more second amine groups of the polyamine are further modified with one or more functionalities capable of binding at least one contaminant from the substance in need of contaminant remediation;
forming contaminant-laden macroparticulates by adsorbing or bonding a contaminant from the substance in need of contaminant remediation onto a surface of the macroparticulates; and
separating the contaminant-laden macroparticulates from the substance in need of contaminant remediation.

19. The method of claim 18, wherein the reaction product contains an internal cavity after reacting the epoxide-containing (meth)acrylic polymer or copolymer with the polyamine.

20. The method of claim 18, wherein the substance in need of contaminant remediation comprises contaminated water.

21. The method of claim 18, wherein the substance in need of contaminant remediation is provided as a continuous flow to the plurality of macroparticulates.

22. The method of claim 18, wherein the one or more functionalities comprise a supramolecular receptor.

* * * * *